US012707518B2

(12) United States Patent
Patil et al.

(10) Patent No.: US 12,707,518 B2
(45) **Date of Patent: *Aug. 11, 2026**

(54) CONSIDERATIONS FOR MULTI-LINK AGGREGATION

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Lochan Verma, Danville, CA (US)

(73) Assignee: QUALCOMM Incorporated, San Diego, CA (US)

(*) Notice: Subject to any disclaimer, the term of this patent is extended or adjusted under 35 U.S.C. 154(b) by 603 days.

This patent is subject to a terminal disclaimer.

(21) Appl. No.: 18/065,519

(22) Filed: Dec. 13, 2022

(65) Prior Publication Data

US 2023/0110743 A1 Apr. 13, 2023

Related U.S. Application Data

(63) Continuation of application No. 16/809,456, filed on Mar. 4, 2020, now Pat. No. 11,564,272.

(60) Provisional application No. 62/834,316, filed on Apr. 15, 2019, provisional application No. 62/816,028, filed on Mar. 8, 2019.

(51) Int. Cl.

| | |
|---|---|
| *H04W 76/15* | (2018.01) |
| *H04L 1/1607* | (2023.01) |
| *H04L 5/00* | (2006.01) |
| *H04W 74/0808* | (2024.01) |
| *H04W 80/02* | (2009.01) |

(52) U.S. Cl.

CPC ........... *H04W 76/15* (2018.02); *H04L 1/1621* (2013.01); *H04L 5/0055* (2013.01); *H04W 74/0808* (2013.01); *H04W 80/02* (2013.01)

(58) Field of Classification Search

None

See application file for complete search history.

(56) References Cited

U.S. PATENT DOCUMENTS 11,564,272 B2 * 1/2023 Patil ...................... H04L 5/0044
2003/0026218 A1 * 2/2003 Singhai ................ H04L 69/166 370/450

(Continued)

*Primary Examiner* — Anh Ngoc M Nguyen
(74) *Attorney, Agent, or Firm* — Holland & Hart LLP

(57) ABSTRACT

Methods, systems, and devices for wireless communications are described. Generally, the described techniques provide for improved handling of adjacent channel interference in multi-link aggregation scenarios. In accordance with the described techniques, a device may establish a set of wireless links for communication with a second device, the set of wireless links supporting parallel transmission during at least a first duration of a multi-link session, the set of wireless links including at least a first wireless link and a second wireless link. The device may modify a transmission parameter for the first wireless link or a clear channel assessment (CCA) parameter for the second wireless link, or a combination thereof. The device may then perform the CCA procedure on the second wireless link and transmit at least a first portion of the message on the first wireless link based on the modified transmission parameter or modified CCA parameter.

30 Claims, 37 Drawing Sheets

(56) References Cited

U.S. PATENT DOCUMENTS

| | | | | |
|---|---|---|---|---|
| 2006/0233146 | A1 | 10/2006 | Nagata et al. | |
| 2008/0112380 | A1 | 5/2008 | Fischer | |
| 2012/0099568 | A1 | 4/2012 | Wentink | |
| 2015/0003466 | A1 | 1/2015 | Soffer et al. | |
| 2015/0250003 | A1 | 9/2015 | Seok et al. | |
| 2015/0264715 | A1 | 9/2015 | Hwang et al. | |
| 2015/0373652 | A1 | 12/2015 | Dabeer et al. | |
| 2017/0006636 | A1 | 1/2017 | Li et al. | |
| 2017/0171723 | A1 | 6/2017 | Adachi | |
| 2017/0181164 | A1 | 6/2017 | Tandai et al. | |
| 2018/0007701 | A1 | 1/2018 | Adachi et al. | |
| 2019/0182863 | A1* | 6/2019 | Chu | H04W 76/00 |
| 2019/0239226 | A1 | 8/2019 | Chu et al. | |
| 2019/0260446 | A1 | 8/2019 | Oteri et al. | |
| 2019/0274120 | A1 | 9/2019 | Reumerman et al. | |
| 2019/0306882 | A1 | 10/2019 | Wee et al. | |
| 2020/0267766 | A1 | 8/2020 | Seok et al. | |
| 2020/0288523 | A1 | 9/2020 | Patil | |
| 2021/0084533 | A1 | 3/2021 | Huang et al. | |
| 2022/0104243 | A1* | 3/2022 | Kim | H04L 67/61 |
| 2023/0269805 | A1 | 8/2023 | Patil et al. | |

* cited by examiner

CONSIDERATIONS FOR MULTI-LINK AGGREGATION

CROSS REFERENCE

The present application for patent is a Continuation of U.S. patent application Ser. No. 16/809,456 by PATIL et al., entitled "DESIGN CONSIDERATIONS FOR MULTI-LINK AGGREGATION" filed Mar. 4, 2020, which claims the benefit of U.S. Provisional Patent Application No. 62/816,028 by PATIL et al., entitled "DESIGN CONSIDERATIONS FOR MULTI-LINK AGGREGATION WHEN THE CHANNELS ARE IN CLOSE PROXIMITY," filed Mar. 8, 2019, and the benefit of U.S. Provisional Patent Application No. 62/834,316 by PATIL et al., entitled "DESIGN CONSIDERATIONS FOR MULTI-LINK AGGREGATION," filed Apr. 15, 2019, each of which are assigned to the assignee hereof, and each of which are expressly incorporated herein.

BACKGROUND

The following relates generally to wireless communications, and more specifically to design considerations for multi-link aggregation.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include an AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, an STA may communicate with an associated AP via downlink (DL) and uplink (UL). The DL (or forward link) may refer to the communication link from the AP to the station, and the UL (or reverse link) may refer to the communication link from the station to the AP.

Some wireless communications systems may support multi-link aggregation, where transmissions may be transmitted and/or received over two or more links between two wireless devices (e.g., two STAs, an AP and STA, etc.). In some cases, a transmission on one link in the multi-link session may interfere with a transmission on one or more other links of the multi-link session. For example, adjacent channel interference (ACI) may result from leakage of signal power from an adjacent channel (due to inadequate filtering, improper tuning, etc.). ACI may negatively impact a communications system, for example by decreasing throughput on adjacent links, increasing signal processing at communicating devices, or incorrectly causing adjacent links to appear busy or occupied, leading to lost transmission opportunities. Improved techniques for ACI management in multi-link aggregation may be desired.

SUMMARY

The described techniques relate to improved methods, systems, devices, or apparatuses that support design considerations for multi-link aggregation when channels are in close proximity. In a multi-link aggregation scheme, a first wireless device and a second wireless device may establish multiple wireless links for communicating, such that transmissions or portions of transmission may occur over both links concurrently. Such parallel communications, while benefiting the system in terms of throughput, may increase the complexity of the system. If the links are adjacent, or nearby in frequency, communications over a first channel of a first wireless link may interfere with communications over a second channel of a second wireless link. This type of interference may be referred to as adjacent channel interference (ACI) and may cause a wireless device to falsely detect that the second link is busy. The wireless device may then refrain transmitting on the second link although the link is actually available, which may lead to lost transmission opportunities, increased latency and reduced throughput.

A wireless device described herein, such as a station (STA) or an access point (AP), may implement techniques to ameliorate ACI-related issues. For example, the wireless device may implement techniques based on the induced ACI. In some cases, the wireless device may reduce the transmit power on the initiating link to lessen the impact of ACI on the adjacent link. In some cases, the wireless device may transmit with short interframe spacing (SIFS) bursting on the initiating link and regularly sample on the adjacent link. In some cases, the wireless device may adjust a clear channel assessment (CCA) threshold on the adjacent link such that the CCA threshold is adjusted to below an energy detection threshold. The wireless device may implement techniques to silence other STAs in the basic service set (BSS) so that another STA does not gain control of a second link once the wireless device begins transmission on an initiating link. Further techniques are described herein for generating a Physical Layer Convergence Procedure (PLCP) Protocol Data Unit (PPDU) at the wireless device. Techniques described herein may be applied to synchronous or asynchronous systems.

A method of wireless communication at a first wireless device is described. The method may include identifying a message for parallel transmission on at least a first wireless link and a second wireless link of a set of wireless links between the first wireless device and a second wireless device, the set of wireless links supporting parallel transmissions during a multi-link session, performing, during a first time period, a CCA procedure on the first wireless link and the second wireless link, determining, based on the performed CCA procedure, to transmit on the first wireless link and refrain from transmitting on the second wireless link, modifying, for a second time period based on the determining, a transmission parameter for the first wireless link, or a CCA parameter for the second wireless link, or a combination thereof, and performing, during the second time period based on the modifying, the CCA procedure on the second wireless link and transmission of at least a first portion of the message on the first wireless link.

An apparatus for wireless communication at a first wireless device is described. The apparatus may include a processor, memory in electronic communication with the processor, and instructions stored in the memory. The instructions may be executable by the processor to cause the apparatus to identify a message for parallel transmission on at least a first wireless link and a second wireless link of a set of wireless links between the first wireless device and a second wireless device, the set of wireless links supporting parallel transmissions during a multi-link session, perform, during a first time period, a CCA procedure on the first wireless link and the second wireless link, determine, based on the performed CCA procedure, to transmit on the first wireless link and refrain from transmitting on the second wireless link, modify, for a second time period based on the determining, a transmission parameter for the first wireless link, or a CCA parameter for the second wireless link, or a combination thereof, and perform, during the second time period based on the modifying, the CCA procedure on the second wireless link and transmission of at least a first portion of the message on the first wireless link.

Another apparatus for wireless communication at a first wireless device is described. The apparatus may include means for identifying a message for parallel transmission on at least a first wireless link and a second wireless link of a set of wireless links between the first wireless device and a second wireless device, the set of wireless links supporting parallel transmissions during a multi-link session, performing, during a first time period, a CCA procedure on the first wireless link and the second wireless link, determining, based on the performed CCA procedure, to transmit on the first wireless link and refrain from transmitting on the second wireless link, modifying, for a second time period based on the determining, a transmission parameter for the first wireless link, or a CCA parameter for the second wireless link, or a combination thereof, and performing, during the second time period based on the modifying, the CCA procedure on the second wireless link and transmission of at least a first portion of the message on the first wireless link.

A non-transitory computer-readable medium storing code for wireless communication at a first wireless device is described. The code may include instructions executable by a processor to identify a message for parallel transmission on at least a first wireless link and a second wireless link of a set of wireless links between the first wireless device and a second wireless device, the set of wireless links supporting parallel transmissions during a multi-link session, perform, during a first time period, a CCA procedure on the first wireless link and the second wireless link, determine, based on the performed CCA procedure, to transmit on the first wireless link and refrain from transmitting on the second wireless link, modify, for a second time period based on the determining, a transmission parameter for the first wireless link, or a CCA parameter for the second wireless link, or a combination thereof, and perform, during the second time period based on the modifying, the CCA procedure on the second wireless link and transmission of at least a first portion of the message on the first wireless link.

In some examples of the method, apparatuses, and non-transitory computer-readable medium described herein, performing the transmission on the first wireless link may include operations, features, means, or instructions for transmitting the at least the first portion of the message on the first wireless link according to the modified transmission parameter.

In some examples of the method, apparatuses, and non-transitory computer-readable medium described herein, modifying the transmission parameter may include operations, features, means, or instructions for reducing a first transmission power for the first wireless link to a reduced transmission power during the second time period, the modified transmission power including the reduced transmission power.

In some examples of the method, apparatuses, and non-transitory computer-readable medium described herein, modifying the transmission parameter may include operations, features, means, or instructions for selecting, for the at least the first portion of the message during the second time period, a resource unit that may be narrower than a bandwidth of the first wireless link, the modified transmission parameter including the selected resource unit.

In some examples of the method, apparatuses, and non-transitory computer-readable medium described herein, performing the transmission on the first wireless link may include operations, features, means, or instructions for transmitting the at least the first portion of the message on the first wireless link according to a short interframe spacing (SIFS) burst pattern.

In some examples of the method, apparatuses, and non-transitory computer-readable medium described herein, performing the CCA procedure on the second wireless link may include operations, features, means, or instructions for performing the CCA procedure during at least one SIFS of the SFIS burst pattern.

In some examples of the method, apparatuses, and non-transitory computer-readable medium described herein, performing the CCA procedure on the second wireless link may include operations, features, means, or instructions for performing the CCA procedure according to the modified CCA parameter.

In some examples of the method, apparatuses, and non-transitory computer-readable medium described herein, modifying the CCA parameter may include operations, features, means, or instructions for increasing a first energy detection threshold for the second wireless link during the first time period to an increased energy detection threshold during the second time period, the modified CCA parameter including the increased energy detection threshold.

Some examples of the method, apparatuses, and non-transitory computer-readable medium described herein may further include operations, features, means, or instructions for determining to transmit on the second wireless link during a third time period based on a clear result of the CCA procedure performed during the second time period, and transmitting, during the third time period according, at least a second portion of the message on the first wireless link and a third portion of the message on the second wireless link.

In some examples of the method, apparatuses, and non-transitory computer-readable medium described herein, the first wireless link includes the first wireless channel in a first radio frequency (RF) spectrum band, and the second wireless link includes a second wireless channel in the first RF spectrum band or a second RF spectrum band.

A method of wireless communication at a first wireless device is described. The method may include establishing a set of wireless links between the first wireless device and a second wireless device, the set of wireless links supporting parallel transmissions during a multi-link session and including at least a first wireless link and a second wireless link, configuring a first data unit including a first portion of a message to be transmitted on the first wireless link and a second data unit including a second portion of the message to be transmitted on the second wireless link, the first data unit and the second data unit scheduled to terminate at a same time, transmitting, to the second wireless device based on the configuring, the first data unit on the first wireless link and the second data unit on the second wireless link, and transmitting, to the second wireless device, a signal to solicit an acknowledgement or negative acknowledgement for the first data unit, or the second data unit, or a combination thereof.

An apparatus for wireless communication at a first wireless device is described. The apparatus may include a processor, memory in electronic communication with the processor, and instructions stored in the memory. The instructions may be executable by the processor to cause the apparatus to establish a set of wireless links between the first wireless device and a second wireless device, the set of wireless links supporting parallel transmissions during a multi-link session and including at least a first wireless link and a second wireless link, configure a first data unit including a first portion of a message to be transmitted on the first wireless link and a second data unit including a second portion of the message to be transmitted on the second wireless link, the first data unit and the second data unit scheduled to terminate at a same time, transmit, to the second wireless device based on the configuring, the first data unit on the first wireless link and the second data unit on the second wireless link, and transmit, to the second wireless device, a signal to solicit an acknowledgement or negative acknowledgement for the first data unit, or the second data unit, or a combination thereof.

Another apparatus for wireless communication at a first wireless device is described. The apparatus may include means for establishing a set of wireless links between the first wireless device and a second wireless device, the set of wireless links supporting parallel transmissions during a multi-link session and including at least a first wireless link and a second wireless link, configuring a first data unit including a first portion of a message to be transmitted on the first wireless link and a second data unit including a second portion of the message to be transmitted on the second wireless link, the first data unit and the second data unit scheduled to terminate at a same time, transmitting, to the second wireless device based on the configuring, the first data unit on the first wireless link and the second data unit on the second wireless link, and transmitting, to the second wireless device, a signal to solicit an acknowledgement or negative acknowledgement for the first data unit, or the second data unit, or a combination thereof.

A non-transitory computer-readable medium storing code for wireless communication at a first wireless device is described. The code may include instructions executable by a processor to establish a set of wireless links between the first wireless device and a second wireless device, the set of wireless links supporting parallel transmissions during a multi-link session and including at least a first wireless link and a second wireless link, configure a first data unit including a first portion of a message to be transmitted on the first wireless link and a second data unit including a second portion of the message to be transmitted on the second wireless link, the first data unit and the second data unit scheduled to terminate at a same time, transmit, to the second wireless device based on the configuring, the first data unit on the first wireless link and the second data unit on the second wireless link, and transmit, to the second wireless device, a signal to solicit an acknowledgement or negative acknowledgement for the first data unit, or the second data unit, or a combination thereof.

In some examples of the method, apparatuses, and non-transitory computer-readable medium described herein, transmitting the signal to solicit the acknowledgement may include operations, features, means, or instructions for transmitting a block acknowledgment request to solicit the acknowledgement for at least the first data unit and the second data unit.

Some examples of the method, apparatuses, and non-transitory computer-readable medium described herein may further include operations, features, means, or instructions for receiving a block acknowledgment in response to the transmitted block acknowledgment request.

Some examples of the method, apparatuses, and non-transitory computer-readable medium described herein may further include operations, features, means, or instructions for receiving, on the first wireless link in response to the transmitted signal, the acknowledgment or negative acknowledgement of the first data unit and the second data unit.

In some examples of the method, apparatuses, and non-transitory computer-readable medium described herein, transmitting the first data unit on the first wireless link and the second data unit on the second wireless link further may include operations, features, means, or instructions for transmitting at least a portion of the first data unit on the first wireless link during a first time period based on a result of a CCA procedure indicating that the first wireless link may be clear, and refraining from transmitting on the second wireless link during the first time period based on a result of the CCA procedure indicating that the second wireless link may be busy.

In some examples of the method, apparatuses, and non-transitory computer-readable medium described herein, the first wireless link includes the first wireless channel in a first RF spectrum band, and the second wireless link includes a second wireless channel in the first RF spectrum band or a second RF spectrum band.

In some examples of the method, apparatuses, and non-transitory computer-readable medium described herein, the first wireless link has a first primary channel and the second wireless link has a second primary channel.

A method of wireless communication at a first station is described. The method may include establishing a set of wireless links between the first station and a second station, the set of wireless links supporting parallel transmissions during a multi-link session and including at least a first wireless link and a second wireless link, receiving, from the second station, a configuration indicating that the first station may transmit a channel reservation signal to the second station prior to transmitting on the set of wireless links, transmitting, according to the received configuration, a channel reservation signal to the second station based on a result of a CCA procedure on the set of wireless links indicating a clear channel for the first wireless link, receiving a response to the channel reservation signal from the second station, and transmitting on the first wireless link and the second wireless link based on receiving the response to the channel reservation signal.

An apparatus for wireless communication at a first station is described. The apparatus may include a processor, memory in electronic communication with the processor, and instructions stored in the memory. The instructions may be executable by the processor to cause the apparatus to establish a set of wireless links between the first station and a second station, the set of wireless links supporting parallel transmissions during a multi-link session and including at least a first wireless link and a second wireless link, receive, from the second station, a configuration indicating that the first station may transmit a channel reservation signal to the second station prior to transmitting on the set of wireless links, transmit, according to the received configuration, a channel reservation signal to the second station based on a result of a CCA procedure on the set of wireless links indicating a clear channel for the first wireless link, receive a response to the channel reservation signal from the second station, and transmit on the first wireless link and the second wireless link based on receiving the response to the channel reservation signal.

Another apparatus for wireless communication at a first station is described. The apparatus may include means for establishing a set of wireless links between the first station and an second station, the set of wireless links supporting parallel transmissions during a multi-link session and including at least a first wireless link and a second wireless link, receiving, from the second station, a configuration indicating that the first station may transmit a channel reservation signal to the second station prior to transmitting on the set of wireless links, transmitting, according to the received configuration, a channel reservation signal to the second station based on a result of a CCA procedure on the set of wireless links indicating a clear channel for the first wireless link, receiving a response to the channel reservation signal from the second station, and transmitting on the first wireless link and the second wireless link based on receiving the response to the channel reservation signal.

A non-transitory computer-readable medium storing code for wireless communication at a first station is described. The code may include instructions executable by a processor to establish a set of wireless links between the first station and a second station, the set of wireless links supporting parallel transmissions during a multi-link session and including at least a first wireless link and a second wireless link, receive, from the second station, a configuration indicating that the first station may transmit a channel reservation signal to the second station prior to transmitting on the set of wireless links, transmit, according to the received configuration, a channel reservation signal to the second station based on a result of a CCA procedure on the set of wireless links indicating a clear channel for the first wireless link, receive a response to the channel reservation signal from the second station, and transmit on the first wireless link and the second wireless link based on receiving the response to the channel reservation signal.

In some examples of the method, apparatuses, and non-transitory computer-readable medium described herein, receiving the response to the channel reservation may include operations, features, means, or instructions for receiving the response on a soliciting wireless link, the second wireless link, or both.

In some examples of the method, apparatuses, and non-transitory computer-readable medium described herein, receiving the configuration may include operations, features, means, or instructions for receiving the configuration via a high efficiency operations element, an EHT operations element, an MLA operations element, or a combination thereof.

In some examples of the method, apparatuses, and non-transitory computer-readable medium described herein, the transmitted channel reservation request indicates a duration of a transmission opportunity.

In some examples of the method, apparatuses, and non-transitory computer-readable medium described herein, the received response to the channel reservation signal indicates a time duration for one or more additional stations to freeze a countdown.

In some examples of the method, apparatuses, and non-transitory computer-readable medium described herein, the first station is an access point serving the second station.

In some examples of the method, apparatuses, and non-transitory computer-readable medium described herein, the second station is an access point serving the first station.

A method of wireless communication at a second station is described. The method may include establishing a set of wireless links between the second station and a first station, the set of wireless links supporting parallel transmissions during a multi-link session and including at least a first wireless link and a second wireless link, transmitting, to the first station, a configuration indicating that the first station may transmit a channel reservation signal to the second station prior to transmitting on the set of wireless links, receiving, according to the received configuration, a channel reservation signal from the first station, transmitting, to the first station, a response to the channel reservation signal, and receiving communications from the first station on the first wireless link and the second wireless link based on the transmitted response to the channel reservation signal.

An apparatus for wireless communication at a second station is described. The apparatus may include a processor, memory in electronic communication with the processor, and instructions stored in the memory. The instructions may be executable by the processor to cause the apparatus to establish a set of wireless links between the second station and a first station, the set of wireless links supporting parallel transmissions during a multi-link session and including at least a first wireless link and a second wireless link, transmit, to the first station, a configuration indicating that the first station may transmit a channel reservation signal to the second station prior to transmitting on the set of wireless links, receive, according to the received configuration, a channel reservation signal from the first station, transmit, to the first station, a response to the channel reservation signal, and receive communications from the first station on the first wireless link and the second wireless link based on the transmitted response to the channel reservation signal.

Another apparatus for wireless communication at a second station is described. The apparatus may include means for establishing a set of wireless links between the second station and a first station, the set of wireless links supporting parallel transmissions during a multi-link session and including at least a first wireless link and a second wireless link, transmitting, to the first station, a configuration indicating that the station may transmit a channel reservation signal to the second station prior to transmitting on the set of wireless links, receiving, according to the received configuration, a channel reservation signal from the first station, transmitting, to the first station, a response to the channel reservation signal, and receiving communications from the first station on the first wireless link and the second wireless link based on the transmitted response to the channel reservation signal.

A non-transitory computer-readable medium storing code for wireless communication at a second station is described. The code may include instructions executable by a processor to establish a set of wireless links between the second station and a first station, the set of wireless links supporting parallel transmissions during a multi-link session and including at least a first wireless link and a second wireless link, transmit, to the first station, a configuration indicating that the station may transmit a channel reservation signal to the second station prior to transmitting on the set of wireless links, receive, according to the received configuration, a channel reservation signal from the first station, transmit, to the first station, a response to the channel reservation signal, and receive communications from the first station on the first wireless link and the second wireless link based on the transmitted response to the channel reservation signal.

Some examples of the method, apparatuses, and non-transitory computer-readable medium described herein may further include operations, features, means, or instructions for determining whether to transmit the response to the channel reservation signal based on identifying: downlink transmissions scheduled to be transmitted on the second wireless link; or uplink transmissions being received by the second station from a second station on the second wireless link; or the second station having transmitted a response to a channel reservation request from a second third station on the first wireless link or the second wireless link; or uplink transmissions being received by the AP second station from a second third station on the first wireless link, the second third station hidden from the first station; or a combination thereof.

In some examples of the method, apparatuses, and non-transitory computer-readable medium described herein, transmitting the configuration may include operations, features, means, or instructions for transmitting the configuration via a high efficiency operations element, an EHT operations element, an MLA operations element, or a combination thereof.

In some examples of the method, apparatuses, and non-transitory computer-readable medium described herein, the received channel reservation request indicates a duration of a transmission opportunity.

In some examples of the method, apparatuses, and non-transitory computer-readable medium described herein, the transmitted response to the channel reservation signal indicates a time duration for one or more additional stations to freeze a countdown.

In some examples of the method, apparatuses, and non-transitory computer-readable medium described herein, the first station is an access point serving the second station; or the second station is an access point serving the first station.

A method of wireless communication at a first wireless device is described. The method may include establishing a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device, identifying one or more data units to be transmitted on the set of wireless links, performing, by the first MAC entity, a CCA procedure on the first wireless link, performing, by the second MAC entity, the CCA procedure on the second wireless link, generating at least one physical layer convergence protocol (PLCP) protocol data unit (PPDU) from the identified one or more data units based on a result of the performed CCA procedure on the first wireless link and the performed CCA procedure on the second wireless link, and transmitting the generated at least one PPDU on the first wireless link, or the second wireless link, or a combination thereof.

An apparatus for wireless communication at a first wireless device is described. The apparatus may include a processor, memory in electronic communication with the processor, and instructions stored in the memory. The instructions may be executable by the processor to cause the apparatus to establish a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device, identify one or more data units to be transmitted on the set of wireless links, perform, by the first MAC entity, a CCA procedure on the first wireless link, perform, by the second MAC entity, the CCA procedure on the second wireless link, generate at least one physical layer convergence protocol (PLCP) protocol data unit (PPDU) from the identified one or more data units based on a result of the performed CCA procedure on the first wireless link and the performed CCA procedure on the second wireless link, and transmit the generated at least one PPDU on the first wireless link, or the second wireless link, or a combination thereof.

Another apparatus for wireless communication at a first wireless device is described. The apparatus may include means for establishing a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device, identifying one or more data units to be transmitted on the set of wireless links, performing, by the first MAC entity, a CCA procedure on the first wireless link, performing, by the second MAC entity, the CCA procedure on the second wireless link, generating at least one physical layer convergence protocol (PLCP) protocol data unit (PPDU) from the identified one or more data units based on a result of the performed CCA procedure on the first wireless link and the performed CCA procedure on the second wireless link, and transmitting the generated at least one PPDU on the first wireless link, or the second wireless link, or a combination thereof.

A non-transitory computer-readable medium storing code for wireless communication at a first wireless device is described. The code may include instructions executable by a processor to establish a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device, identify one or more data units to be transmitted on the set of wireless links, perform, by the first MAC entity, a CCA procedure on the first wireless link, perform, by the second MAC entity, the CCA procedure on the second wireless link, generate at least one physical layer convergence protocol (PLCP) protocol data unit (PPDU) from the identified one or more data units based on a result of the performed CCA procedure on the first wireless link and the performed CCA procedure on the second wireless link, and transmit the generated at least one PPDU on the first wireless link, or the second wireless link, or a combination thereof.

In some examples of the method, apparatuses, and non-transitory computer-readable medium described herein, generating the at least one PPDU may include operations, features, means, or instructions for generating a first PPDU from at least a first portion of the identified one or more data units from the first MAC entity, and generating a second PPDU from at least a second portion of the identified one or more data units from the second MAC entity, and transmitting the at least one PPDU may include operations, features, means, or instructions for transmitting the first PPDU on the first wireless link and the second PPDU on the second wireless link.

In some examples of the method, apparatuses, and non-transitory computer-readable medium described herein, the first wireless link may have a first primary channel and the second wireless link may have a second primary channel.

In some examples of the method, apparatuses, and non-transitory computer-readable medium described herein, generating the at least one PPDU may include operations, features, means, or instructions for generating a single PPDU from one data unit from the first MAC entity or one data unit from the second MAC entity, and transmitting the at least one PPDU may include operations, features, means, or instructions for transmitting a first portion of the single PPDU on a first resource unit of the first wireless link and a second portion of the single PPDU on a second resource unit of the second wireless link.

In some examples of the method, apparatuses, and non-transitory computer-readable medium described herein, generating the at least one PPDU may include operations, features, means, or instructions for generating a single PPDU from one data unit from the first MAC entity and one data unit from the second MAC entity, and transmitting the at least one PPDU may include operations, features, means, or instructions for transmitting a first portion of the single PPDU on a first resource unit of the first wireless link and a second portion of the single PPDU on a second resource unit of the second wireless link.

In some examples of the method, apparatuses, and non-transitory computer-readable medium described herein, generating the at least one PPDU may include operations, features, means, or instructions for generating a single PPDU from a set of data units from the first MAC entity or a set of data units from the second MAC entity, and transmitting the at least one PPDU may include operations, features, means, or instructions for transmitting a first portion of the single PPDU on a first resource unit of the first wireless link and a second portion of the single PPDU on a second resource unit of the second wireless link.

Some examples of the method, apparatuses, and non-transitory computer-readable medium described herein may further include operations, features, means, or instructions for transmitting at least one traffic indication mapping (TIM) element in a TIM signal, the at least one TIM element including an indicator that the second wireless device will be served on the first wireless link, or the second wireless link, or a combination thereof.

In some examples of the method, apparatuses, and non-transitory computer-readable medium described herein, the at least one TIM element indicates a single association identifier for the second wireless device, an index of the at least one TIM element indicating the first wireless link, or the second wireless link, or the combination thereof.

In some examples of the method, apparatuses, and non-transitory computer-readable medium described herein, the at least one TIM element indicates pending uplink or downlink transmission for the second wireless device on the first wireless link, on the second wireless link, or a combination thereof, based at least in part on a set of association identifiers.

In some examples of the method, apparatuses, and non-transitory computer-readable medium described herein, multiple resource units are allocated for the first wireless device to transmit to the second wireless device, and the at least one PPDU includes a punctured multi-user PPDU Some examples of the method, apparatuses, and non-transitory computer-readable medium described herein may further include operations, features, means, or instructions for receiving a trigger frame comprising a first user field associated with the first wireless link and a second user field associated with the second wireless link, wherein transmitting the generated at least one PPDU is based at least in part on receiving the trigger frame.

In some examples of the method, apparatuses, and non-transitory computer-readable medium described herein, a location of a set of resource units allocated to the first wireless device may be based on a set of association identifiers, where the set of resource units are located on the first wireless link, the second wireless link, or a combination thereof.

BRIEF DESCRIPTION OF THE DRAWINGS

FIG. 12 illustrates an example of single PPDU configurations that support design considerations for multi-link aggregation in accordance with aspects of the present disclosure.

DETAILED DESCRIPTION

Figure 1:
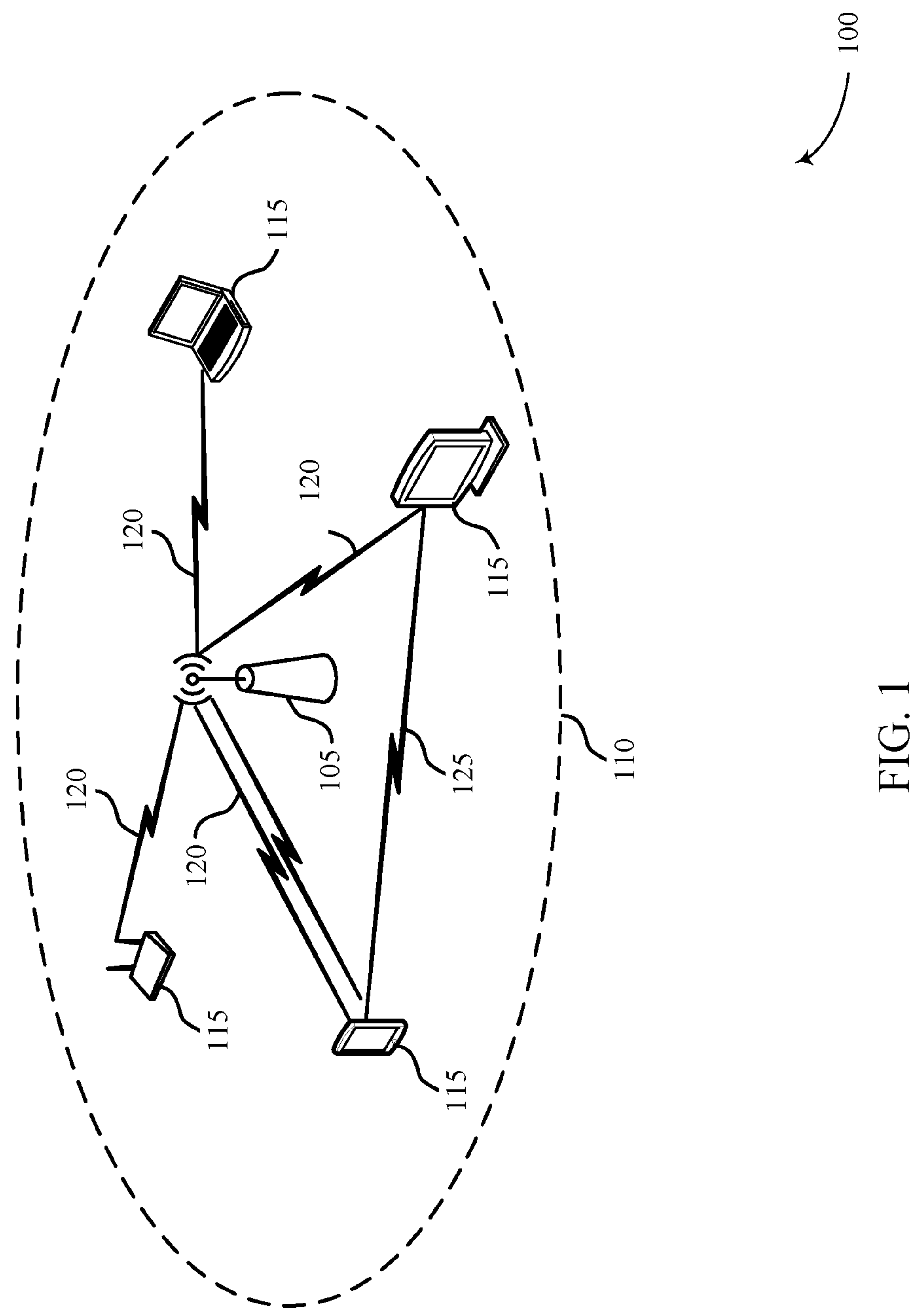
FIG. 1 illustrates an example of a system for wireless communications that supports design considerations for multi-link aggregation in accordance with aspects of the present disclosure.

Some wireless communications systems may support multiple parallel links between communicating devices (e.g., to increase throughput). A wireless link may refer to a communication path between devices, and each link may support one or more channels or logical entities that support multiplexing of data, such that during at least some duration of time, transmissions or portions of transmission may occur over both links concurrently, either synchronously, or asynchronously. Such parallel communications, while benefiting the system in terms of throughput, may increase the complexity of the system. As an example, two devices (e.g., a station (STA) and an access point (AP), two STAs, etc.) may communicate over two or more adjacent links. As used herein, the term "adjacent" in reference to links may be used to convey relative proximity in frequency. The links may in some cases be separated from each other (e.g., may not be contiguous in frequency) without deviating from the scope of the disclosure. For example, the links may be separated by a number of subcarriers, which may include guard bands, subchannels, channels, and so on.

Because of the proximity of adjacent links, communications over a first channel of a first wireless link may interfere with communications over a second channel of a second wireless link. A wireless device may first perform a clear channel assessment (CCA) procedure to check if another device has claimed the transmission medium. The CCA procedure may include preamble detection. The wireless device may also or alternatively perform an energy detection (ED) check as part of the CCA procedure that checks the medium for transmission power below an ED threshold. If either the preamble detection or the ED check fail, because a preamble is detected or the measured energy is above the ED threshold, the wireless device may refrain from attempting to gain control of the link. As an example, a transmission associated with the first channel may be associated with a given power spectral density. In some cases, some of the signal power associated with the transmission may leak into the second channel (e.g., signal processing at the devices may not be sufficient to ensure complete separation of the channels). In such cases, the signal may represent an example of adjacent channel interference (ACI), which may negatively impact the system. For example, a device may sense the leaked signal power on the adjacent channel and refrain from transmitting based on mistakenly assuming that the channel is not idle.

Wireless devices described herein, such as STAs and APs, may implement techniques to ameliorate ACI-related issues. These techniques may be implemented to detect or prevent ACI-related issues for aggregating adjacent links, which are close-by in frequency. In a first example, a STA may reduce transmission power of a first link which may lessen the impact of ACI on a second, adjacent link. The transmission power of the first link may be set to a value such that a measurement of the ACI to the second link is below an ED threshold and does not (e.g., by itself) prevent transmission of the STA on the second link. In a second example, a STA may utilize short interframe space (SIFS) transmission bursting with regular sampling. Between transmission bursts (e.g., in a SIFS period of silence from transmission on the first link), the second link may be checked for idle status. If the STA detects that the second link is idle during the SIFS period, then the wireless device may aggregate the second link with the first link, as the second link may be available for transmission. In a third example, a STA may adjust the CCA of the second link. For example, the STA may adjust a CCA threshold of the second to compensate for any additional signal (e.g., leading to ACI) due to a transmission on the adjacent, first in-band link. Though described with reference to a STA, these techniques can also be used by an AP or other wireless device capable of multilink aggregation.

In some cases, ACI may be induced due to concurrent transmission and reception (e.g., assuming that wireless communications system supports half-duplex communications). Generally, a transmission by a STA on a first link may affect reception at the STA on an adjacent, second link. Wireless devices described herein may also implement techniques to reduce ACI-related issues based on concurrent or simultaneous transmission and reception. In a first example, the STA and a serving AP may manage control response transmission. For example, while a transmission on a first link is active, a recipient STA may not transmit (e.g., by determining to refrain from transmitting) a control response on a second, adjacent link to the transmitting STA. The STAs may utilize a mechanism to defer a control response, such as a block acknowledgment, on the second, adjacent link. For example, the STA and serving AP may implement techniques to terminate both transmissions on the two links at the same or substantially the same time. Once the STA is finished transmitting on all of the links of the multilink aggregation, the STA may solicit a return transmission from the recipient AP (e.g., by transmitting a block acknowledgment request (BAR)), and the AP may respond with the return transmission (e.g., a block acknowledgment (BA)) on one or both of the links.

Aspects of the disclosure are initially described in the context of a wireless communications system. Aspects of the disclosure are further illustrated by and described with reference to apparatus diagrams, system diagrams, and flowcharts that relate to design considerations for multi-link aggregation when the channels are in close proximity FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistants (PDAs), other handheld devices, netbooks, notebook computers, tablet computers, laptops, display devices (e.g., TVs, computer monitors, etc.), printers, etc. The AP 105 and the associated STAs 115 may represent a basic serving set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11az, 802.11ba, 802.11be, etc. In other implementations, peer-to-peer connections or ad hoc networks may be implemented within WLAN 100. Devices in WLAN 100 may communicate over unlicensed spectrum, which may be a portion of spectrum that includes frequency bands used by Wi-Fi technology, such as the 5 Gigahertz (GHz) band, the 6 GHz band, the 2.4 GHz band, the 60 GHz band, the 3.6 GHz band, and/or the 900 MHz band. The unlicensed spectrum may also include other frequency bands.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., carrier-sense multiple access (CSMA)/collision avoidance (CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This exchange may alert other devices within range of the sender and receiver not to transmit for the duration of the primary transmission. Thus, RTS/CTS handshake may help mitigate a hidden node problem.

In a system supporting multi-link aggregation (which may also be referred to as multichannel aggregation), some of the traffic associated with a single STA 115 may be transmitted across multiple parallel communication links 120 (which may also be referred to as "links" herein). Multi-link aggregation may thus provide a means to increase network capacity and maximize the utilization of available resources. In some cases, each communication link 120 for a given wireless device may be associated with a respective radio of the wireless device (e.g., where a radio comprises transmit/receive chains, physical antennas, signal processing components, etc.). Multi-link aggregation may be implemented in a number of ways. As a first example, the multi-link aggregation may be referred to as packet-based. In packet-based aggregation, frames of a single traffic flow (e.g., all traffic associated with a given traffic identifier (TID)) may be sent concurrently across multiple communication links 120 (e.g., on multiple channels). In some cases, the multiple communication links 120 may operate in the same radio frequency (RF) spectrum band (e.g., each link may be in the 5 GHz band, and use channels in the 5 GHz band). In other cases, the multiple communication links 120 may be in different RF spectrum bands (e.g., one may be in the 2.4 GHz band while another is in the 5 GHz band or the 6 GHz band). Each link may be associated with a different physical layer (PHY) and lower MAC layer, as further described with reference to FIG. 10. In such an implementation, some management of the aggregation of the separate communication links 120 may be performed at a higher MAC layer. In some implementations, the lower MAC layers may exchange certain management information between them, between a lower MAC layer and a corresponding PHY layer, or between a lower MAC layer and a PHY layer corresponding to a different lower MAC layer. The multi-link aggregation implemented at the lower MAC layers and PHY layers may be transparent to the upper layers of the wireless device.

As another example, the multi-link aggregation may be referred to as flow-based. In flow-based aggregation, each traffic flow (e.g., all traffic associated with a given TID) may be sent using one of multiple available communication links 120. As an example, a single STA 115 may access a web browser while streaming a video in parallel. The traffic associated with the web browser access may be communicated over a first channel of a first communication link 120 while the traffic associated with the video stream may be communicated over a second channel of a second communication link 120 in parallel (e.g., at least some of the data may be transmitted on the first channel concurrent with data transmitted on the second channel). In some examples, the transmissions on the first communication link 120 and the second communication link 120 may be synchronized. In other examples, the transmissions may be asynchronous. As described above, the channels may belong to the same RF band or to different RF bands. In the case of more than two communication links 120 (e.g., three links), all three may support operation over the same RF band, two but not the third may support operation over the same RF band, or each link may support operation for a separate RF band. In some cases, flow-based aggregation may not use cross-link packet scheduling and reordering (e.g., which may be used to support packet-based aggregation). Alternatively, in the case of a single flow (e.g., in the case that the STA 115 simply attempts to access a web browser), aggregation gain may not be available.

In other embodiments, a hybrid of flow-based and packet-based aggregation may be employed. As an example, a device may employ flow-based aggregation in situations in which multiple traffic flows are created and may employ packet-based aggregation in other situations. The decision to switch between multi-link aggregation techniques (e.g., modes) may additionally or alternatively be based on other metrics (e.g., a time of day, traffic load within the network, battery power for a wireless device, etc.).

To support the described multi-link aggregation techniques, APs 105 and STAs 115 may exchange supported aggregation capability information (e.g. supported aggregation type, supported frequency bands, etc.). In some cases, the exchange of information may occur via a beacon signal, a probe request or probe response, an association request or an association response frame, dedicated action frames, an operating mode indicator (OMI), operations element (e.g., a high-efficiency (HE) operations information element (IE)) etc. In some cases, an AP 105 may designate a given channel in a given band as an anchor channel (e.g., the channel on which it transmits beacons and other management frames). In this case, the AP 105 may transmit beacons (e.g., which may contain less information) on other channels for discovery purposes. In some cases, each wireless link may have its own primary channel/subchannel of a number of channels/subchannels of the wireless link. Although described as being frequency-based, the anchor channel could additionally or alternatively refer to a point in time (e.g., an AP 105 may transmit its beacon at a certain time on one or more channels).

In some examples, in multi-link aggregation, each link may use its own transmit queue. In other examples, a common transmit queue may be used. In some examples, each link may have a unique transmitter address (TA) and receiver address (RA). In other examples, the TA and RA may be common across the multiple links used for multi-link aggregation. In other examples, one or more of a sequence number (SN), frame number (FN), and/or packet number (PN) may be common across the communication links. Other items that may be common across links include encryption keys, MAC packet data unit (MPDU) generation and/or encryption, aggregated MAC service data unit (AM-SDU) constraints, fragment size, and reordering, replay check, and/or de-fragmentation techniques. In other examples, encryption keys may be per-link.

In some examples, multi-link aggregation may use multiple sequence numbers. In other examples, aggregation may be performed over non-co-located APs. In some examples, power may be saved by idling unused channels or links of the multi-link aggregation scheme. A STA 115 may then monitor a non-idled link (e.g., an anchor link), reserved for receiving information regarding data to be received on the various links.

In various examples, block acknowledgements (BAs) may be sent in response to multi-link transmissions. For example, a BA session may refer to sending an acknowledgment (ACK) for multiple MPDUs sent together (e.g., an ACK for a block of MPDUs). Both the transmitting device (e.g., the device requesting the BA) and the receiving device (e.g., the device transmitting the BA) may maintain a sliding window (e.g., a BA window), and may have previously negotiated the size of the BA. For example, a BA session may have a BA size of 64 MPDUs (e.g., other BA size examples may include 256 MPDUs, 1024 MPDUs, etc.). In such cases, a transmitting device may transmit 64 MPDUs followed by a block acknowledgment request (BAR). In response to the BAR, the receiving device may, upon reception of the 64 MPDUs and the BAR, transmit a BA to the transmitting device. The BA may indicate whether all 64 MPDUs were received correctly, which MPDUs are missing, etc. In some cases, a BA may be used to indicate the longer BA window, or a capability exchange or agreement defining the larger BA window may also be sent. In other examples, a single SN may be used, but with multiple scorecards (e.g., one per channel or link), or with a global as well as per-link scorecards. Multi-link aggregation (e.g., flow-based and/or packet-based) may increase network capacity by efficiently allocating utilization of multiple links (and multiple channels).

In either case (e.g., flow-based or packet-based aggregation), transmissions across a first channel of a first communication link 120 may interfere with transmissions across a second channel of a second communication link 120. Techniques described herein may be used to alleviate issues caused by such adjacent channel interference. For example, a wireless device (e.g., a STA 115) may identify a parameter value to be used in a channel access procedure for one or both of the adjacent channels based at least in part on a presence of the other channel. For example, the parameter value may be based on a proximity in frequency of the channels, an antenna separation at the wireless device, etc. In some cases, the parameter value may influence a timing of the channel access procedure and/or a channel availability threshold to be used during the channel access procedure.

Figure 2:
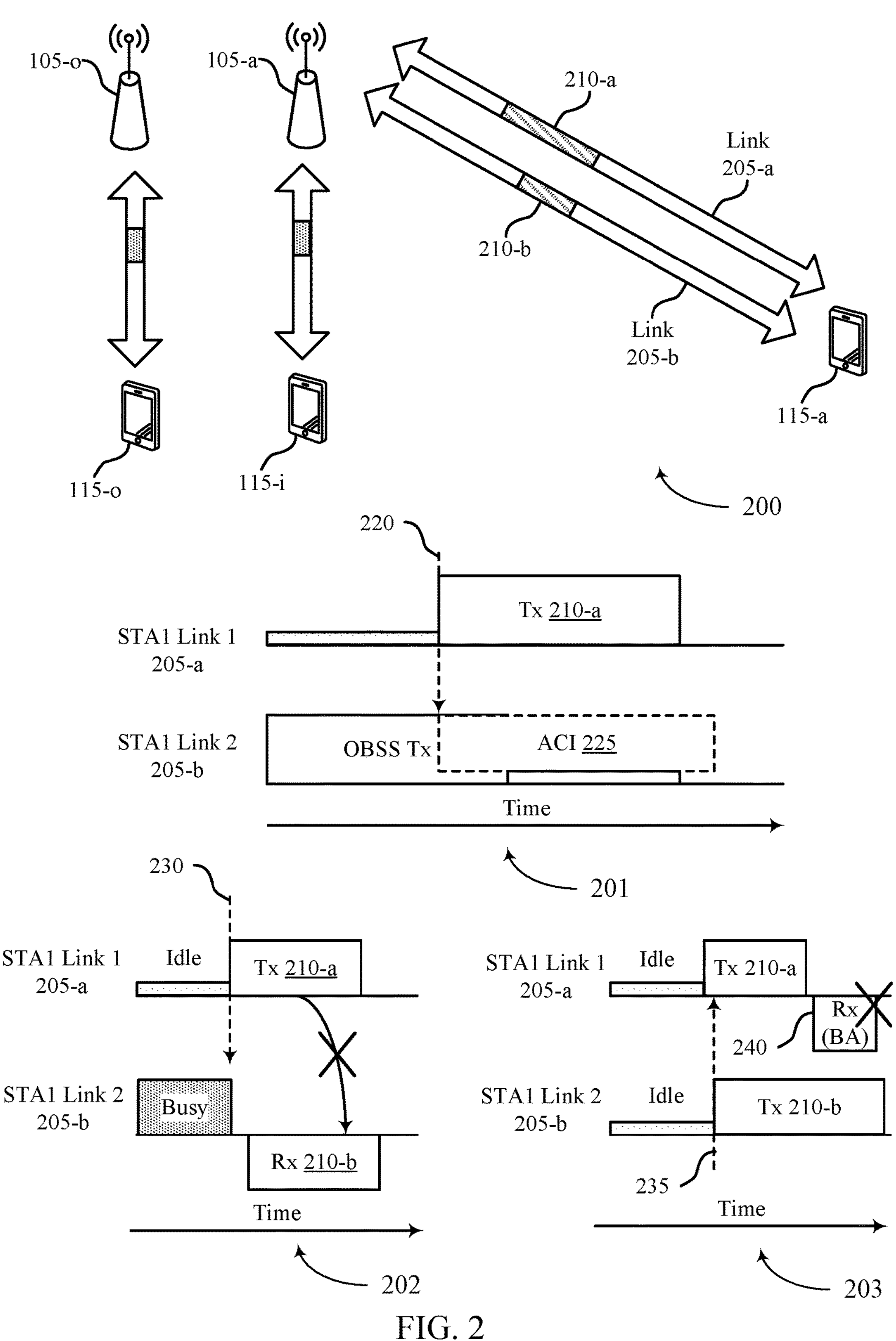
FIG. 2 illustrates an example of a WLAN that supports design considerations for multi-link aggregation in accordance with aspects of the present disclosure.

FIG. 2 illustrates an example of WLAN 200 that supports design considerations for multi-link aggregation (e.g., when the channels are in close proximity) in accordance with aspects of the present disclosure. In some examples, WLAN 200 may implement aspects of wireless communication system 100. A wireless connection between AP 105-*a* and STA 115-*a* may be referred to as a link 205 (a communication link), and each link may include one or more channels. As an example, WLAN 200 may support multi-link aggregation such that AP 105-*a* and STA 115-*a* may communicate in parallel over two or more links (e.g., link 205-*a* and link 205-*b*). STA 115-*a* may thus receive packets (e.g., MPDUs) over both link 205-*a* and link 205-*b* from AP 105-*a*. Such parallel communications over the two or more links may be synchronized (e.g., simultaneous) or unsynchronized (e.g., asynchronous), and may be uplink, or downlink, or a combination of uplink and downlink during a particular duration of time.

Such multi-link aggregation may provide multiple benefits to WLAN 200. For example, multi-link aggregation may improve user perceived throughput (UPT) (e.g., by quickly flushing per-user transmit queues). Similarly, multi-link aggregation may improve throughput for WLAN 200 by improving utilization of available channels (e.g., by increasing trunking gains). Networks that do not support multi-link aggregation may experience under-utilization of spectrum in non-uniform (e.g., bursty) traffic conditions. However, multi-link aggregation may increase spectral utilization (e.g., may increase the bandwidth-time product). Further, multi-link aggregation may enable smooth transitions between multi-band radios (e.g., where each radio may be associated with a given RF band) and/or enable a framework to setup separation of control channels and data channels. Other benefits of multi-link aggregation include reducing the ON time of a modem, which may benefit a wireless device in terms of power consumption (e.g., though the final power-saving gains may in some cases depend on other factors including processing requirements, RF bandwidth, etc.). Another benefit of multi-link aggregation is the increased multiplexing opportunities in the case of a single BSS. That is, multi-link aggregation may increase the number of users per multiplexed transmission served by the multi-link AP 105-*a*.

However, multi-link aggregation may also have implementation challenges. One such issue arises with use of in-band aggregation (e.g., which may be used to refer to aggregation of links 205 that are proximal or near in frequency, such as two links 205 in the lower 5 GHz band). It is to be understood that "in-band aggregation" may in some cases be used to refer to aggregation of links that are not necessarily in the same band but are otherwise close enough in frequency (e.g., experience ACI) that the described techniques still apply. For example, such techniques may apply where bands are sufficiently close to trigger detectable (e.g., a measured energy value above a threshold energy) amount of ACI across the bands. An issue present for in-band aggregation is that of induced ACI. For example, as shown by a first ACI scenario 201, a transmission 210-*a* over a channel supported by link 205-*a* may induce ACI 225 on an adjacent channel supported by link 205-*b*. Accordingly, transmission 210-*b* may be unnecessarily delayed because the adjacent channel is incorrectly perceived to be busy starting at time 220. Such complications may lead to lost transmission opportunities and associated reductions in throughput for WLAN 200. That is, in some cases parallel transmissions from a wireless device (e.g., STA 115-*a*) may conflict such that the device's collision avoidance procedures result in decreased UPT.

In some cases, ACI may be induced due to parallel transmission and reception (e.g., assuming that WLAN 200 supports half-duplex communications). As shown in the second ACI scenario 202, an on-going transmission 210-*a* beginning at time 230 on link 205-*a* may cause ACI which impacts the ability of a device (e.g., the transmitting device or another device) to receive a transmission 210-*b* over link 205-*b*.

In a third ACI scenario 203, a response 240 (e.g., a BA) transmitted upon reception of transmission 210-*a* may experience interference with a transmission 210-*b* beginning at time 235 on link 205-*b*. It is to be understood that the ACI examples illustrated with reference to WLAN 200 are included for the sake of explanation. Other ACI causes are considered within the scope of the present disclosure, and all three of the illustrated ACI causes may not be present to experience the benefits of the described techniques.

In accordance with aspects of the present disclosure, techniques that address induced ACI are considered. While aspects of the following are described as uplink (e.g., or downlink) transmissions, it is to be understood that the described techniques may apply to transmissions in either direction, or both directions. In some examples, the transmissions 210-*a* and 210-*b* are a combination of uplink and downlink during a particular duration of time on a single link (e.g., link 205-*a*), this may be referred to herein as full duplexing on a single link. For example, a full duplex capable STA 115-*a* may transmit uplink and receive downlink concurrently on a single link (e.g., link 205-*a*). In some cases, when a single link is using full duplexing, the single link may appear to operate as two links because of the concurrent uplink and downlink transmissions. Full duplexing on a single link may include each duplex link utilizing the full operating bandwidth or being on different subchannels, or using different resource units within the operating bandwidth, for example, depending on the radio frequency filtering capabilities of one or more of the wireless devices. In particular, resources (e.g., subchannels or resource units) for uplink may be closer together (or overlapping) in frequency to resources (e.g., subchannels or resource units) for downlink transmissions where the wireless devices have relatively better radio frequency filtering, while further spacing in frequency may be used for relatively worse or less effective radio frequency filtering. The techniques described herein may be applied to half-duplex communications or full-duplex communications.

In a first example of mitigating the induced CCA-busy problem, a STA 115 configured for multi-link aggregation may reduce a transmission power on a first, initiating link 205 to lessen the impact of ACI on a second, adjacent link 205. The STA 115 may reduce the signal strength such that the ACI caused to the second link is below an ED threshold. In a second example, a STA 115 may implement SIFS bursting on the first link 205 with regular sampling on the adjacent, second link 205. The STA 115 may check (e.g., perform measurements on) the transmission medium on the second link 205 during periods of silence from the first link 205 (e.g., when the STA 115 is not transmitting on the first link 205 between the SIFS bursts). If the transmission medium is detected as idle, the STA 115 may begin using the second link 205. In a third example, a STA 115 may adjust a CCA threshold on the second, adjacent link 205 to compensate for any additionally detected signal from the adjacent, first link 205.

As an example, STA 115-*a* may implement any one or more of the techniques described above to distinguish interference caused by its own transmission from interference which may be caused by a STA 115 from another basic service set. For example, STA 115-*o* may be served by AP 105-*o*, and a transmission from STA 115-*o* (e.g., to AP 105-*o*) may be detectable at STA 115-*a*. The transmission (e.g., an overlapping BSS (OBSS) transmission) may cause interference to one of the links 205. STA 115-*a* may implement the above techniques to be able to detect interference caused by STA 115-*o* while filtering out interference caused by ACI.

Additional, or alternative, techniques for ameliorating ACI-related issues based on simultaneous transmission and reception may include silencing transmission from other STAs 115 in the BSS (In-BSS transmissions). A first STA 115 may be configured for multilink aggregation and be transmitting on a first link 205. The first STA 115 may wait for an OBSS transmission to end before transmitting on a second link 205. However, in some cases, a second STA 115 in the BSS may gain control of the transmission medium corresponding to the second link 205 before the first STA 115. To prevent this, the devices in the wireless communications system may implement in-BSS silencing. For example, each STA 115 in the BSS may precede transmission with an RTS. When two adjacent links are close-by, the AP 105 may act as an arbitrator in determining which links are used by which STAs 115, since any STA 115 within a BSS may receive transmissions from the AP 105. The AP 105 may then determine which STAs 115 will transmit on which links after receiving an RTS from each STA 115 within the BSS attempting to acquire a link on the transmission medium. The AP 105 may then transmit a CTS to a STA 115, which may indicate that the STA 115 can transmit on the corresponding link. In this way, the AP 105 may assist in facilitating multi-link aggregation for STAs 115 in the BSS. In some cases, silencing transmission for STAs 115 in the BSS may include freezing a countdown for other multi-link aggregation capable STAs 115 in the BSS. If the countdown of these STAs 115 is frozen, the STAs 115 may not be able to gain control of the transmission medium before the first STA 115.

In an example, STA 115-*a* and STA 115-*i* may be in the same BSS served by AP 105-*a*. STA 115-*a* may begin transmission 210-*a* on link 205-*a*, but STA 115-*a* may be unable to begin transmission 210-*b* on link 205-*b* until an OBSS transmission has ended. Once the OBSS transmission has ended, STAs 115 in that BSS, such as STA 115-*i*, may attempt to gain control of link 205-*b*. STA 115-*a* may implement techniques to prevent STA 115-*i* from gaining control of link 205-*b* once STA 115-*a* has begun transmission 210-*a* on link 205-*a*. For example, STA 115-*a* may implement one of the techniques described above, such as preceding transmission 210-*a* with an RTS.

In some cases, the parallel communication may be synchronized. For example, AP 105-*a* may coordinate target wake times (TWTs) to synchronize the uplink and downlink transmissions. The synchronization of parallel communications may be across links and may include an offset of communications on different links or the communications may overlap. For example, transmissions 210-*a* and 210-*b* may overlap in time. In the case where transmission 210-*a* may be a downlink data transmission and at least a portion of transmission 210-*b* may be a response (e.g., an acknowledgement) to transmission 210-*a*, overlapping communication may provide a live feedback scheme. In some cases, a smaller link, which may also be referred to as a narrow link, may be used for feedback to provide a reliable transmission and extended transmission range.

Further techniques are described herein for generating a PPDU in a multi-link aggregation scheme. The techniques may be applicable for unsynchronized systems and synchronized systems. A BSS may support unsynchronized multi-link aggregation when links are spread far apart in frequency, such that these links are less likely to cause or experience ACI. If links are close in frequency, the BSS may implement a synchronized system so that channel access is generally coordinated through a primary channel. Synchronizing the transmissions may reduce the induced CCA-busy problem and ACI-related issues. In the synchronized system, a wireless device may generate separate PPDUs for the links or generate a single PPDU, where a preamble of the single PPDU indicates an RU assignment for each link. In a first example of generating a single PPDU, the wireless device may generate a single PSDU from one MAC entity. In a second example, the wireless device may generate multiple PSDUs at a corresponding MAC entity (e.g., utilizing multiple, lower MAC entity). In a third example, the wireless device may generate multiple PSDUs from a single MAC entity. Additional techniques and examples of PPDU generation are described herein, for example in FIGS. 10 through 25.

Figure 3:
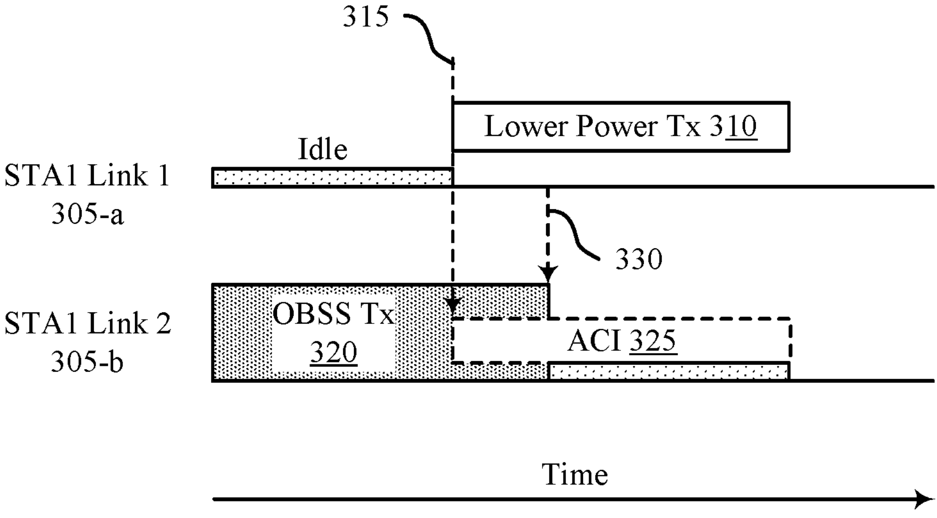
FIGS. 3 through 9 illustrate examples of transmission schemes that support design considerations for multi-link aggregation in accordance with aspects of the present disclosure.

FIG. 3 illustrates an example of a transmission scheme 300 that supports design considerations for multi-link aggregation in accordance with aspects of the present disclosure. In some examples, transmission scheme 300 may implement aspects of wireless communication system 100.

For example, transmission scheme 300 may apply to a multi-link session between two devices (e.g., an AP 105 and a STA 115). Accordingly, link 305-*a* and link 305-*b* may be examples of the links described above (e.g., communication link 120 described with reference to FIG. 1). In aspects of the present example, links 305-*a* and 305-*b* may support operation over adjacent channels (e.g., each link 305 may be associated with a given RF band). As described above, in some cases each link 305 may be associated with a respective radio of a given wireless device. Alternatively, the links 305 may be associated with the same radio. Thus, while aspects of the following are described as being performed by a wireless device, it is to be understood that separate components of the wireless device may in some cases perform the described techniques for each link 305. The transmission scheme 300 may support techniques for reducing ACI in a multi-link aggregation scheme.

For example, the wireless device may gain access to a channel supported by link 305-*a* at 315 and begin transmitting a low power transmission 310. The wireless device may detect an OBSS transmission 320 at 315 on the second link 305-*b*, so the wireless device may not be able to begin transmitting on the second link 305-*b* at 315. The low power transmission 310 may cause some slight ACI 325 to the second link 305-*b* starting at 315. However, the lower power transmission 310 may be transmitted with a reduced transmission power such that the transmission 310 is below an ED threshold at the second link 305-*b*. Therefore, when the OBSS transmission 320 stops at 330, the wireless device may be able to begin transmitting on the second link 305-*b*. By reducing the transmission power on the first link 305-*a*, the ACI 325 affecting the second link 305-*b* may not be great enough (e.g., have a strong enough signal strength) to prevent the wireless device from transmitting on the second link 305-*b*. In some cases, the transmission power may be reduced by assigning a narrow resource unit (RU). In some cases, a narrow link RU may be used in the case of a far-off client (e.g., another wireless device). These techniques may assist a wireless device in distinguishing its own transmissions from transmissions of a wireless device in an OBSS. Accordingly, the wireless device may avoid transmission interruptions or delays from ACI.

The wireless device may be configured to transmit with a reduced transmission power for a certain duration. For example, once the wireless device gains access to the first link 305-*a*, the wireless device may transmit on the first link 305-*a* using a reduce transmission power for a certain time period or duration. If the second link 305-*b* is still unavailable after the time period or duration expires, the wireless device may refrain from utilizing the second link 305-*b* in the multi-link aggregation scheme. In some cases, the wireless device may instead just use the first link 305-*a*, for example using a regular transmission power (e.g., not using the reduced transmission power or narrow RU).

Figure 4:
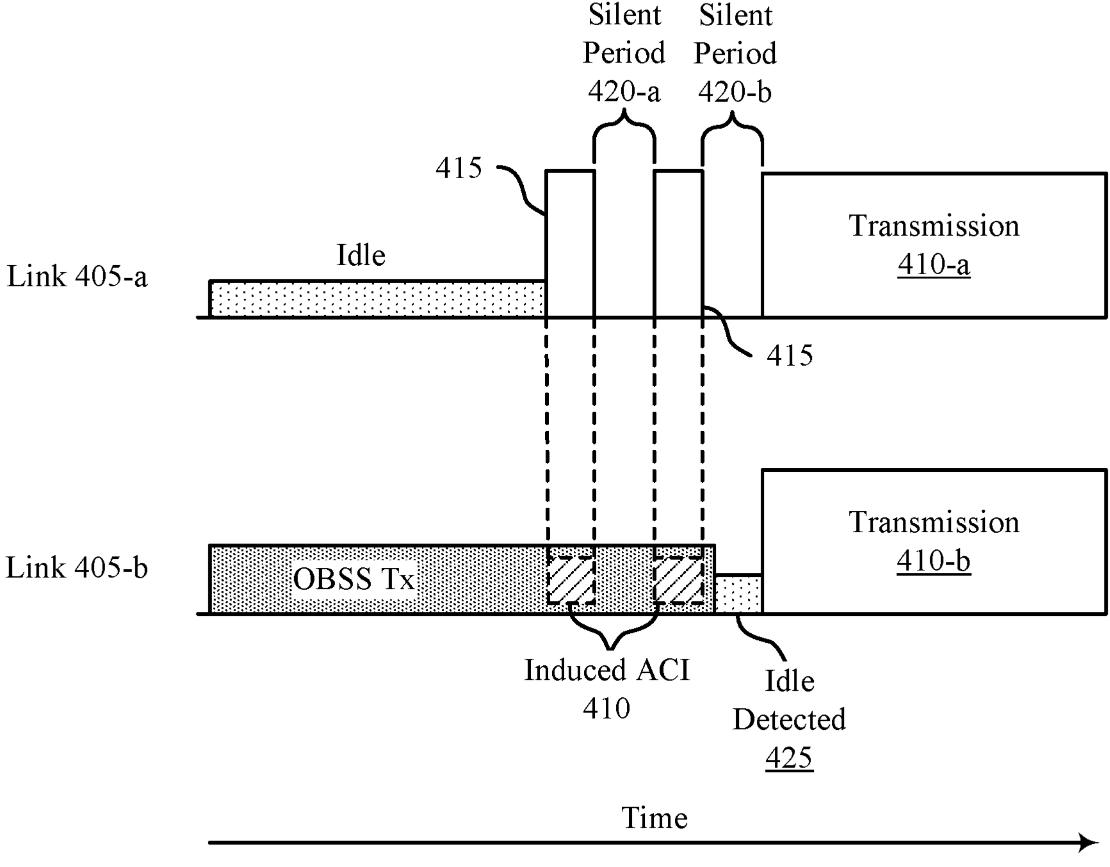

FIG. 4 illustrates an example of a transmission scheme 400 that supports design considerations for multi-link aggregation in accordance with aspects of the present disclosure. In some examples, transmission scheme 400 may implement aspects of wireless communication system 100. For example, transmission scheme 400 may apply to a multi-link session between two devices (e.g., an AP 105 and a STA 115). Accordingly, link 405-*a* and link 405-*b* may be examples of the links described above (e.g., communication link 120 described with reference to FIG. 1). In aspects of the present example, links 405-*a* and 405-*b* may support operation over adjacent channels (e.g., each link 405 may be associated with a given RF band). As described above, in some cases each link 405 may be associated with a respective radio of a given wireless device. Alternatively, the links 405 may be associated with the same radio. Thus, while aspects of the following are described as being performed by a wireless device, it is to be understood that separate components of the wireless device may in some cases perform the described techniques for each link 405. The transmission scheme 400 may support techniques for reducing ACI in a multi-link aggregation scheme.

For example, transmission scheme 400 may support operation in which a wireless device transmits in short bursts separated by SIFS intervals on the first link 405-*a* and regularly samples on the second link 405-*b* to determine whether the second link 405-*b* is available. The first link 405-*a* may be idle until 415, at which point the wireless device gains control of the transmission medium and begins a short transmission burst. The short transmission burst may induce ACI 410 at the second link 405-*b*. In some cases, the wireless device may transmit in short transmission bursts to that the wireless device maintains control of the first link 405-*a*. If the short transmission bursts are separated by a SIFS interval, another device may not be able to try to take control of the first link 405-*a*. For example, the SIFS interval may be too short for another device to countdown (e.g., countdown a network allocation vector (NAV) to zero) and attempt to gain control of the first link 405-*a*.

When the wireless device is not transmitting on the first link 405-*a*, the wireless device may check the transmission medium on the second link 405-*b*. For example, the wireless device may measure a received signal strength on the second link 405-*b* during a period of silence 420. At period of silence 420-*a*, the wireless device may still detect an OBSS transmission. However, at period of silence 420-*b*, the wireless device may not detect the OBSS transmission and may determine that the second link 405-*b* is idle (e.g., at the idle detection 425). The wireless device may then gain control of the transmission medium at the second link 405-*b* and begin aggregating the first link 405-*a* and the second link 405-*b* according to a multi-link aggregation scheme. In some cases, the duration of a period of silence 420 may be based on the SIFS configuration. For example, the period of silence 420 may span a SIFS interval.

In some cases, the wireless device may transmit using SIFS bursting for a configurable duration or time period. Once the duration or time period expires, the wireless device may refrain from attempting to aggregate the first link 405-*a* with the second link 405-*b* and may instead transmit a long PPDU on the first link 405-*a*. The time period or duration may, in some cases, be referred to as a time out period, after which the wireless device may give up on aggregating the second link 405-*b*. The duration of the time out period may be configurable or stored in memory at the wireless device. In some cases, the duration of the time out period may be configured by a serving AP 105.

Figure 5:
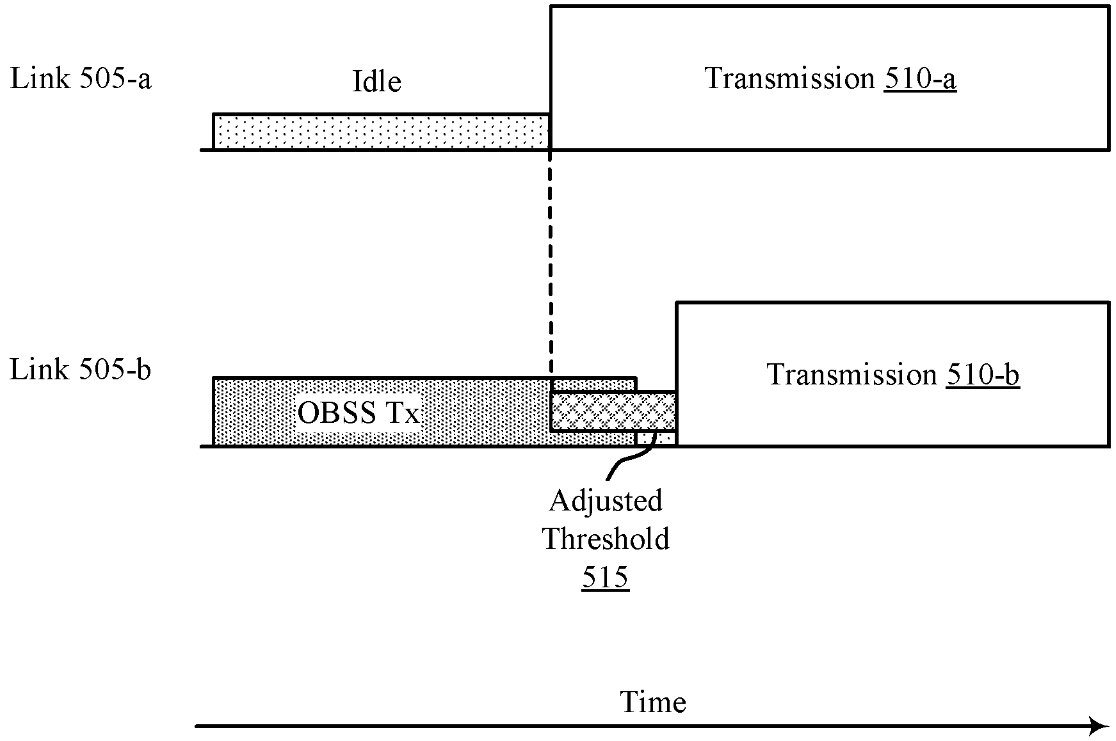

FIG. 5 illustrates an example of a transmission scheme 500 that supports design considerations for multi-link aggregation in accordance with aspects of the present disclosure. In some examples, transmission scheme 500 may implement aspects of wireless communication system 100.

For example, transmission scheme 400 may apply to a multi-link session between two devices (e.g., an AP 105 and a STA 115). Accordingly, link 505-*a* and link 505-*b* may be examples of the links described above (e.g., communication link 120 described with reference to FIG. 1). In aspects of the present example, links 505-*a* and 505-*b* may support operation over adjacent channels (e.g., each link 505 may be associated with a given RF band). As described above, in some cases each link 505 may be associated with a respective radio of a given wireless device. Alternatively, the links 505 may be associated with the same radio. Thus, while aspects of the following are described as being performed by a wireless device, it is to be understood that separate components of the wireless device may in some cases perform the described techniques for each link 505. The transmission scheme 500 may support techniques for reducing ACI in a multi-link aggregation scheme.

Generally, transmission scheme 500 may provide for techniques to a wireless device transmitting on a first link 505-*a* and adjusting a CCA threshold on a second link 505-*b*. For example, the CCA threshold for the second link 505-*b* may be adjusted to adjusted threshold 515 to compensate for additional signaling on the second link 505-*b*, which may result from ACI due to the wireless device transmitting on the first link 505-*a*. In some cases, the CCA threshold may be adjusted such that the threshold is below the ED threshold. In some cases, adjusting the CCA threshold over the ED threshold may desensitize the receiver to other transmissions on the channel. As such, if the CCA adjustment to the second link is over the ED threshold then other ACI reduction techniques may be utilized. If the ACI to the second link 505-*b* is below the adjusted CCA threshold, then the second link 505-*b* may be aggregated with the first link 505-*a*, as the second link 505-*b* may be available for transmission. In some cases, the wireless device may refrain from attempting to aggregate the first and second links if the ACI to the second link 505-*b* is above the adjusted CCA threshold. In some cases, ACI from another wireless device in an OBSS may cause interference on the second link 505-*b* above the CCA threshold. The wireless may wait until the second link is idle before aggregating the first and second links to transmit transmission 510-*b* in parallel with ongoing transmission 510-*a*.

Figure 6:
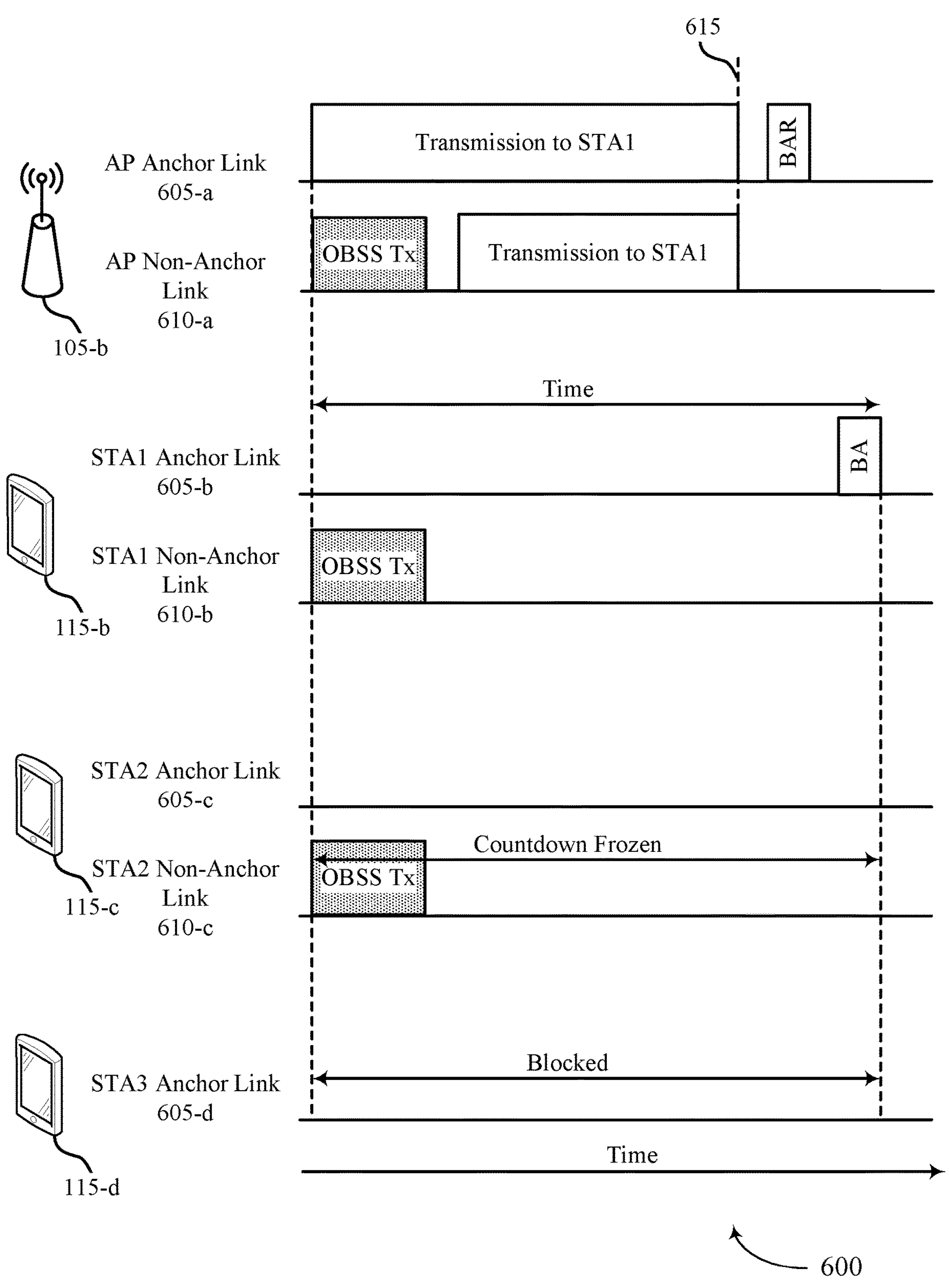

FIG. 6 illustrates an example of a transmission scheme 600 that supports design considerations for multi-link aggregation in accordance with aspects of the present disclosure. In some examples, transmission scheme 600 may implement aspects of wireless communication system 100. The transmission scheme 600 may be one example of a unified multi-link aggregation design.

The transmission scheme 600 may include an AP 105-*b* and STAs 115-*b*, 115-*c*, and 115-*d*. STA 115-*b* and 115-*c* may be examples of STAs 115 which support multi-link aggregation. STA 115-*d* may be an example of a legacy device which does not support multi-link aggregation. STA 115-*b*, 115-*c*, and 115-*d* may each use a common anchor link 605. STA 115-*b* and STA 115-*c* may each be configured with a second link for multi-link aggregation (e.g., a non-anchor link 610). The STA 115-*d* may be limited to communications on the anchor link 605. AP 105-*b* may communicate with STA 115-*b*, 115-*c*, 115-*d*, and other STAs 115 in the same BSS. In some cases, STA 115-*b* and 115-*c* may support additional communication links (e.g., non-anchor links) not shown. For example, a multi-link aggregation scheme may include 3 or more communication links. In this example, anchor link 605 and non-anchor link 610 may be nearby or adjacent in frequency, such that transmission on one link may induce ACI on the other link. Wireless devices described herein (e.g., STAs 115 and APs 105) may implement techniques to improve communications conditions where there are adjacent links in a multi-link aggregation scheme.

As described herein, a transmitting device may experience some induced ACI due to concurrent transmission and reception on adjacent or nearby links. For example, transmitting on the anchor link 605 may affect a device's ability to receive on the non-anchor link 610 and the other way around. If, for example, an STA 115 is transmitted a control response, such as a block acknowledgment, on the anchor link 605 while the STA 115 is still transmitting on the non-anchor link 610, the transmission on the non-anchor link 610 may affect the receipt of the control response on the anchor link 605. Therefore, wireless devices described herein may implement techniques to manage control response. For example, the wireless devices may implement a mechanism to defer receiving a control response on a link which may be adjacent to a link which is being used for an ongoing transmission.

In an example, a STA 115 transmitting on multiple (e.g., two or more), aggregated links may solicit a response from the recipient after transmission on each of the links has terminated. In some cases, the STA 115 may ensure that transmission on each of the links terminates at the same time 615. This may prevent other STAs 115 in the same BSS from jumping on to an idle link (e.g., were the STA 115 to instead just refrain from transmitting on one of the links). Related to the transmission scheme 600, PPDUs transmitted on the anchor link 605 and the non-anchor link 610 may terminate together, after which a response may be solicited from the recipient. For example, the transmitting STA 115 may send a BAR at the end of the transmission to solicit a block acknowledgment. In some cases, a single BAR and block acknowledgment exchange may be performed (e.g., on just one of the links) to acknowledge MPDUs exchanged on both links.

While transmission by a first STA 115 is active on a first link, it is possible that, on an adjacent, second link, another STA 115 in the same BSS may count to zero after an OBSS transmission ends and gain control of the adjacent, second link before the transmitting, first STA 115. This may cause interference to at least a transmission by the first STA 115 on the first link. Therefore, wireless devices described herein may implement techniques to prevent other STAs 115 in the BSS from jumping on to the transmission medium on a second link once transmissions have begun on a first link.

For example, the transmission scheme 600 may provide techniques for silencing transmissions from other STAs 115 in a BSS. In a first example, non-AP stations (e.g., STAs 115) may precede transmissions with an RTS (or other channel reservation signal). When two links are adjacent or nearby in frequency, the AP 105 may act as an arbitrator in determining which links are used by which STAs 115, as any STA 115 within a BSS of the AP 105 may receive transmissions from the AP 105. The AP 105 may then determine which STAs will transmit on which links after receiving RTSs from all STAs 115 within the BSS. The AP 105 may then transmit a CTS (or other channel reservation response signal) in response to the RTS from the STA 115, which may indicate that the STA 115 can transmit on the corresponding link.

An AP 105 may not respond to the RTS with a CTS under a variety of circumstances. Such circumstances may include, firstly, if the AP 105 has an active downlink transmission on an adjacent link and has scheduled a downlink transmission on the requested link. Within this circumstance, such the scheduled downlink transmission may be to serve the STA requesting the link or another STA within the BSS. A second circumstance may be if the AP 105 is receiving an uplink transmission from another STA on the requested link. Within this circumstance, the AP 105 may wait for the other STA 115 to finish the uplink transmission on the requested link. A third circumstance may be if the access point has already responded to another STAs request for the link. And a final circumstance may be if the requesting STA 115 is hidden to another STA 115 that has an on-going uplink transmission to the access point on the requested link. In some cases, the AP 105 may configure RTS for the BSS when two links in the BSS are close-by. The AP 105 may, in some non-limiting examples, mandate the use of RTS.

In another example of silencing in-BSS transmissions, the following may provide techniques for freezing a countdown for STAs 115 in the BSS which support multi-link aggregation. Other STAs 115 in the BSS may freeze their countdown so that these STAs 115 cannot acquire the medium before a transmitting STA 115. Since each STA 115 in the BSS can hear (e.g., receive transmission from) the AP 105, a transmission from the AP 105 on a link may be an implicit indicator for associated multi-link aggregation STAs 115 to freeze their countdown on other links. In some cases, the frame's preamble and MAC header may indicate the transmit opportunity (TXOP) duration. In the case where a non-AP station (e.g., a STA 115) is a transmitter on the first link, the transmission may be preceded with a frame exchange so that any other multi-link aggregation supporting STA 115 hears the response from the AP 105 and freezes the countdown. The request/response frame may serve to indicate that the transmitting STA 115 is multi-link aggregation capable and may attempt transmission on the second link. The preamble and MAC header of the request/response frame may indicate the TXOP duration. These techniques may prevent other multi-link aggregation capable STAs 115 from jumping on an idle link and potentially causing interference to an already transmitting STA 115.

Additional, or alternative, techniques are described to prevent other stations (e.g., not capable of supporting multi-link aggregation) from jumping on to the medium when transmissions have begun on another link. For example, an AP 105 may transmit beacons and management frames on an anchor channel (e.g., the anchor channel 605). This may reduce beaconing overhead and management of transmission in the BSS. STAs which do not support multi-link aggregation (e.g., in some cases referred to as legacy STAs) may discover and associate on just the anchor channel. This may restrict legacy STA contention to just the anchor channel. STAs 115 capable of multi-link aggregation may discover and associate on the anchor channel as well as expand operation to other, non-anchor links (e.g., the non-anchor link 610). Since contention and transmission of an in-BSS legacy STA may be restricted to an anchor channel, an MLA session initiated on the anchor link may not utilize techniques to protect a multi-link aggregation session from legacy devices on the anchor link. When a multi-link aggregation transmission is initiated on a non-anchor channel, in-BSS legacy STAs 115 may be silenced on the anchor channel. This may be achieved by the AP 105 transmitting to block the medium immediately after an OBSS transmission terminates.

In the example shown by the transmission scheme 600, AP 105-*b* may initiate transmission on the anchor link 605 (e.g., shown by 605-*a*). There may not be protection from legacy STAs 115 in this example, as legacy association and contention may be limited to the anchor channel. Therefore, as shown by 605-*d*, the anchor link 605 may appear busy to STA 115-*d* (e.g., due to the transmission from the AP 105). The transmission scheme 600 may provide techniques for protecting the non-anchor link 610 against other multi-link aggregation capable STAs 115, such as STA 115-*c*, once AP 105-*b* has begun transmitting to STA 115-*b*. For example, STA 115-*c* may freeze its countdown on non-anchor link 610 after hearing the transmission from the AP 105 on the anchor link 605. As shown, both the transmission from AP 105-*b* on the anchor link 605 and the non-anchor link 610 may end at the same time. Once transmission on both links is finished, AP 105-*b* may transmit a BAR to STA 115-*b*. STA 115-*b* may transmit a block acknowledgment for the transmission on the anchor link 605, non-anchor link 610, or both, to AP 105-*b* in response to the BAR. In some cases, AP 105-*b* may use its TXOP to transmit multi-link aggregated downlink transmissions to other STAs 115 and solicit acknowledgments from the multiple STAs via a multi-user BAR.

Figure 7:
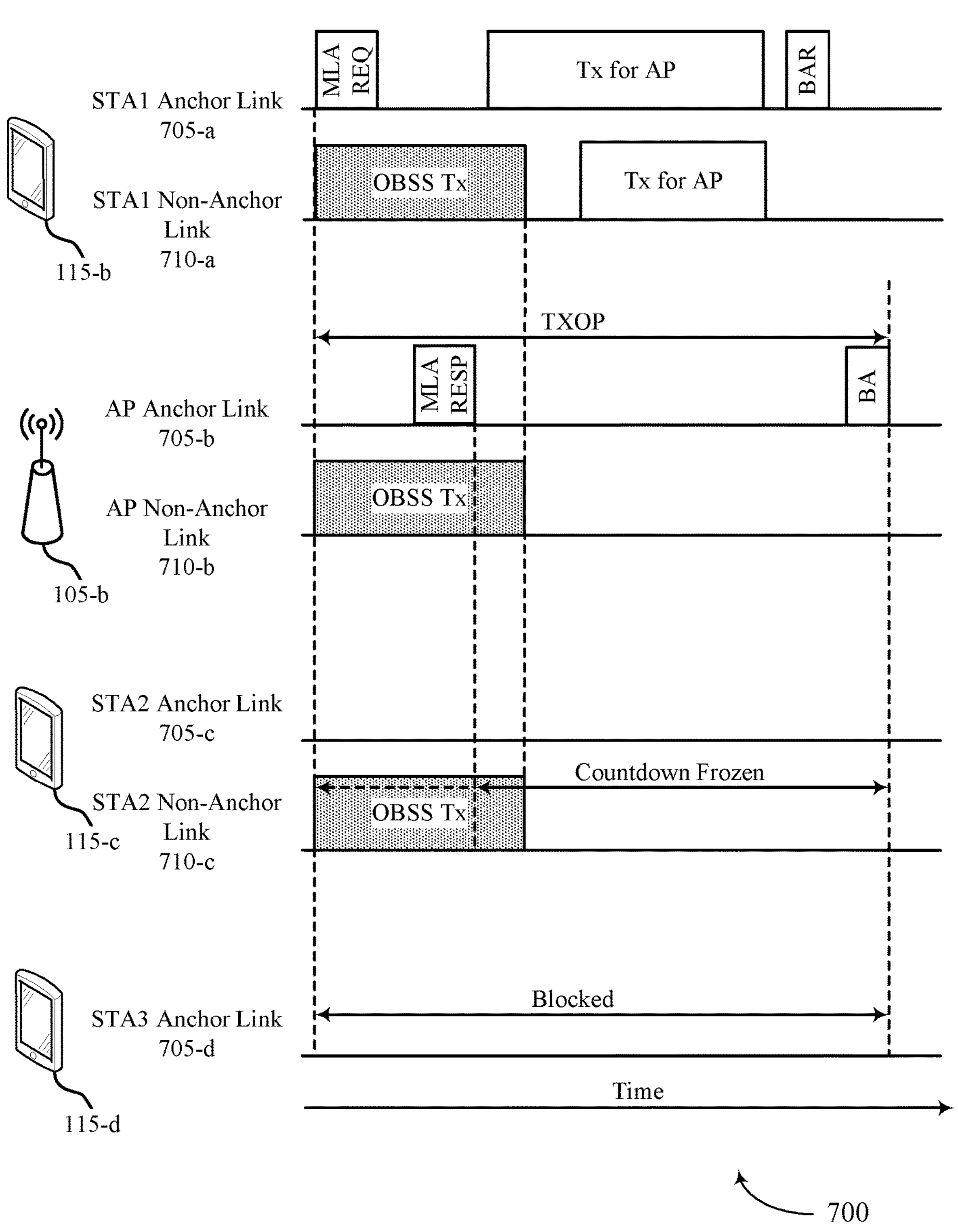

FIG. 7 illustrates an example of a transmission scheme 700 that supports design considerations for multi-link aggregation in accordance with aspects of the present disclosure. In some examples, transmission scheme 700 may implement aspects of wireless communication system 100.

The transmission scheme 700 may include an AP 105-*b* and STAs 115-*b*, 115-*c*, and 115-*d*. STA 115-*b* and 115-*c* may be examples of STAs 115 which support multi-link aggregation. STA 115-*d* may be an example of a legacy device which does not support multi-link aggregation. STA 115-*b*, 115-*c*, and 115-*d* may each use a common anchor link 705. STA 115-*b* and STA 115-*c* may each be configured with a second link for multi-link aggregation (e.g., a non-anchor link 710). The STA 115-*d* may be limited to communications on the anchor link 705. In some cases, STA 115-*d* may be referred to as a legacy device or legacy STA, for example as STA 115-*d* may not support multi-link aggregation. AP 105-*b* may communicate with STA 115-*b*, 115-*c*, 115-*d*, and other STAs 115 in the same BSS. In some cases, STA 115-*b* and 115-*c* may support additional communication links (e.g., non-anchor links) not shown. For example, a multi-link aggregation scheme may include 3 or more communication links. In this example, anchor link 605 and non-anchor link 710 may be nearby or adjacent in frequency, such that transmission on one link may induce ACI on the other link. Wireless devices described herein (e.g., STAs 115 and APs 105) may implement techniques to improve communications conditions where there are adjacent links in a multi-link aggregation scheme.

The transmission scheme 700 may support techniques described herein. For example, the transmission scheme 700 may support the techniques to ameliorate the concurrent transmission and reception problem described herein, such as in FIG. 6. The transmission scheme 700 may also support the techniques for managing control responses and silencing in-BSS transmissions as described at least by the transmission scheme 600 in FIG. 6.

In an example, STA 115-*b* may initiate transmission on the anchor link 705 (e.g., shown by 705-*a*). There may not be protection from legacy STAs 115 in this example, as legacy association and contention may be limited to the anchor channel. Therefore, as shown by 605-*d*, the anchor link 605 may appear busy or blocked to STA 115-*d* (e.g., due to the transmission from STA 115-*b*). The transmission scheme 700 may provide techniques for protecting the non-anchor link 710 against other multi-link aggregation capable STAs 115, such as STA 115-*c*, once STA 115-*b* has begun transmitting to AP 105-*b*. For example, STA 115-*b* may initiate a frame exchange. STA 115-*c* may freeze its countdown on non-anchor link 610 after hearing either a request (e.g., an RTS or other channel reservation request) or response (e.g., a CTS or other response to a channel reservation request) on the anchor link 605. As shown, both the transmission from STA 115-*b* on the anchor link 705 and the non-anchor link 710 may end at the same time. Once transmission on both links is finished, STA 115-*b* may transmit a BAR to AP 105-*b*. AP 105-*b* may transmit a block acknowledgment for the transmission on the anchor link 705, anchor link 710, or both, to STA 115-*b* in response to the BAR. The BAR may be transmitted per-link, with the BA sent in response per-link. Alternatively, the BAR may be sent on a single link or subset of all the links, and the BA sent on a single link or subset of all the links, where the BA includes acknowledgments or negative acknowledgements associated with transmissions on multiple links, including links not used to transmit the BAR or BA.

Figure 8:
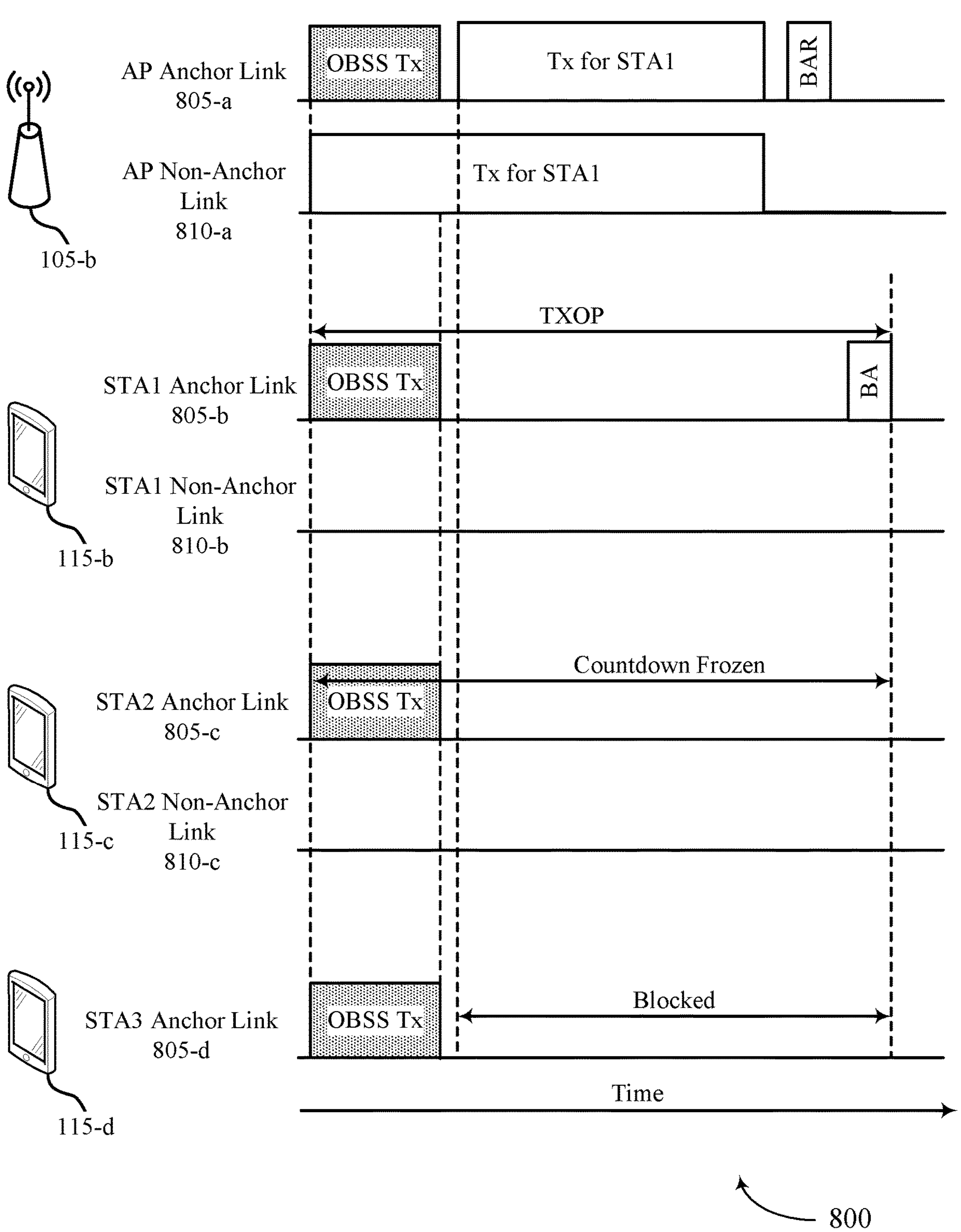

FIG. 8 illustrates an example of a transmission scheme 800 that supports design considerations for multi-link aggregation in accordance with aspects of the present disclosure. In some examples, transmission scheme 800 may implement aspects of wireless communication system 100.

The transmission scheme 800 may include an AP 105-*b* and STAs 115-*b*, 115-*c*, and 115-*d*. STA 115-*b* and 115-*c* may be examples of STAs 115 which support multi-link aggregation. STA 115-*d* may be an example of a legacy device which does not support multi-link aggregation. STA 115-*b*, 115-*c*, and 115-*d* may each use a common anchor link 805. STA 115-*b* and STA 115-*c* may each be configured with a second link for multi-link aggregation (e.g., a non-anchor link 810). The STA 115-*d* may be limited to communications on the anchor link 805. In some cases, STA 115-*d* may be referred to as a legacy device or legacy STA, for example as STA 115-*d* may not support multi-link aggregation. AP 105-*b* may communicate with STA 115-*b*, 115-*c*, 115-*d*, and other STAs 115 in the same BSS. In some cases, STA 115-*b* and 115-*c* may support additional communication links (e.g., non-anchor links) not shown. For example, a multi-link aggregation scheme may include 3 or more communication links. In this example, anchor link 605 and non-anchor link 810 may be nearby or adjacent in frequency, such that transmission on one link may induce ACI on the other link. Wireless devices described herein (e.g., STAs 115 and APs 105) may implement techniques to improve communications conditions where there are adjacent links in a multi-link aggregation scheme.

The transmission scheme 800 may support techniques described herein. For example, the transmission scheme 800 may support the techniques to ameliorate the concurrent transmission and reception problem described herein, such as in FIG. 6. The transmission scheme 800 may also support the techniques for managing control responses and silencing in-BSS transmissions as described at least by the transmission scheme 600 in FIG. 6.

In an example, AP 105-*b* may initiate transmission on the non-anchor link 810 (e.g., shown by 810-*a*). There may be an OBSS transmission occurring on the anchor link 805, prevent any wireless device in the BSS from transmitting on the anchor link 805. In this example, AP 105-*b* may start to transmit on the anchor channel 805 one interframe spacing (e.g., a DIFS) after the OBSS transmission (e.g., without a backoff timer). STA 115-*d* may be blocked on the anchor channel 605 after hearing the transmission from AP 105-*b*. Therefore, as shown by 605-*d*, the anchor link 605 may appear busy to STA 115-*d* (e.g., due to the transmission from the AP 105). The transmission scheme 600 may also provide techniques for protecting the anchor link 805 against other multi-link aggregation capable STAs 115, such as STA 115-*c*. For example, STA 115-*c* may freeze its countdown on the anchor channel 805 (e.g., shown at 805-*c*) after hearing the transmission from AP 105-*b* on the non-anchor channel 810. As shown, both the transmission from AP 105-*b* on the anchor link 805 and the non-anchor link 810 may end at the same time. Once transmission on both links is finished, AP 105-*b* may transmit a BAR to STA 115-*b*. STA 115-*b* may transmit a block acknowledgment for the transmission on the anchor link 805, non-anchor link 810, or both, to AP 105-*b* in response to the BAR. In some cases, AP 105-*b* may use its TXOP to transmit multi-link aggregated downlink transmissions to other STAs 115 and solicit acknowledgments from the multiple STAs via a multi-user BAR.

Figure 9:
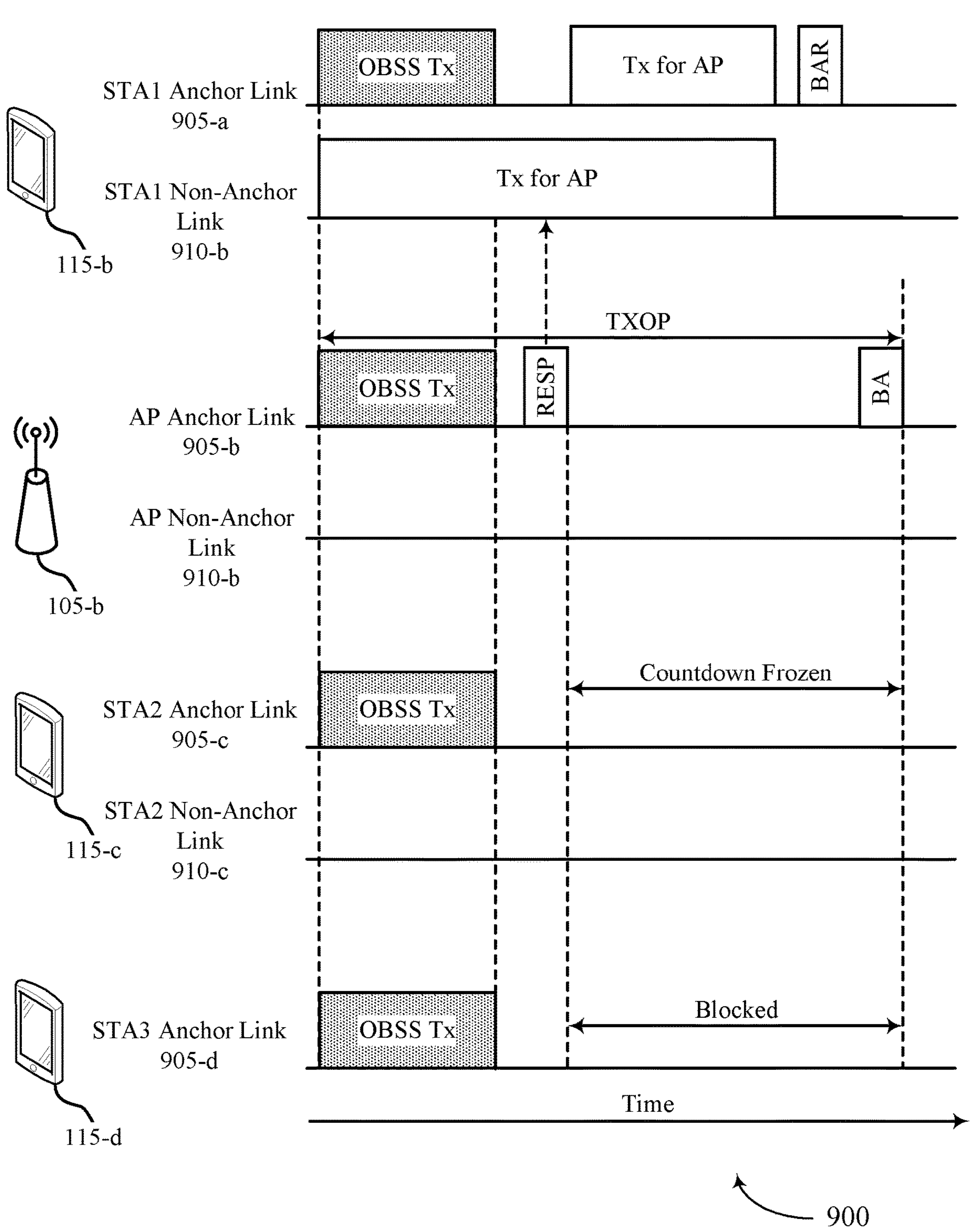

FIG. 9 illustrates an example of a transmission scheme 900 that supports design considerations for multi-link aggregation in accordance with aspects of the present disclosure. In some examples, transmission scheme 900 may implement aspects of wireless communication system 100.

The transmission scheme 900 may include an AP 105-*b* and STAs 115-*b*, 115-*c*, and 115-*d*. STA 115-*b* and 115-*c* may be examples of STAs 115 which support multi-link aggregation. STA 115-*d* may be an example of a legacy device which does not support multi-link aggregation. STA 115-*b*, 115-*c*, and 115-*d* may each use a common anchor link 905. STA 115-*b* and STA 115-*c* may each be configured with a second link for multi-link aggregation (e.g., a non-anchor link 910). The STA 115-*d* may be limited to communications on the anchor link 905. In some cases, STA 115-*d* may be referred to as a legacy device or legacy STA, for example as STA 115-*d* may not support multi-link aggregation. AP 105-*b* may communicate with STA 115-*b*, 115-*c*, 115-*d*, and other STAs 115 in the same BSS. In some cases, STA 115-*b* and 115-*c* may support additional communication links (e.g., non-anchor links) not shown. For example, a multi-link aggregation scheme may include 3 or more communication links. In this example, anchor link 605 and non-anchor link 910 may be nearby or adjacent in frequency, such that transmission on one link may induce ACI on the other link. Wireless devices described herein (e.g., STAs 115 and APs 105) may implement techniques to improve communications conditions where there are adjacent links in a multi-link aggregation scheme.

The transmission scheme 900 may support techniques described herein. For example, the transmission scheme 900 may support the techniques to ameliorate the concurrent transmission and reception problem described herein, such as in FIG. 6. The transmission scheme 900 may also support the techniques for managing control responses and silencing in-BSS transmissions as described at least by the transmission scheme 600 in FIG. 6.

In an example, STA 115-*b* may initiate transmission on the non-anchor link 910 (e.g., shown by 910-*a*) to AP 105-*b*. There may be an OBSS transmission occurring on the anchor link 905, prevent any wireless device in the BSS from transmitting on the anchor link 905. In this example, AP 105-*b* may transmit a response (e.g., RESP frame) on the anchor channel 905, without backoff, after the OBSS transmission ends to block legacy STAs 115 (e.g., including STA 115-*d*) from transmitting. In some cases, STA 115-*b* may initiate multi-link aggregation transmission on the non-anchor link 910 if AP 105-*b* has indicated support (e.g., AP 105-*b* can tolerate a short interference which may be caused by transmitting the response frame). Other STAs 115 which can support multi-link aggregation, such as STA 115-*c*, may freeze their countdown on the anchor channel 905 upon detecting the response frame from AP 105-*b*. As shown, both the transmission from STA 115-*b* on the anchor link 905 and the non-anchor link 910 may end at the same time. Once transmission on both links is finished, AP 105-*b* may transmit a BAR to STA 115-*b*. AP 105-*b* may transmit a block acknowledgment for the transmission on the anchor link 905, anchor link 910, or both, to STA 115-*b* in response to the BAR.

Figure 10:
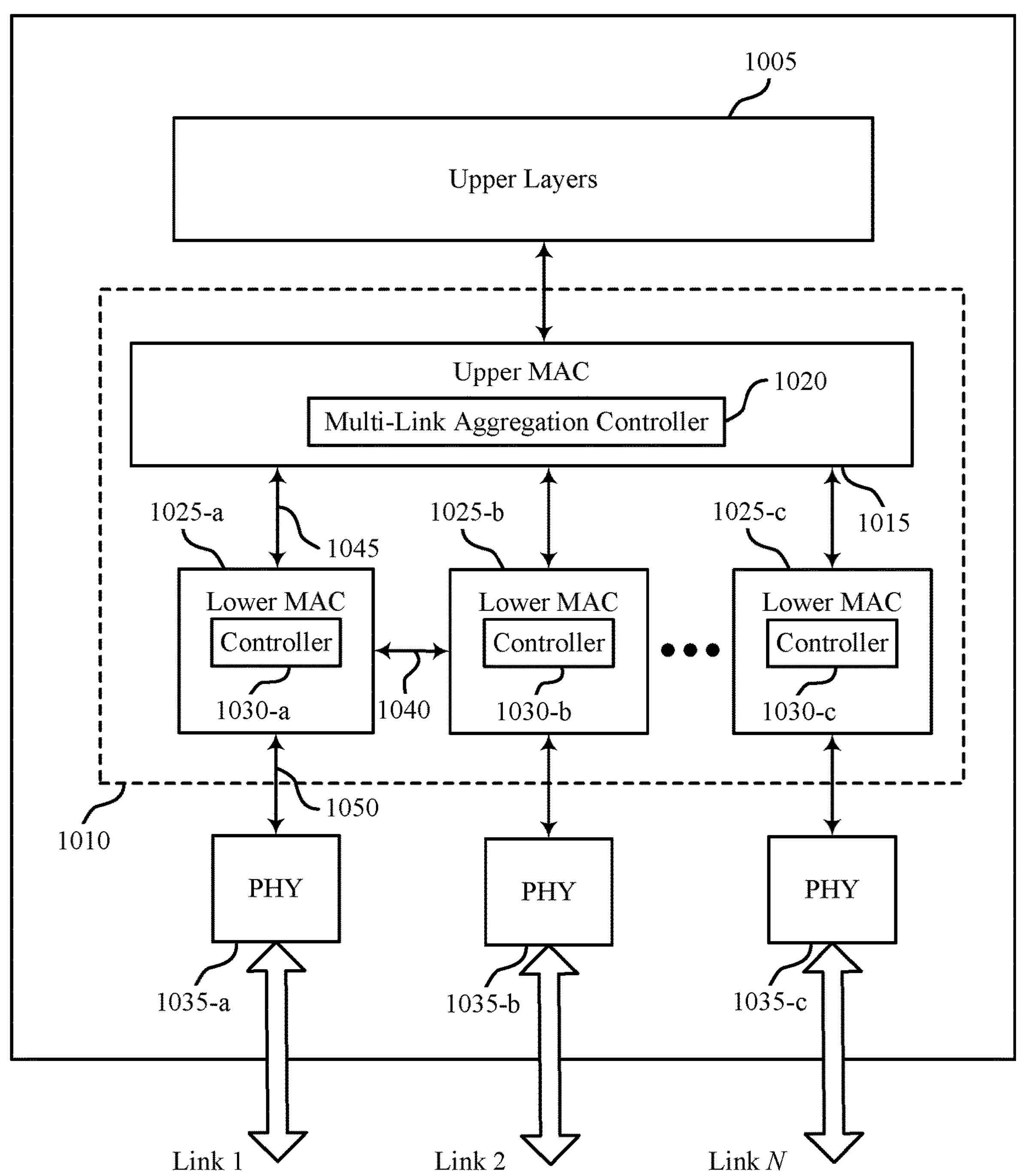
FIG. 10 illustrates an example of a layer configuration that supports design considerations for multi-link aggregation in accordance with aspects of the present disclosure.

FIG. 10 illustrates an example of a layer configuration 1000 that supports design considerations for multi-link aggregation in accordance with aspects of the present disclosure. In some examples, layer configuration 1000 may implement aspects of wireless communication system 100. The layer configurations 1000, 1300, 1400, and 1600 described with reference to FIGS. 10, 13, 14, and 16 may each be an example of an overall architecture for a unified multi-link aggregation design.

Layer configuration 1000 may apply to a STA 115 or an AP 105, and be for a transmitting wireless device, or a receiving wireless device. It is to be understood that aspects of layer configuration 1000 may represent logical constructs (e.g., such that components of layer configuration 1000 may share hardware components). A wireless device may support layer configuration 1000 through the use of various hardware configurations described herein.

As illustrated, layer configuration 1000 may include upper layers 1005, a MAC layer 1010, and one or more PHY layers 1035 (e.g., where each PHY layer 1035 may in some cases be associated with a respective link or channel). The layer configuration MAC layer 1010 may be further divided into upper MAC 1015 and lower MACs 1025-*a*, 1025-*b*, 1025-*c*. While three lower MACs 1025 are illustrated, it is to be understood that upper MAC 1015 may control (e.g., via multi-link aggregation controller 1020) any suitable number of lower MACs 1025. Signaling between a given lower MAC (e.g., lower MAC 1025-*a*) and upper MAC 1015 may be carried by connection 1045. In some cases, there may be a single-link interface from the common upper MAC 1015 to the higher layer. Similarly, signaling between lower MAC 1025-*a* and PHY layer 1035-*a* may be carried by connection 1050 and signaling between lower MAC 1025-*a* and lower MAC 1025-*b* may be carried by connection 1040. As described below, the signaling for lower MACs 1025-*a*, 1025-*b*, 1025-*c* may be based on logic associated with respective controllers 1030-*a*, 1030-*b*, 1030-*c*.

In some cases, the upper MAC 1015 may use a shared sequence number space and block acknowledgment scoreboard. In some cases, retransmissions may not be on the same link. Acknowledgments may, in some cases, not be sent on the same link as the MPDU. In some cases, a single BAR may elicit a block acknowledgment for MPDUs sent on any link. The layer configuration 1000 may use an increased block acknowledgment sequence number space, for example by using 1024 sequence numbers. In some cases, an idle STA may monitor a home channel. The upper MAC 1015 may dynamically signal expansions to additional links (e.g., other than the home channel).

In some cases, each link may correspond to a lower MAC instance 1025. A lower MAC instance 1025 may perform link-specific functionality, in some cases independently from the other lower MAC instances 1025. These functionalities may include enhanced distribution channel access (EDCA), CCA, and sounding, among others.

Figure 11:
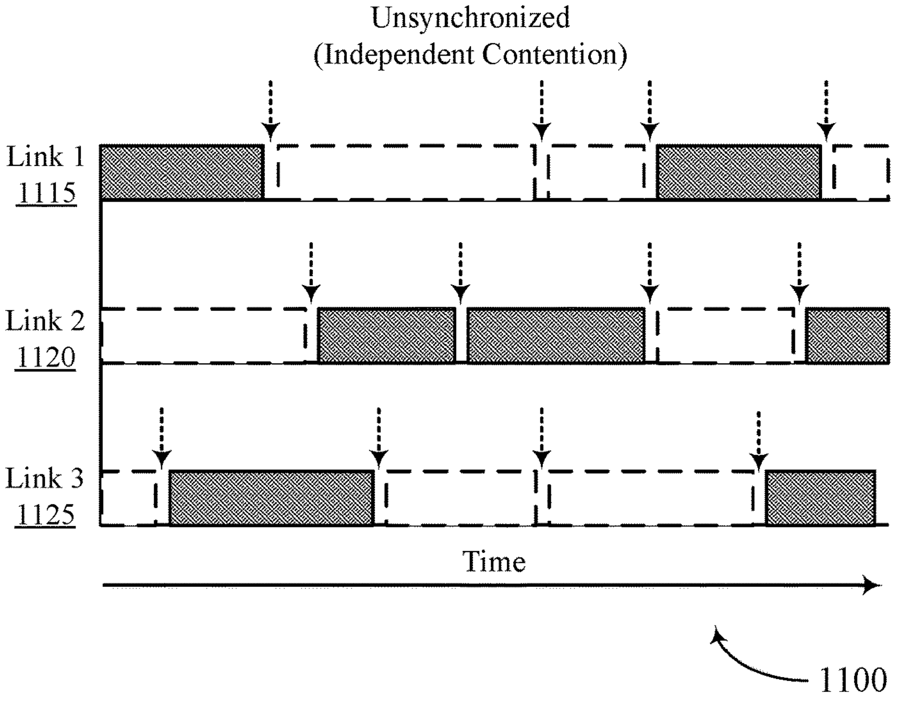
FIG. 11 illustrates an example of multi-link aggregation schemes that support design considerations for multi-link aggregation in accordance with aspects of the present disclosure.
Figure 11:
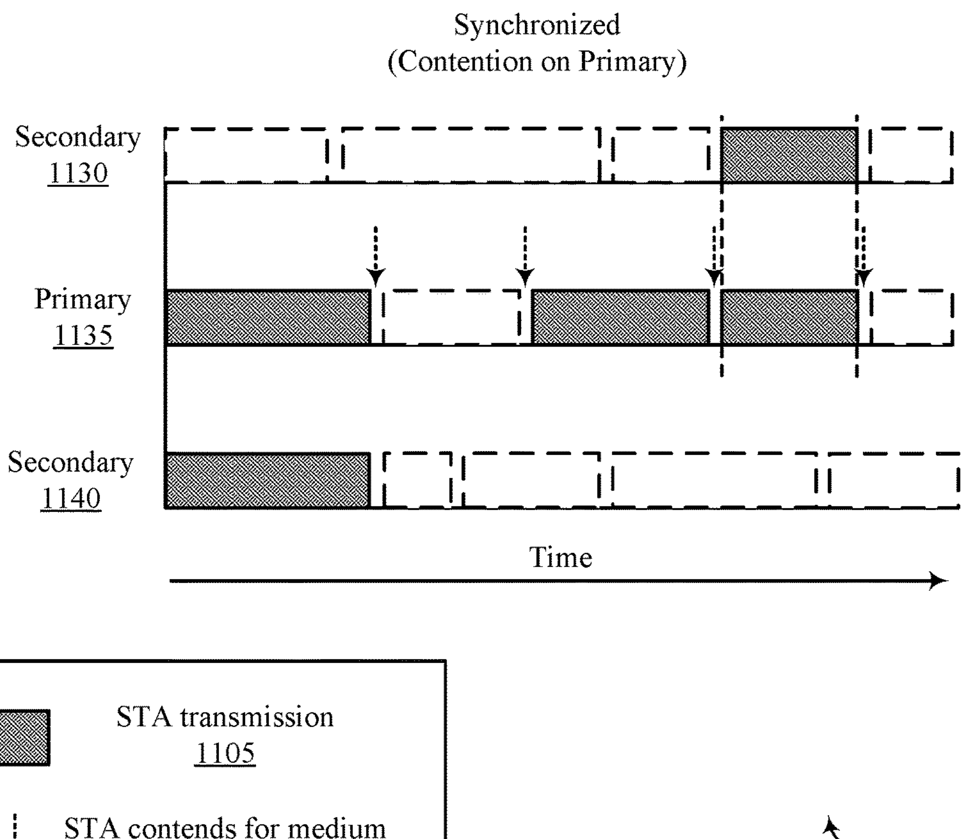

FIG. 11 illustrates an example of multi-link aggregation schemes 1100 and 1101 that support design considerations for multi-link aggregation in accordance with aspects of the present disclosure. In some examples, multi-link aggregation schemes 1100 and 1101 may implement aspects of wireless communication system 100. A wireless device operating according to the multi-link aggregation scheme 1100 or 1101 may be use a layer configuration 1000 as described in FIG. 10.

The multi-link aggregation scheme 1100 may be an example of an unsynchronized multi-link aggregation scheme. In an unsynchronized scheme, there may be independent channel access on each link. A transmitting device may generate PPDUs for each link independently, determining independent transmit parameters for each PPDU. In some cases, a BSS may use an unsynchronized scheme when links are sufficiently far apart. For example, there may be a large gap in frequency between the links, such that the links are less likely to be affected by ACI.

In an unsynchronized multi-link aggregation scheme, each link may have its own primary channel. Each lower MAC layer (e.g., a lower MAC 1025 of FIG. 10) may independently contend for the medium on its respective primary channel. As shown, a STA may contend for the medium (e.g., at 1110) across each links 1115, 1120, and 1125. In some cases, there may not be coordination between the lower MACs or PHY entities (e.g., no coordination required, at least). When the medium (e.g., a link) is available, each lower MAC and PHY may independently transmit a PPDU. PPDU transmit parameters, such as bandwidth or RU size, TXOP, modulation and coding scheme (MCS), etc., may be based on conditions of the link. In some cases, unsynchronized systems may support full duplex communications. In some cases, transmissions on links in an unsynchronized or asynchronous multi-link aggregation may have some offset between starting times.

The multi-link aggregation scheme 1101 may be an example of a synchronized multi-link aggregation scheme. A synchronized scheme may be appropriate when links are close together. For example, if links are close enough in frequency to be affected by ACI, the BSS may implement a synchronized multi-link aggregation scheme to eliminate or ameliorate the induced CCA-busy problem. In a synchronized scheme, channel access may be coordinated through a primary channel. For example, a STA contends on the primary 1135, and is not shown to contend for the medium on the secondary 1135 or secondary 1140. The synchronized scheme may use dynamic, non-contiguous bandwidth. For example, the links may be slightly separated in bandwidth. A PPDU transmission on other links may be based on rules of the secondary channel. For example, the other links may use an ED threshold of the secondary channel. In some cases, the ED threshold for the secondary channel and other links may be −72 dBm.

PPDUs may be synchronized in the synchronized scheme as well. A synchronized multi-link aggregation scheme may generate a single PPDU or separate PPDUs. When generating separate PPDUs, each PPDU may be generated to have the same start and end times. Therefore, the multiple PPDUs may be independent and separate, but still synchronized. Each link may have its own primary channel. Each lower MAC instance may perform independent channel access on its own. When a preamble detection check is satisfied at a first lower MAC instance, the first lower MAC instance may generate a first PSDU and pass the first PSDU to its corresponding PHY instance. At the same time, the first lower MAC instance may signal to a second lower MAC instance (e.g., the lower MAC for a first link signals to a lower MAC for a second link of the multi-link aggregation scheme) to determine if the ED check is satisfied. If the ED check passes on the second lower MAC instance, the second lower MAC instance may generate a second PSDU and pass the second PSDU to the PHY entity corresponding to the second lower MAC. In some cases, a signal from the first lower MAC entity may indicate the TXOP duration. Transmit parameters for each PSDU may be based on local channel conditions. In some cases, the second lower MAC entity may use the TXOP duration from the first lower MAC entity. Each PHY entity may take the PSDU passed by its lower MAC entity and generate a PPDU. Then, each PHY entity may transmit the PPDU on its link.

In some cases, the synchronized multi-link aggregation schemes may have tight synchronization requirements. A client may know when to be active on a non-anchor link and be prepared to receive a downlink transmission on the non-anchor link. The AP may be assumed to be active on multiple links. In some cases, a multi-link TWT schedule or a similar scheduling mechanism may be used. These techniques for tight synchronization may be implemented such that a client is active on both (e.g., or any) links at known times and does not miss a transmission from the AP 105 on one of the links in a multi-link aggregation scheme. In some cases, the transmissions on the two or more links may be in the same direction, and TWT may be an example of a technique which may be implemented to tightly synchronize the transmissions on the two or more links. This may be applicable for the device to wake up to transmit or receive. In some cases, the TWT configuration may include an indicator for which links, should there be 3 or more links in the multi-link aggregation, are synchronized via TWT. In some cases, additional or alternative techniques for synchronizing the links may be implemented.

In some cases, the multi-link aggregation scheme may support techniques for synchronizing the separate PPDUs and indicating to the receiver that transmission is occurring on multiple links. For example, a device transmitting separate and synchronized PPDUs may implement a mechanism such as TWT or OMI to synchronize the separate PPDUs and prepare the receiver to receive the synchronized PPDUs. In some cases, a transmitting device may use OMI to indicate to the receiving device which links are used for a synchronized transmission. OMI may be included in a short transmission on the anchor channel which may signal expansion to other links. In some examples, the preamble may indicate the presence of a simultaneous PPDU on a different link (band or channel). In some examples, the synchronization of the separate PPDUs may be indicated via a management frame. In some cases, the synchronization may be indicated via beacons, discovery frames, frame duration fields, OPS frames, or some other type of signaling.

In some cases, the synchronization may be indicated via signaling which includes an indicator such as a traffic indication mapping (TIM) element. In some instances, an AP 105 may include multiple TIM elements in a beacon, where each TIM element may indicate an upcoming downlink transmission on a particular link. For example, if an association ID of a STA 115 is listed in the 1st TIM element, it may be an indicator that the STA 115 would be serviced on the 1st link. If the STA's association ID (AID) is listed in the 2nd TIM, then the STA 115 may be serviced on the 2nd link and so on. In some cases, a STA's association ID may appear in multiple TIMs indicating aggregation across multiple links. When an STA 115 is serviced on a link, that STA 115 may receive a downlink transmission from the AP 105 on that link, be solicited for uplink transmission on that link from the AP 105, or both. Detecting the association ID may be an indication to the STA to wake-up on (e.g., activate) the corresponding link.

In another example of TIM-based indication, a STA 115 may be assigned more than one association ID value. There may be a single TIM element carried in the beacon, but the bit position matching the association ID may indicate which link on which the STA 115 is serviced. For example, during association, an AP 105 may assign a STA 115 association ID values of 5 and 105. Value 5 may correspond to link 1, and 105 may correspond to link 2. If bit 5 is set to 1, it may indicate that the STA 115 is serviced on link 1. If bit values for both indexes are set (e.g., to 1), the STA may be serviced on both links.

In some cases, a single punctured PPDU scheme may implement the techniques of using more than one association ID value. In some cases, the same PPDU may carry separate PSDUs for the same recipient. In such cases, the single PPDU may be sent in MU punctured PPDU format where multiple RUs directed to the same recipient are addressed to AIDs belong to the STA. For example, the MU PPDU may have an RU directed to association ID 5, which may be on link 1, and another RU directed to association ID 105, which may be on link 2. Such a scheme may be applicable in case of a punctured MU PPDU with more than one RU meant for the same STA 115.

In some cases, multiple association identifiers can be used to solicit synchronized uplink transmission from the STA 115 on different links. For example, in a scenario where an AP 105 and a STA 115 have two links between them, an AP's Trigger frame can include two User Info fields that are directed to the same STA 115. The first User Info field may have an association ID (e.g., AID12) set to one of association IDs belong to the STA and the other having association ID (e.g., AID12) set to the second association ID assigned to the same STA. The RU corresponding to the 1st User Info field may fall on link 1 and the 2nd RU may fall on link 2. The STA may transmit a synchronized Trigger-based PPDU in response to the soliciting trigger frame.

The device transmitting the synchronized PPDUs may signal to the receiver using at least one of these techniques, and the receiver may prepare to receive the synchronized PPDU transmissions based on the signaling. When the receiver receives one of these indications, the receiver may operate RF circuitry to monitor on the indicated links and receive the synchronized PPDU transmissions.

In a first example of the multi-link aggregation scheme 1100 (e.g., an unsynchronized scheme), a first link 1115 and a second link 1120 may be far apart in the frequency domain. In this example, the first link 1115 and the second link 1120 may each independently contend for their respective channels (e.g., at a contention time 1110). If the channel is available, the links may independent transmit. For example, if link 1115 is available after performing some LBT or CCA procedure at a contention time 1110, a client may generate a first PPDU and transmit the first PPDU on the link 1115. Independently, if the second link 1120 is available after the client performs some LBT or CCA procedure at a contention time 1110, the client may generate a second PPDU and transmit the second PPDU on the link 1120. The client may determine transmit parameters independently for the first PPDU and the second PPDU (e.g., transmit parameters for the first PPDU may not affect the transmit parameters for the second PPDU, or the other way around).

In an example of the multi-link aggregation scheme 1101 (e.g., synchronized scheme), there may be some form of synchronization between links. In some cases, the synchronization may be based on TWT, where the client wakes up on both links simultaneously. For a TWT scheme, the client may start to transmit PPDUs at the same time, such that the PPDUs are synchronized. In this example, the client may have two primary links, so that the client independently contends for access to the medium on each primary link. Whenever one of the primary links becomes available, the client may check whether the other primary link is available. If the other primary link is also available, the client may transmit either a separate PPDU on both primary links or a one MAC may provide one PSDU. In this example, there may be a single TXVECTOR.

In some cases, a layer configuration or the techniques performed thereby may be based on various scenarios or parameters. For example, the client may implement one of the layer configurations of table 1 below based on the corresponding scenario. As an example, if two links are far apart, and the client is configured for simultaneous and synchronized transmission, the client may generate separate PPDUs according to a single-user format using two primary links, two MAC entities, two PHY entities, where each MAC provides on PSDU using two TXVECTORs according to a unified MAC architecture. Other examples may correspond to other scenarios. The following are a non-limiting set of examples, where additional architectures or schemes may be implemented according to other scenarios, or changes to layer configurations (e.g., different numbers of primary links, PHY or MAC entities, etc.) may be made.

By using a unified MAC design, each link may have a corresponding PSDU, regardless of whether the PSDUs are carried in a single or multiple PPDUs. In the unified design, each MAC may provide a PSDU. The transmit parameters (e.g., MCS, bandwidth, etc.) for each PSDU may be based on the link conditions.

TABLE 1

| Aggregation Scheme | PPDU | Primary | L-MACs (Function such as EDCA, Rate adaptation) | PHYs | PSDUs (Unique tx parameter - MCS/NSS etc. per PSDU) | TXVECTOR |
|---|---|---|---|---|---|---|
| 1. Unsynchronized (links are sufficiently far) | Independent (separate PPDUs) | 2 | 2 | 2 | Each MAC provides one | 2 |
| 2. Synchronized (links are close and may cause ACI) | a. Simultaneous PPDUs (doesn't require symbol-level sync.) | (1 or) 2 | 2 | 2 | | 2 |
| | b. Single PPDU (Punctured) | (1 or) 2 | 2 | 1 | | 1 |

single PPDUs. In this example, the client device may have two primary links, two MAC entities, and two PHY entities. In some cases, each MAC may provide one PSDU. If the client transmits separate PPDUs and each MAC entity provides on PSDU, there may be two TXVECTORs and therefore each MAC entity may provide a set of link parameters for the corresponding link.

In some cases, the client may transmit a single punctured PPDU. For a punctured PPDU, the client may transmit a single PPDU, but there may be a null channel between two portions of the PPDU. The null channel may be a frequency region or subchannel where the client is not transmitting. If, for example, the client utilizes a 160 MHz bandwidth, somewhere in the middle of the bandwidth there may be a 40 MHz subchannel (for example, or another bandwidth subchannel) that is busy (e.g., may be used by another device). Then, the PPDU may be transmitted on one 80 MHz subchannel and one 40 MHz subchannel of the 160 MHz bandwidth (e.g., transmitted around the 40 MHz busy or null subchannel). In some cases, the format of the punctured PPDU may be an MU-PPDU. In some examples, the punctured PPDU design may use two MAC entities and one PHY entity. In some cases, the punctured PPDU may be supported when using one primary link or multiple primary links. In some cases, one MAC entity may provide two PSDUs, or In some cases, a STA 115 may be configured with at least two nearby links, which may have a synchronization requirement. The STA 115 may receive or transmit a single punctured PPDU for an aggregation scheme. In these examples, there may be either one or two primary links. For example, either each link may be considered a primary link, or the STA 115 may have one primary link and one secondary link. The STA 115 may have two lower MAC entities and one PHY entity. In some cases, one lower MAC entity may provide one PSDU. Or, in some cases, one lower MAC entity may provide two PSDUs. In these examples, the lower MAC entity providing the PSDUs may only send one TXVECTOR to the PHY entity.

In some cases, the TIM element may include an indicator that one or more non-AP STAs may be serviced on the first wireless link, or the second wireless link, or a combination thereof. A TIM signal may include a frame carrying a TIM element such as a Beacon frame, TIM frame, FILS Discovery (FD) frame or Opportunistic Power Save (OPS) frame. If the bit in the traffic indication bitmap, corresponding to STA's AID value, is set to 1, it may indicate that the AP 105 will service (e.g., transmit DL or solicit UL or both) the non-AP STA 115. In some examples, the AP 105 may include multiple TIM elements in the TIM signal. In such cases, the position of the TIM element in the TIM signal that had the corresponding bit for the non-AP STA set to 1 may indicate which link the STA will be serviced. For example, if an AP 105 and a non-AP 115 may have two links between them, and a Beacon frame may carry two TIM elements. If the second TIM element indicates that the non-AP STA will be serviced, it may indicate that the non-AP STA will be serviced on the second link. The non-AP STA may receive the Beacon frame on the first link. If both TIM elements have the corresponding bit set for the non-AP STA, then it indicates that the STA will be serviced on both links (i.e., aggregation of both links). In some examples, if the links are close by, the aggregated transmissions on multiple links may be synchronized.

The AP 105 may assign a numeric value, such as an association identifier (AID), to a client (non-AP STA) during association. The TIM element may indicate buffered traffic. If the bit position in TIM bitmap corresponding to the client's AID value is set to 1, it may be an indication that the AP will service the STA. In some cases, the STA 115 may have a single TIM element, and the AID value would indicate whether the STA is being serviced on one or more links. In cases where the AP-client have two links between them, the AP can assign two AIDs to the STA. The first AID may correspond to a first link and the second AID may correspond to the second link. In the TIM element, if the AP 105 has set the bit corresponding to AID 2, then the STA may determine it will be serviced on the second link. If both bits are set to 1, then the STA may determine that the AP will service it on both links. In some cases, the transmissions may be synchronized based on how close the links are.

In some examples, a location of a set of resource units allocated to the first wireless device may be based on a set of association identifiers. For example, a resource unit location (e.g., whether the resource unit lies in the 1$^{st}$ or 2$^{nd}$ link) may be based on the AID value. An AID assigned to the STA may indicate whether the RU falls in the 1$^{st}$ or the 2$^{nd}$ link. In some cases, a location of the resource unit in the trigger frame may be based on a set of association identifiers, where the location of the resource unit is on the first wireless link, the second wireless link, or a combination thereof. In some examples, the location of the RU in the trigger frame may refer to whether the RU is in the first or second link.

Figure 12:
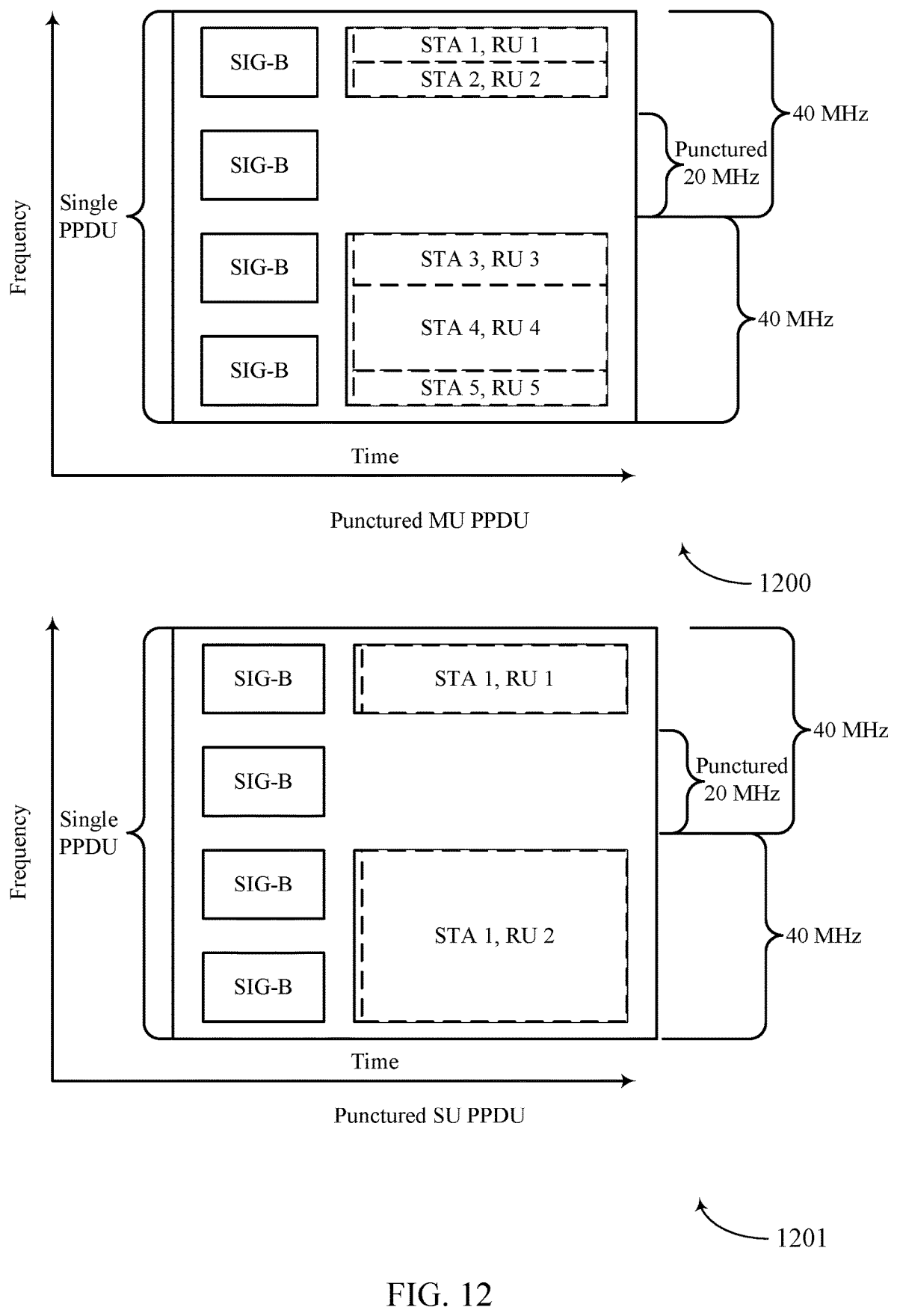

FIG. 12 illustrates examples of single PPDU configurations 1200 and 1201 that support design considerations for multi-link aggregation in accordance with aspects of the present disclosure. In some examples, single PPDU configurations 1200 and 1201 may implement aspects of wireless communication system 100. A wireless device operating according to the multi-link aggregation scheme 1100 or 1101 may be use a layer configuration 1000 as described in FIG. 10.

Some WLANs may support a mechanism to puncture a wide-band PPDU. For example, a wide-band PPDU may be punctured when there is narrowband interference that lies within the bandwidth of the PPDU. In some cases, the puncturing may be applied for HE multi-user transmissions.

The single PPDU configuration 1200 may be an example of a punctured multi-user PPDU configuration. A SIG-B field in the preamble may indicate the RU allocation for each recipient STA. For example, a receiving device may monitor a first link, receive the SIG-B, and determine that there is an additional RU allocation at a second link. The receiving device may begin monitoring the second link based on the information in the SIG-b. In some cases, there may be additional headers following the SIG-B to assist the receiving device in tuning radios to the indicated links. In some examples, the PPDU configuration 1200, and other punctured multi-user PPDU configurations, may support multi-link aggregation as well. For example, one user may be allocated multiple RUs, where there may be more than RU for a single receiver. The multiple RUs for a single user may or may not be contiguous. For example, in some cases, a first RU for a first STA 115 may be separated from a second RU for the first STA 115 by a third RU for a second STA 115.

In some cases, the puncturing scheme may be extended for a single user case. The single PPDU configuration 1201 may be an example of a punctured single user PPDU configuration. In some cases, the punctured single user PPDU configuration may use a multi-user PPDU formation. For example, the SIG-B may carry RU allocation information.

Figure 13:
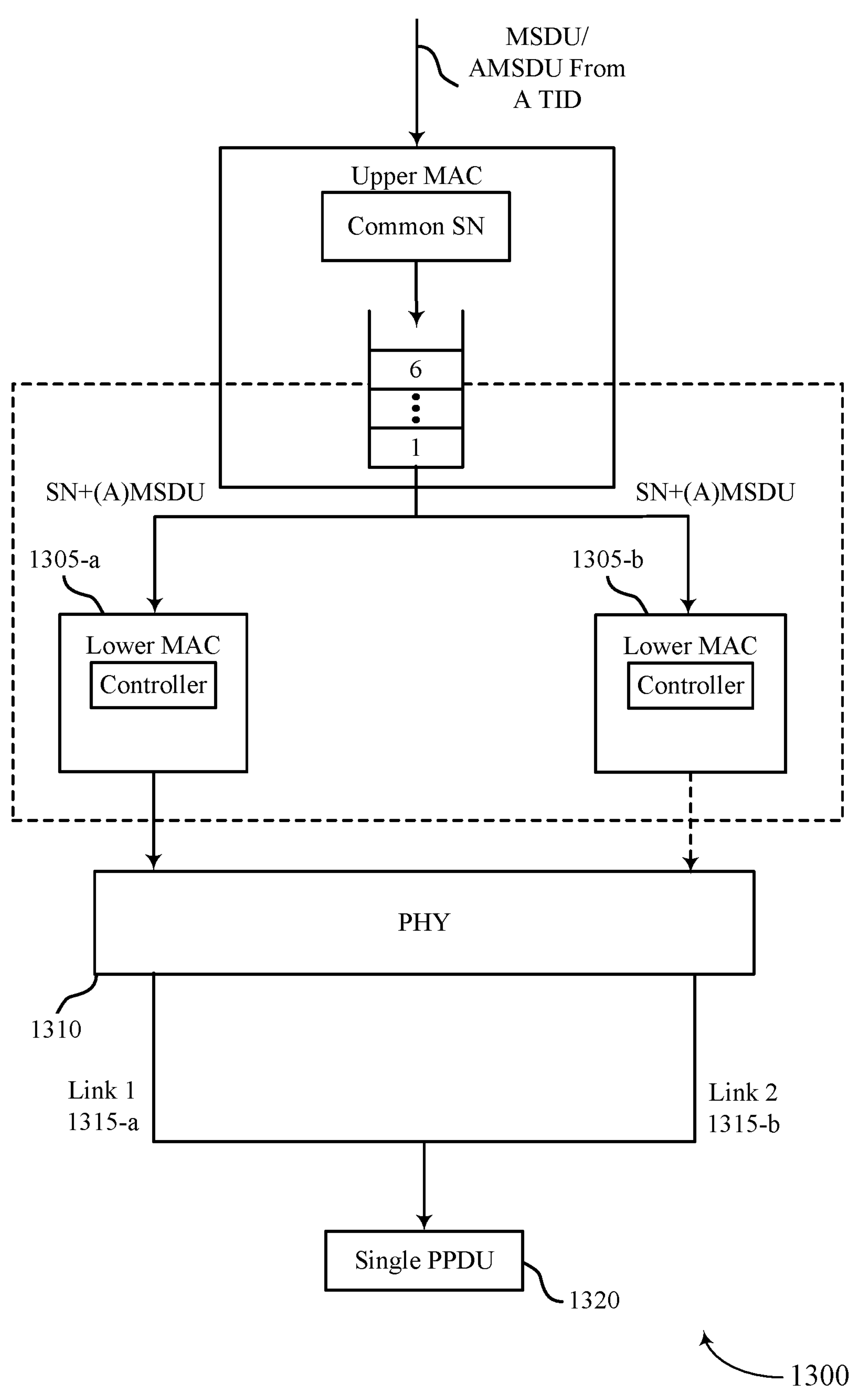
FIG. 13 and. 14 illustrate examples of layer configurations that support design considerations for multi-link aggregation in accordance with aspects of the present disclosure.

FIG. 13 illustrates an example of a layer configuration 1300 that supports design considerations for multi-link aggregation in accordance with aspects of the present disclosure. In some examples, layer configuration 1300 may implement aspects of wireless communication system 100. A wireless device operating according to the multi-link aggregation scheme 1100 or 1101 may be use a layer configuration 1000 as described in FIG. 10.

The layer configuration 1300 may show an example configuration for generating a single PSDU from one MAC entity. Each link 1315 may have its own primary channel. Each lower MAC instance 1305 may perform independent channel access on its own primary channel When the medium is available, lower MAC instance 1305-*a* may pass a PSDU to the PHY entity 1310. The transmission parameters for the PPDU, other than RU assignment, may be selected by lower MAC instance 1305-*a* and may be based on conditions of link 1315-*a* (e.g., link 1). In this example, there may not be an interface between the lower MAC instances 1305. The PHY 1310 may determine ED conditions on link 1315-*b* (e.g., link 2) and split the PSDU onto multiple RUs to generate a single punctured PPDU. In some cases, if the ED check fails, the PHY 1310 may transmit a single PPDU 1320 on just link 1315-*a* (e.g., link 1).

Figure 14:
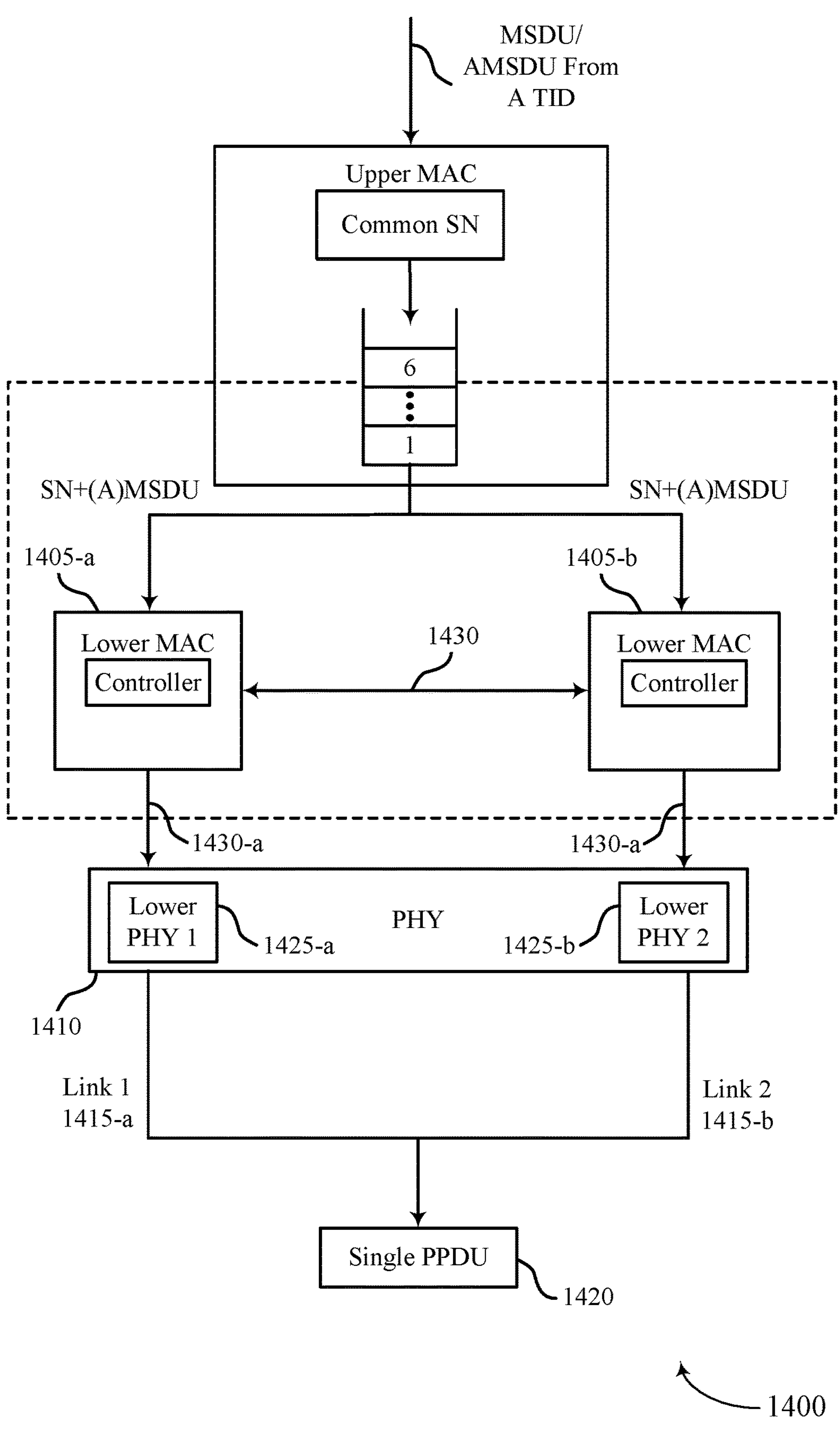

FIG. 14 illustrates an example of a layer configuration 1400 that supports design considerations for multi-link aggregation in accordance with aspects of the present disclosure. In some examples, layer configuration 1400 may implement aspects of wireless communication system 100. A wireless device operating according to the multi-link aggregation scheme 1100 or 1101 may be use a layer configuration 1000 as described in FIG. 10.

The layer configuration 1400 may show an example configuration for generating multiple PSDUs, each one from a separate MAC entity. In some cases, the multiple PSDUs may be carried in a single PPDU. Each lower MAC instance 1405 may perform independent channel access. If the medium is idle on a first lower MAC instance 1405-*a*, then the first lower MAC instance 1405-*a* may generate a PSDU. The first lower MAC instance 1405-*a* may generate the PSDU using transmit parameters, including RU allocation, based on channel conditions on 1415-*a* (e.g., link 1). The first lower MAC instance 1405-*a* may signal to a second lower MAC instance 1405-*b* via a connection 1430. In some cases, the signaling between the lower MAC instances 1405 may include PSDU duration constraints (e.g., a TXOP). Lower MAC instance 1405-*b* may perform an ED check on link 1415-*b* (e.g., link 2). If the ED threshold on link 2 is satisfied, the second lower MAC instance 1405-*b* may generate a PSDU with transmit parameters (e.g., including RU allocation) based on channel conditions on link 1415-*b* (e.g., link 2). In some cases, the PSDU duration may be bound by the TXOP specified by lower MAC instance 1405-*a*. Therefore, two PSDUs (e.g., one from each lower MAC instance 1405) may be passed to PHY entity 1410 via a connection 1430. A TXVECTOR may be an example of the connection 1430 between each MAC instance to the PHY entity 1410. In some cases, a single TXVECTOR may connect each lower MAC instance 1405 to the PHY entity 1410. In some cases, the PHY entity 1410 may include multiple lower PHY instances 1425. For example, lower MAC instance 1405-*a* may pass a PSDU to lower PHY instance 1425-*a*, and lower MAC instance 1405-*b* may pass a PSDU to lower PHY instance 1425-*b*. The PHY 1410 may transmit a single punctured PPDU 1420 generated based on the 2 PSDUs.

If the ED check fails on link 1415-*b*, then a single PSDU (e.g., from the first lower MAC instance 1405-*a*) may be passed to the PHY entity 1410. The PHY entity 1410 may transmit a single PPDU 1420 on link 1415-*a* which includes one PSDU (e.g., generated by the first lower MAC 1405-*a*).

Figure 15:
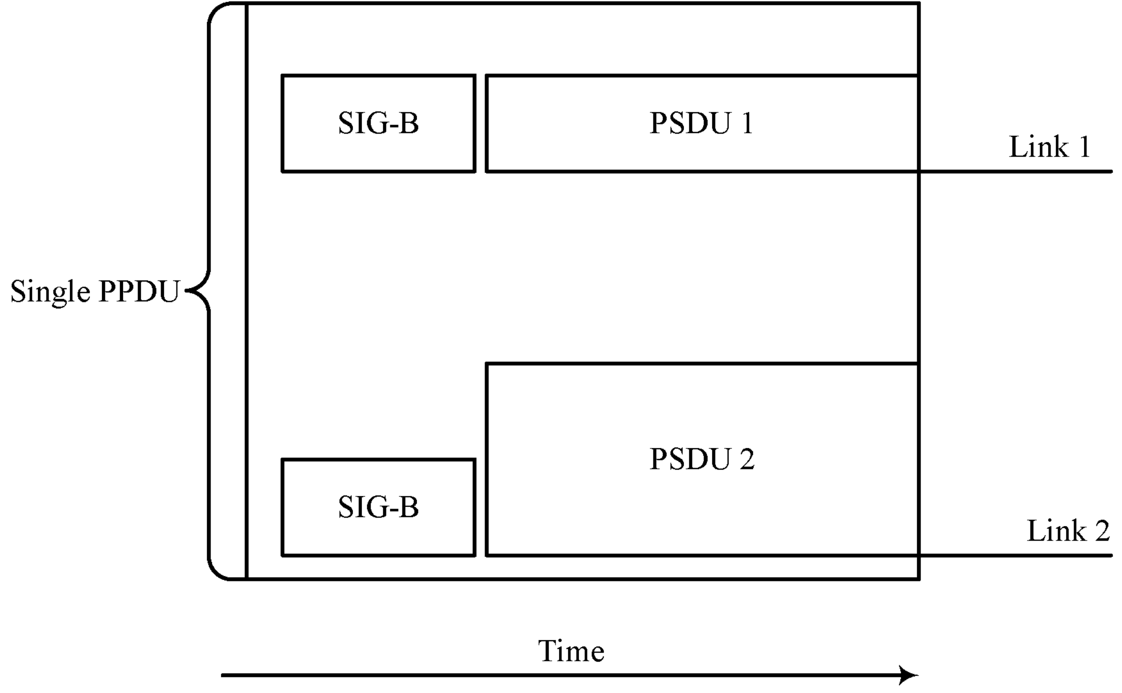
FIG. 15 illustrates an example of a PPDU generation that supports design considerations for multi-link aggregation in accordance with aspects of the present disclosure.

FIG. 15 illustrates an example of a PPDU generation 1500 that supports design considerations for multi-link aggregation in accordance with aspects of the present disclosure. In some examples, PPDU generation 1500 may implement aspects of wireless communication system 100. A wireless device operating according to the multi-link aggregation scheme 1100 or 1101 may be use a layer configuration 1000 as described in FIG. 10.

The PPDU generation 1500 may be based on the layer configuration 1400 of FIG. 14. In this example, multiple PSDUs may be generated, one PSDU per MAC instance (e.g., one per lower MAC instance). When both MACs provide PSDUs (e.g., based on passing preamble detection or ED checks), a PHY entity may generate a single user punctured PPDU for a STA 115 using the multiple PSDUs. In some cases, a SIG-B may indicate the RU allocations for the receiving STA 115. In some cases, more than one RU may be assigned to the same STA 115. The STA 115 may be parked on, camped on, or monitoring either link. In some cases, the SIG-B may be duplicated on both links. Therefore, the receiving wireless device may receive the SIG-B and the information for the PPDU regardless of which link is camped on. If an ED check fails, the PHY entity may transmit a single PPDU on just one link. The PHY entity may transmit the PPDU based on which MAC entity gained access to the medium.

Figure 16:
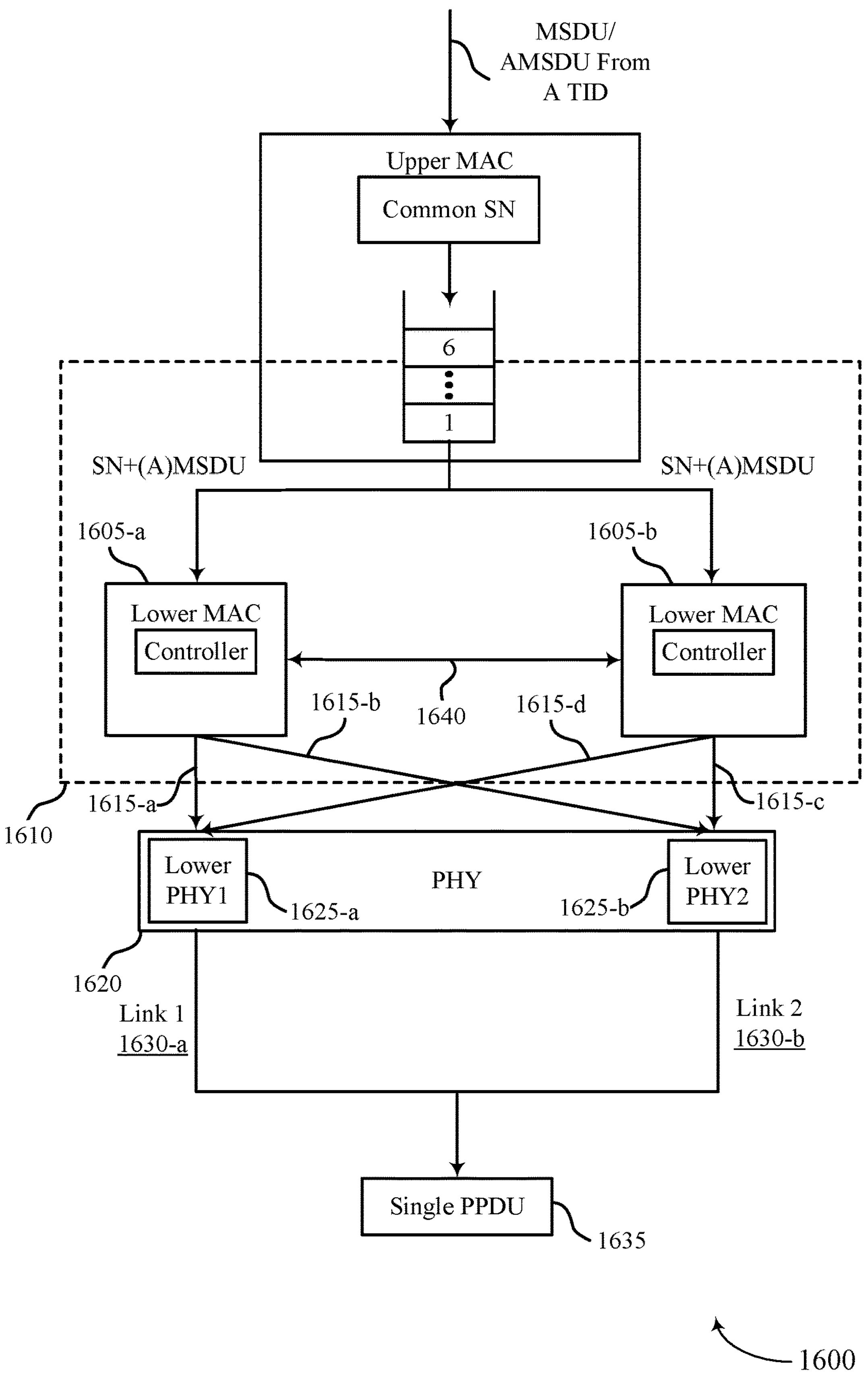
FIG. 16 illustrates an example of a layer configuration that supports design considerations for multi-link aggregation in accordance with aspects of the present disclosure.

FIG. 16 illustrates an example of a layer configuration 1600 that supports design considerations for multi-link aggregation in accordance with aspects of the present disclosure. In some examples, layer configuration 1600 may implement aspects of wireless communication system 100. A wireless device operating according to the multi-link aggregation scheme 1100 or 1101 may be use a layer configuration 1000 as described in FIG. 10.

The layer configuration 1600 may show an example configuration for generating multiple PSDUs from a single MAC. Each lower MAC instance 1605 may perform independent channel access. If the medium is idle on a first lower MAC instance 1605-*a*, then the first lower MAC instance 1605-*a* may generate a PSDU. The first lower MAC instance 1605-*a* may generate the PSDU using transmit parameters, including RU allocation, based on channel conditions of link 1630-*a* (e.g., link 1). The first lower MAC instance 1605-*a* may signal to a second lower MAC instance 1405-*b* via a connection 1430 to determine if link 1530-*b* (e.g., link 2) satisfies the ED check.

If the ED threshold on link 2 is satisfied (e.g., link 1630-*b* passes the ED check), then the first lower MAC instance 1605-*a* may generate a second PSDU (e.g., one lower MAC entity creates two PSDUs). The first lower MAC instance 1605-*a* may use transmit parameters, including RU allocation, based on channel conditions of link 1630-*b* (e.g., link 2). The first lower MAC instance 1605-*a* may receive the channel conditions of link 1630-*b* from the second lower MAC instance 1605-*b*, for example over a connection 1640. Therefore, two PSDUs may be passed to the PHY entity 1620 from the first lower MAC instance 1605-*a*. In some cases, a first PSDU may be sent from the lower MAC instance 1605 to a first lower PHY instance 1625-*a*, and a second PSDU may be sent from the lower MAC instance 1605-*a* to a second lower PHY instance 1625-*b*. The PHY entity 1620 may transmit a single punctured PPDU 1635 including the two PSDUs. Therefore, multiple PSDUs may be generated from a single MAC.

If the ED check fails on link 1630-*b*, then a single PSDU (e.g., from the first lower MAC instance 1615-*a*) may be passed to the PHY entity 1620. The PHY entity 1620 may transmit a single PPDU 1635 on link 1630-*a* which includes one PSDU (e.g., generated by the first lower MAC 1605-*a*). Each lower MAC instance 1605 may have multiple vectors 1615 (e.g., one per link) to all other PHY entities (e.g., the lower PHY instances 1625). In some cases, there may be a link ID parameter which may distinguish the lower PHY instances 1630.

Figure 17:
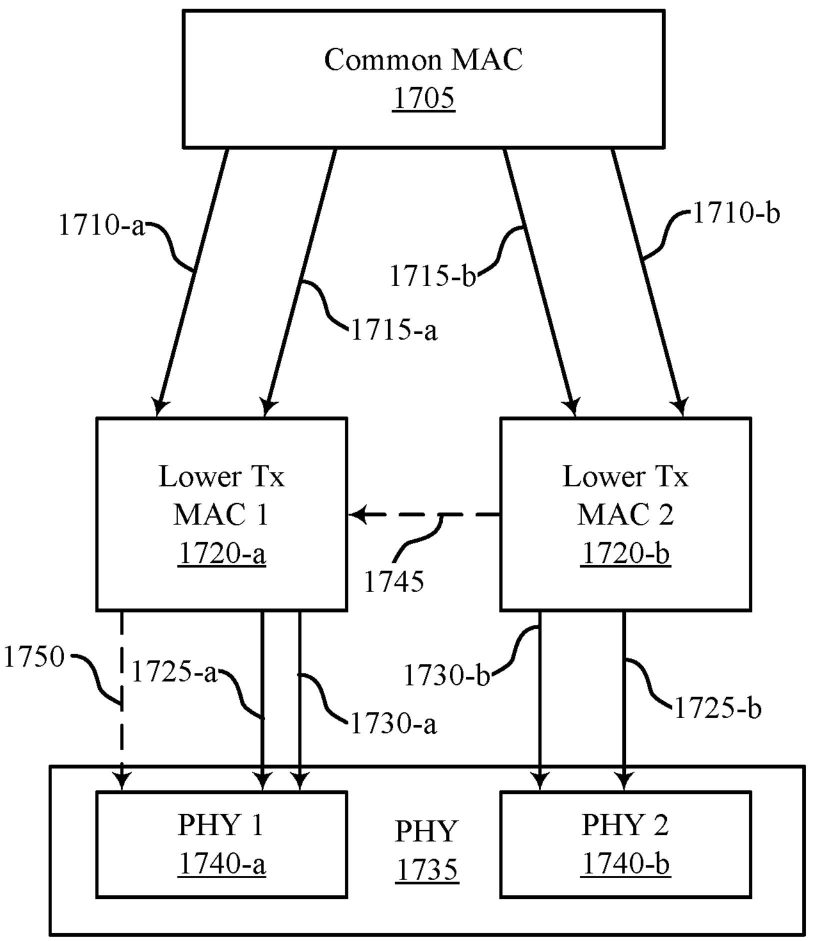
FIG. 17 illustrates an example of a layer configuration that supports design considerations for multi-link aggregation in accordance with aspects of the present disclosure.

FIG. 17 illustrates an example of a multi-link aggregation configuration 1700 that supports design considerations for multi-link aggregation in accordance with aspects of the present disclosure. In some examples, multi-link aggregation configuration 1700 may be used or configured, for example less than a threshold distance in frequency (e.g., less than 20 MHz, 40 MHz, or some other configured or preconfigured threshold value). In some examples, multi-link aggregation configuration 1700 may implement aspects of wireless communication system 100. The multi-link aggregation configuration may include aspects of one or more layer configurations described herein.

A common MAC 1705 at a client (e.g., a device such as a UE or STA 115 described herein) may make scheduling decisions based on certain constraints. In some cases, the common MAC 1705 may be referred to as an upper MAC. The common MAC 1705 may be aware of link availabilities, data rates, transmission opportunity timings, windows and bandwidths associated with a set of links for the UE or STA 115. In some cases, the constraints may include whether the links (e.g., associated with the different lower MACs 1720) are near or far, whether the PPDU scheme is synchronized or unsynchronized, whether there is a limit on the TxOP, etc. The common MAC 1705 may then generate MSDUs for the links based on these constraints and provide the MSDUs to the lower MACs 1720 associated with the links.

The common MAC 1705 may make scheduling decisions based on signaling received from the lower MACs 1720. For example, lower MAC 1720-*a* may gain access to the medium and indicate the gained access to the common MAC 1705. Lower MAC 1720-*a* may send its transmit parameters (e.g., or desired transmit parameters) to the common MAC 1705. The common MAC 1705 may check whether the link for lower MAC 1720-*b* is available. If lower MAC 1720-*b* is available, the lower MAC 1720-*b* may send its transmit parameters (e.g., or desired transmit parameters) to the common MAC 1705. The common MAC 1705 may make scheduling decisions based on the transmit parameters from the lower MACs 1720 and any constraints of one or more of the lower MACs (e.g., available TxOPs, maximum RU size, etc.). In some cases, the common MAC 1705 may generate a set of transmission parameters based on the indicated transmit parameters and constraints. In some cases, transmission parameters requested by the lower MACs 1720 or decided by the common MAC 1705 may include, for example, MCS, rate adaptation, and bandwidth. Some of the constraints may include, for example, an available number of MPDUs, an RU allocation The common MAC 1705 may, in some cases, maintain the block ACK space, the common sequence number space, and fragmentation, etc. Each link may have a different fragmentation requirement. If, for example, after constructing a PPDU, there may be some amount of remaining resources not used by the PPDU. The common MAC 1705 may fragment PPDUs to include some portion of a fragmented PPDU into the remaining resources. The common MAC 1705 may be able to fragment of various lengths. The common MAC 1705, based on fragmentation constraints of both links, may perform fragmentation when it provides MPDUs and fragments to each link.

The common MAC 1705 may send data over a data link 1715. For example, the common MAC 1705 may send a first MSDU over data link 1715-*a* to a first lower Tx MAC 1720-*a*, and the common MAC 1705 may send a second MSDU over data link 1715-*b* to a second lower Tx MAC 1720-*b*. The common MAC 1705 may send signaling (e.g., control or configuration indicators) over a signaling link 1710. For example, the common MAC 1705 may send a first set of transmit parameters for the first lower Tx MAC 1720-*a* over signaling link 1710-*a* and a second set of transmit parameters for the second lower Tx MAC 1720-*b* over signaling link 1710-*b*.

The lower Tx MACs 1720 may communicate with a PHY layer 1735 which includes one or more PHY entities 1740. A lower Tx MAC 1720 may communicate with a PHY entity 1740 using a signaling link 1725 and a data link 1730. For example, lower TX MAC 1720-*a* may, in some cases, send a first TXVECTOR over signaling link 1725-*a* and a first PSDU over data link 1730-*a*. Lower MAC 1720-*b* may, in some cases, send a second TXVECTOR over signaling link 1725-*b* and a second PSDU over data link 1730-*b*. In this example, multiple PHY entities 1740 may be implemented for the multi-layer aggregation configuration 1700.

In some examples, such as a punctured PPDU example described herein, a lower Tx MAC 1720 may provide a set of transmit parameters over a link 1745 to another lower TX MAX 1720. The lower TX MAC 1720 may send TXVECTORs over a link 1750 for both lower Tx MACs 1720 to a single PHY entity 1740. In some cases, the punctured PPDU example may use multiple PHY layers. Therefore, there may be additional coordination or signaling between the lower Tx MACs 1720 to determine scheduling for the punctured PPDU across multiple PHY layers.

In a punctured PPDU scheme, system information block (SIB) information on the second link may not have information based on the first link, as the PHY of the second link may be separate and independent of the PHY of the first link. The multi-link aggregation scheme may support techniques to ensure that the SIB of the PPDU on the first link is the same as the SIB of the PPDU on the second link. In a first example, the common MAC 1705 may provide transmit parameters for both links to both lower MACs 1720. Then, lower MAC 1720-*b* (e.g., for the second link) may have information related to the lower 1720-*a* (e.g., for the anchor or first link), and the lower MACs 1720 may be able to generate the same SIB. Or, in some cases, one lower MAC 1720 may send its transmit parameters to another lower MAC 1720. For example, lower MAC 1720-*b* may send transmit parameters over the link 1745 to lower MAC 1720-*a*. Lower MAC 1720-*a* may then send the transmit parameters (e.g., or TXVECTORs) for both lower MACs 1720 to the PHY layer 1735. In some examples, lower MAC 1720-*a* may supply its transmit parameters to lower MAC 1720-*b*, and lower MAC 1720-*b* may send a TXVECTOR for both lower MACs 1720 to the PHY layer 1735.

In some cases, one lower MAC 1720 may provide both PPDUs, where the one lower MAC 1720 sends information for two different sets of data (e.g., both PPDUs) but one TXVECTOR. The lower MAC 1720 may then generate a common SIB for both PPDUs. Or, in some cases, one lower MAC 1720 may give one PSDU and one TXVECTOR to the PHY layer 1735, and the PHY layer 1735 may split the PPDUs across the two links.

Figure 18:
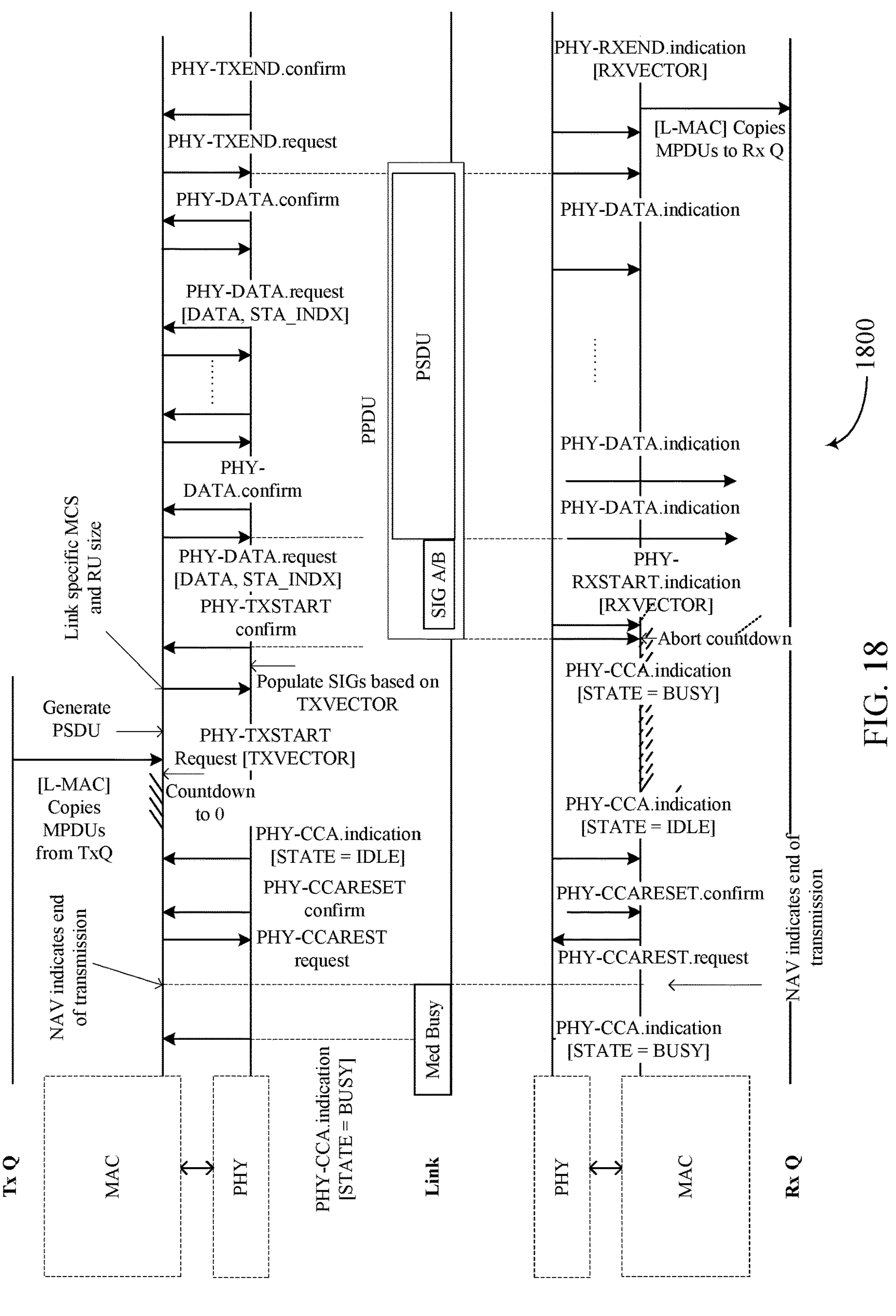
FIG. 18 through 27 illustrate examples of flowcharts that support design considerations for multi-link aggregation in accordance with aspects of the present disclosure.

FIG. 18 illustrates an example of a flowchart 1800 that supports design considerations for multi-link aggregation in accordance with aspects of the present disclosure. In some examples, flowchart 1800 may implement aspects of wireless communication system 100. In some examples, a wireless device such as a STA 115 or an AP 105, which may operate as a transmitting wireless device, or a receiving wireless device, or both, may apply all or portions of flowchart 1800 to support multi-link aggregation when operating in accordance with the techniques described herein, for example as described with reference to any of FIGS. 1 through 16.

Figure 19:
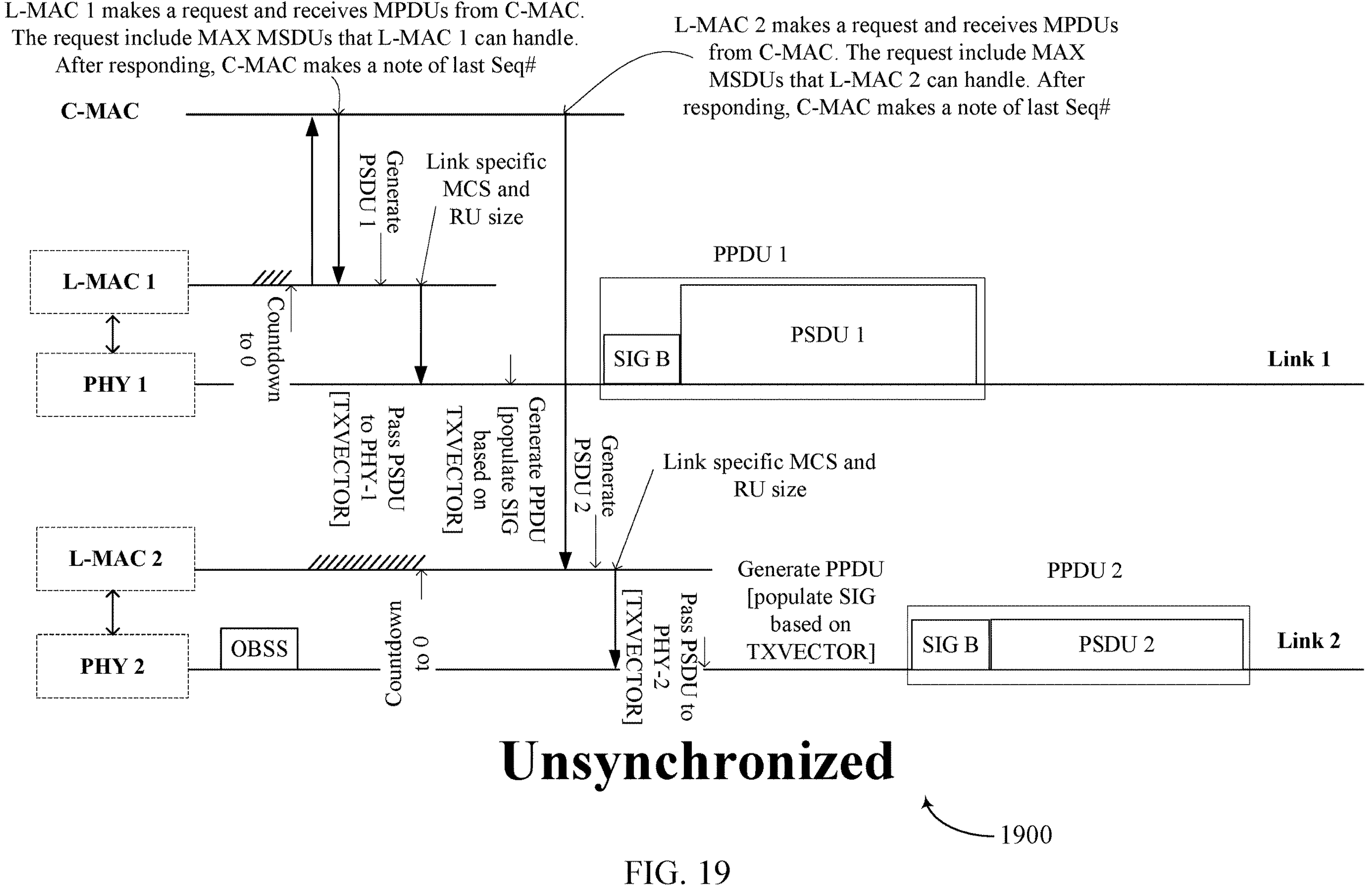

FIG. 19 illustrates an example of a flowchart 1900 that supports design considerations for multi-link aggregation in accordance with aspects of the present disclosure. In some examples, flowchart 1900 may implement aspects of wireless communication system 100. In some examples, a wireless device such as a STA 115 or an AP 105, which may operate as a transmitting wireless device, or a receiving wireless device, or both, may apply all or portions of flowchart 1900 to further support multi-link aggregation when operating in accordance with the techniques described herein, for example as described with reference to any of FIGS. 1 through 16. In particular, flowchart 1900 may further describe aspects of techniques for multi-link aggregation when the links are unsynchronized (e.g., generating unsynchronized PPDUs), and the links perform independent contention, for example as discussed with reference to FIG. 11.

Figure 20:
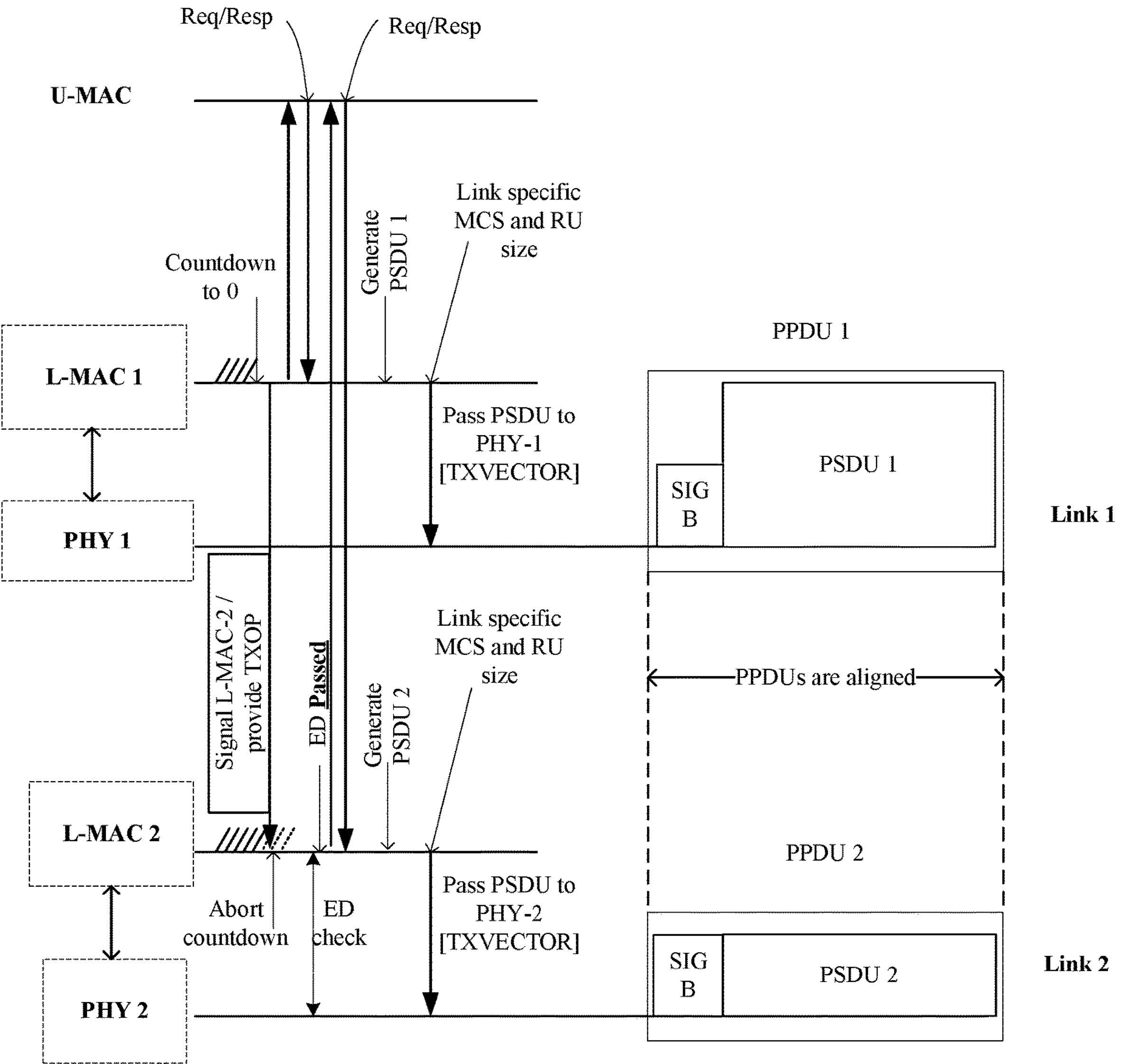

FIG. 20 illustrates an example of a flowchart 2000 that supports design considerations for multi-link aggregation in accordance with aspects of the present disclosure. In some examples, flowchart 2000 may implement aspects of wireless communication system 100. In some examples, a wireless device such as a UE 115 or an AP 105, which may operate as a transmitting wireless device, or a receiving wireless device, or both, may apply all or portions of flowchart 2000 to further support multi-link aggregation when operating in accordance with the techniques described herein, for example as described with reference to any of FIGS. 1 through 16. In particular, flowchart 2000 may further describe aspects of techniques for multi-link aggregation when the links are synchronized (e.g., generating synchronized separate PPDUs), and both links of the multi-link aggregation scheme are available, for example as discussed with reference to FIG. 11.

Figure 21:
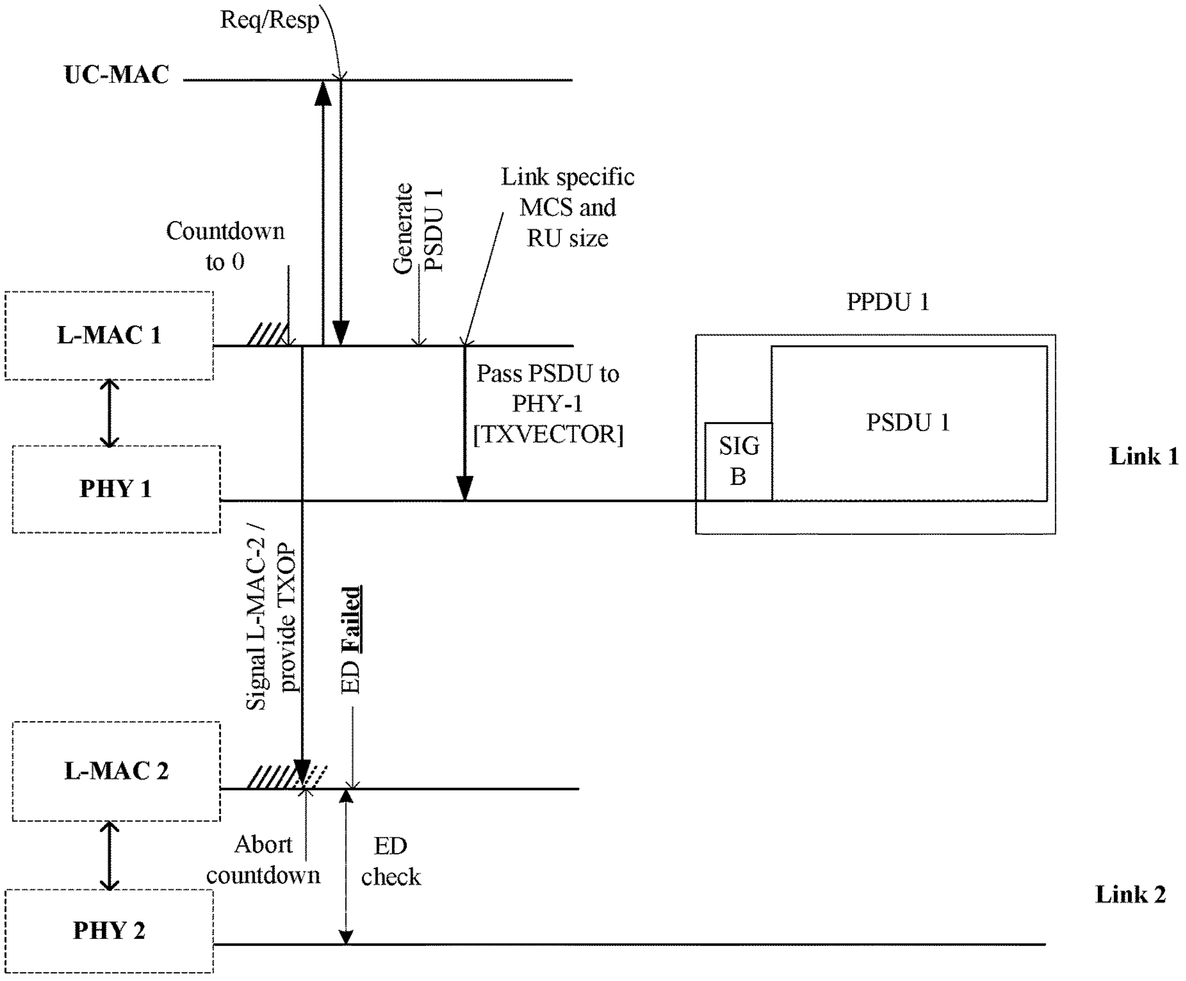

FIG. 21 illustrates an example of a flowchart 2100 that supports design considerations for multi-link aggregation in accordance with aspects of the present disclosure. In some examples, flowchart 2100 may implement aspects of wireless communication system 100. In some examples, a wireless device such as a UE 115 or an AP 105, which may operate as a transmitting wireless device, or a receiving wireless device, or both, may apply all or portions of flowchart 2100 to further support multi-link aggregation when operating in accordance with the techniques described herein, for example as described with reference to any of FIGS. 1 through 16. In particular, flowchart 2100 may further describe aspects of techniques for multi-link aggregation when the links are synchronized (e.g., generating synchronized separate PPDUs), and one of the links of the multi-link aggregation scheme is available, for example as discussed with reference to FIG. 11.

Figure 22:
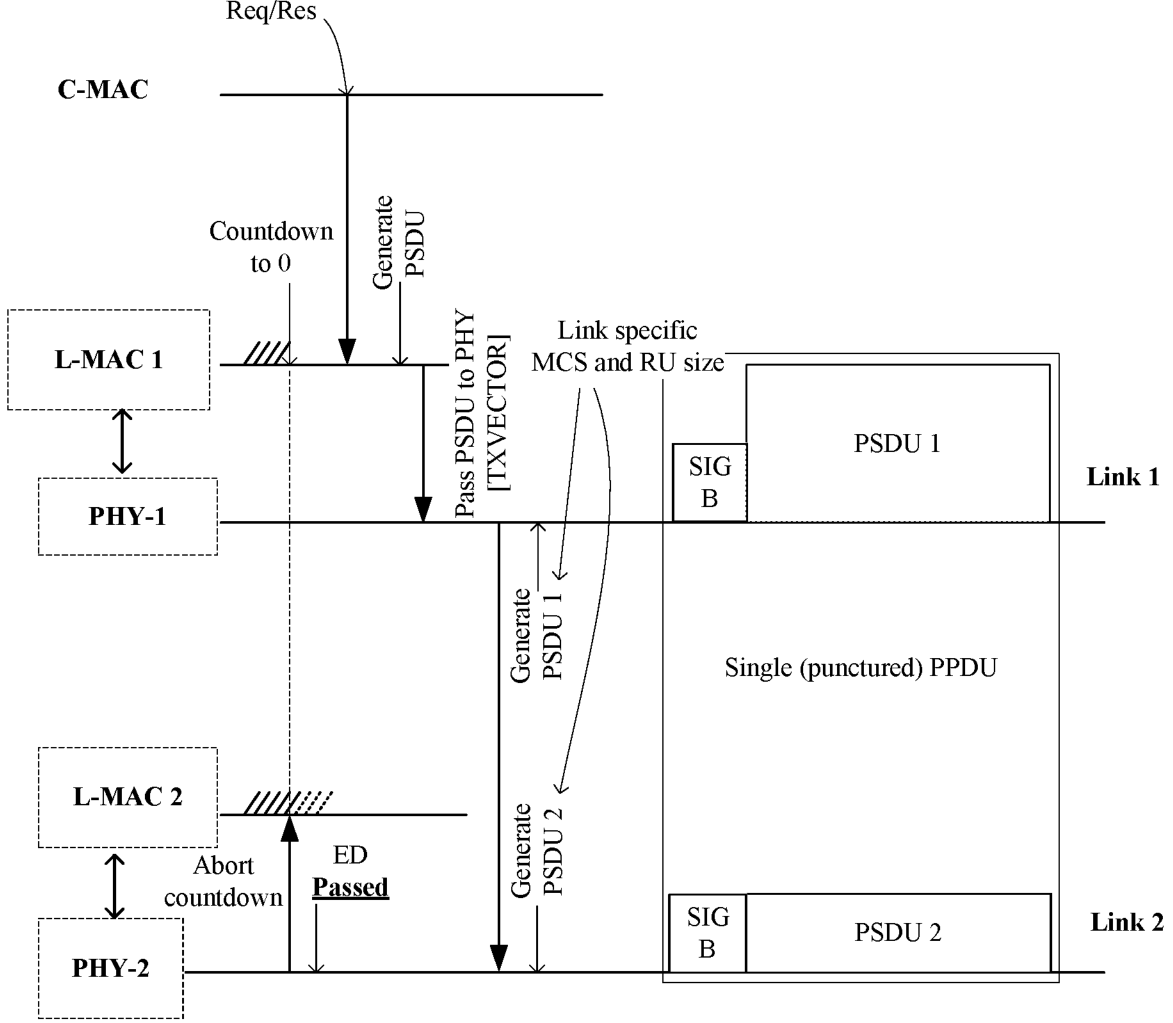

FIG. 22 illustrates an example of a flowchart 2200 that supports design considerations for multi-link aggregation in accordance with aspects of the present disclosure. In some examples, flowchart 2200 may implement aspects of wireless communication system 100. In some examples, a wireless device such as a UE 115 or an AP 105, which may operate as a transmitting wireless device, or a receiving wireless device, or both, may apply all or portions of flowchart 2200 to further support multi-link aggregation when operating in accordance with the techniques described herein, for example as described with reference to any of FIGS. 1 through 16. In particular, flowchart 2200 may further describe aspects of techniques for multi-link aggregation when the links are synchronized (e.g., generating synchronized separate PPDUs). Flowchart 2200 may describe aspects of techniques for generating a single PSDU from one MAC when both links are available, for example as discussed with reference to FIG. 13.

Figure 23:
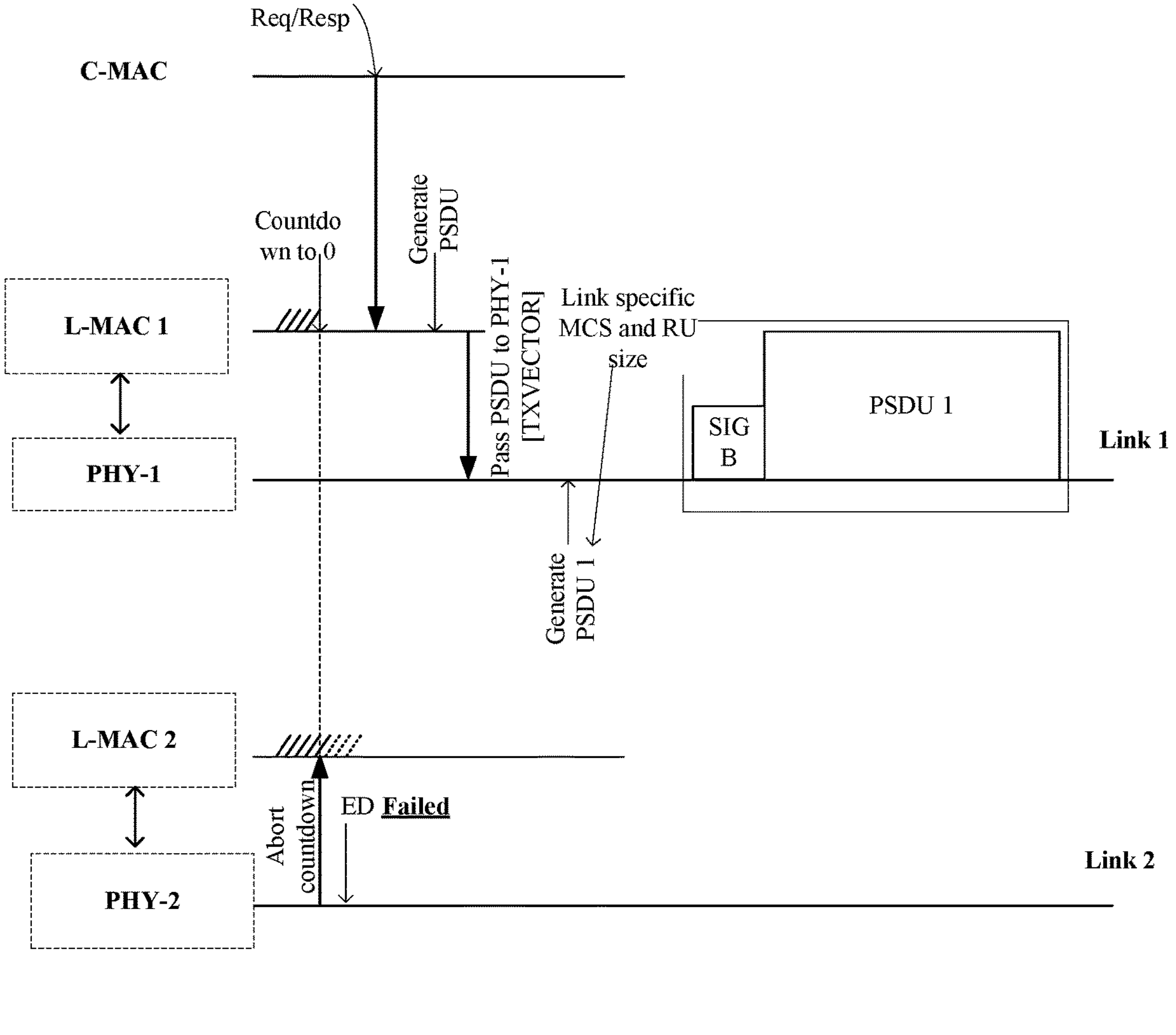

FIG. 23 illustrates an example of a flowchart 2300 that supports design considerations for multi-link aggregation in accordance with aspects of the present disclosure. In some examples, flowchart 2300 may implement aspects of wireless communication system 100. In some examples, a wireless device such as a UE 115 or an AP 105, which may operate as a transmitting wireless device, or a receiving wireless device, or both, may apply all or portions of flowchart 2300 to further support multi-link aggregation when operating in accordance with the techniques described herein, for example as described with reference to any of FIGS. 1 through 16. In particular, flowchart 2300 may further describe aspects of techniques for multi-link aggregation when the links are synchronized (e.g., generating synchronized separate PPDUs). Flowchart 2300 may describe aspects of techniques for generating a single PSDU from one MAC when one link is available, for example as discussed with reference to FIG. 13.

Figure 24:
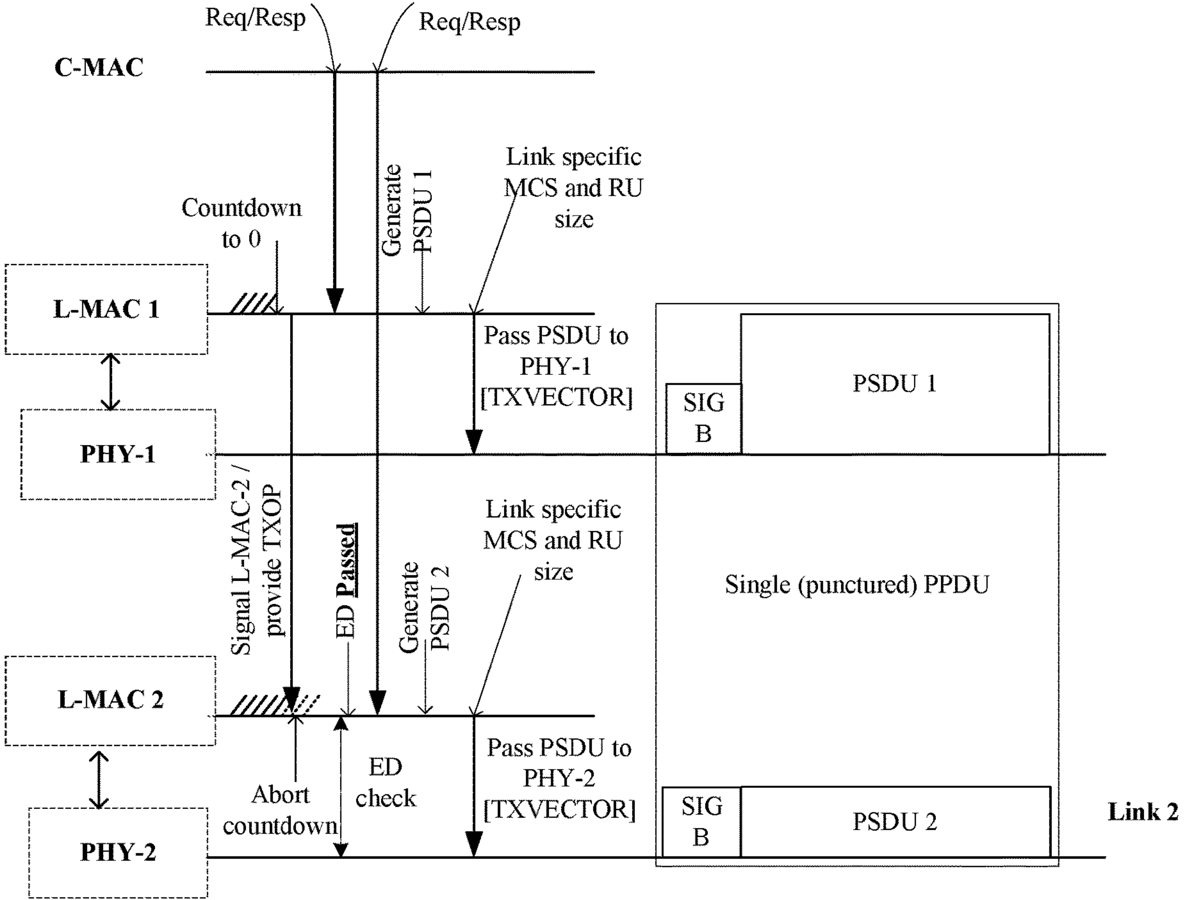

FIG. 24 illustrates an example of a flowchart 2400 that supports design considerations for multi-link aggregation in accordance with aspects of the present disclosure. In some examples, flowchart 2400 may implement aspects of wireless communication system 100. In some examples, a wireless device such as a UE 115 or an AP 105, which may operate as a transmitting wireless device, or a receiving wireless device, or both, may apply all or portions of flowchart 2300 to further support multi-link aggregation when operating in accordance with the techniques described herein, for example as described with reference to any of FIGS. 1 through 16. In particular, flowchart 2300 may further describe aspects of techniques for multi-link aggregation when the links are synchronized (e.g., generating synchronized separate PPDUs). Flowchart 2300 may describe aspects of techniques for generating a PSDU from each MAC, and when both links are available, for example as discussed with reference to FIG. 14.

Figure 25:
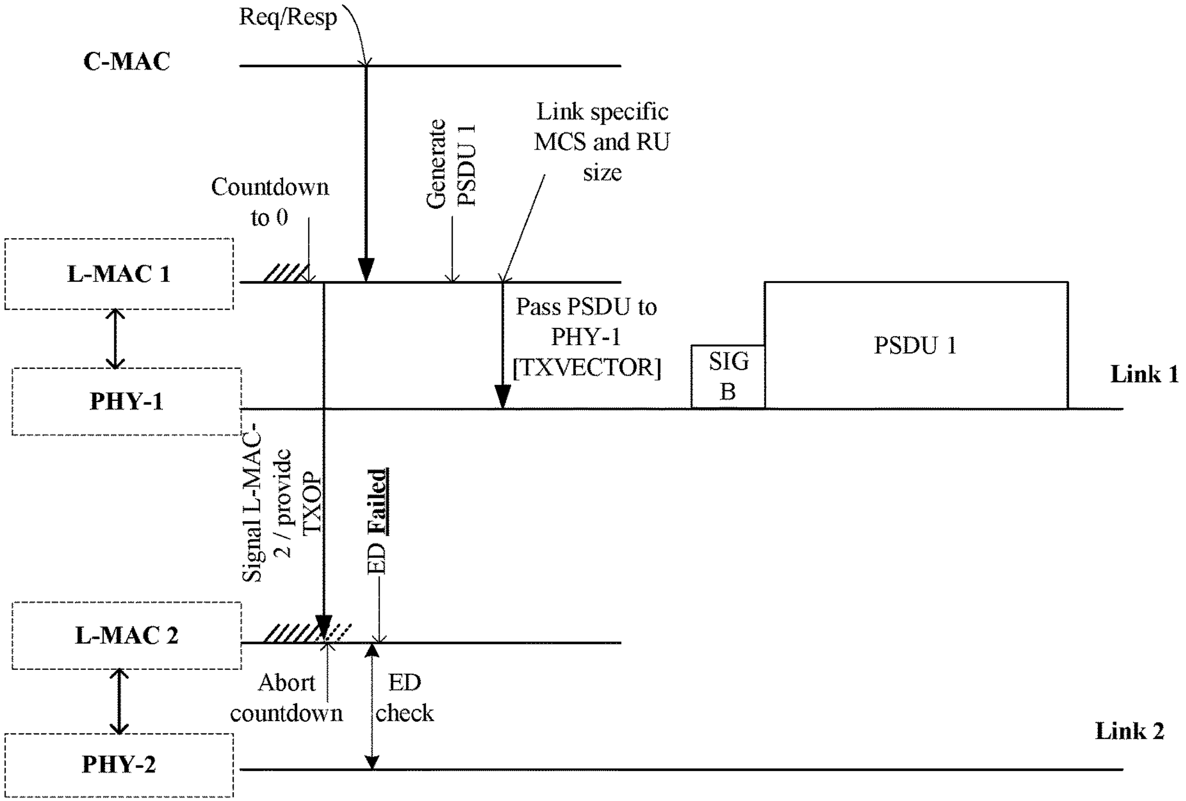

FIG. 25 illustrates an example of a flowchart 2500 that supports design considerations for multi-link aggregation in accordance with aspects of the present disclosure. In some examples, flowchart 2500 may implement aspects of wireless communication system 100. In some examples, a wireless device such as a UE 115 or an AP 105, which may operate as a transmitting wireless device, or a receiving wireless device, or both, may apply all or portions of flowchart 2500 to further support multi-link aggregation when operating in accordance with the techniques described herein, for example as described with reference to any of FIGS. 1 through 16. In particular, flowchart 2500 may further describe aspects of techniques for multi-link aggregation when the links are synchronized (e.g., generating synchronized separate PPDUs). Flowchart 2500 may describe aspects of techniques for generating a PSDU from each MAC, and when one link is available, for example as discussed with reference to FIG. 14.

Figure 26:
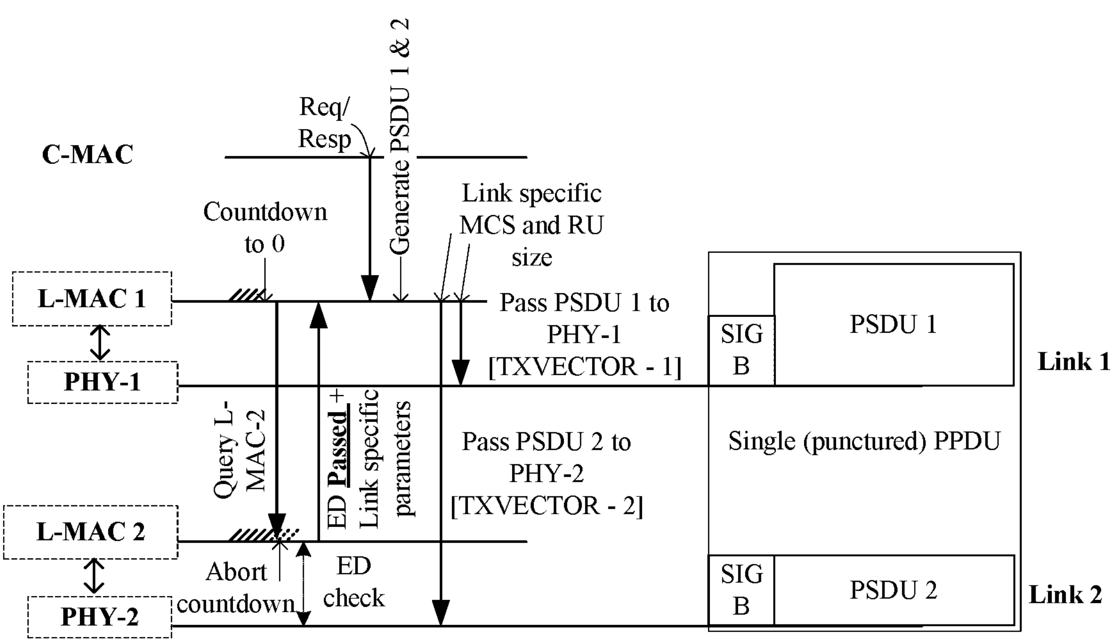

FIG. 26 illustrates an example of a flowchart 2600 that supports design considerations for multi-link aggregation in accordance with aspects of the present disclosure. In some examples, flowchart 2600 may implement aspects of wireless communication system 100. In some examples, a wireless device such as a UE 115 or an AP 105, which may operate as a transmitting wireless device, or a receiving wireless device, or both, may apply all or portions of flowchart 2600 to further support multi-link aggregation when operating in accordance with the techniques described herein, for example as described with reference to any of FIGS. 1 through 16. In particular, flowchart 2600 may further describe aspects of techniques for multi-link aggregation when the links are synchronized (e.g., generating synchronized separate PPDUs). Flowchart 2600 may describe aspects of techniques for generating multiple PSDUs from a single MAC, and when both links are available, for example as discussed with reference to FIG. 16.

Figure 27:
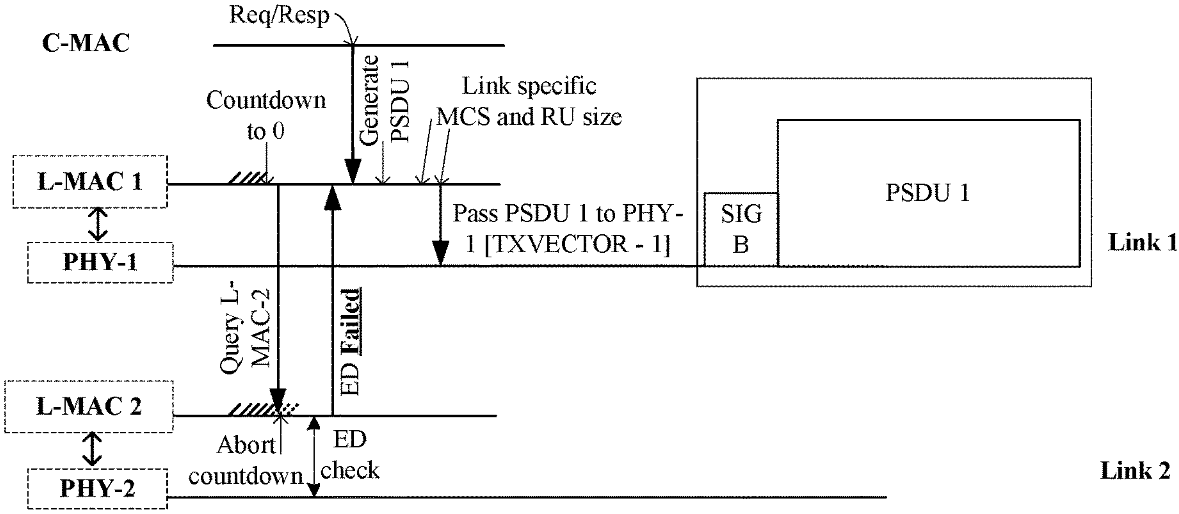

FIG. 27 illustrates an example of a flowchart 2700 that supports design considerations for multi-link aggregation in accordance with aspects of the present disclosure. In some examples, flowchart 2700 may implement aspects of wireless communication system 100. In some examples, a wireless device such as a UE 115 or an AP 105, which may operate as a transmitting wireless device, or a receiving wireless device, or both, may apply all or portions of flowchart 2700 to further support multi-link aggregation when operating in accordance with the techniques described herein, for example as described with reference to any of FIGS. 1 through 16. In particular, flowchart 2700 may further describe aspects of techniques for multi-link aggregation when the links are synchronized (e.g., generating synchronized separate PPDUs). Flowchart 2700 may describe aspects of techniques for generating multiple PSDUs from a single MAC, and when one link is available, for example as discussed with reference to FIG. 16.

Figure 28:
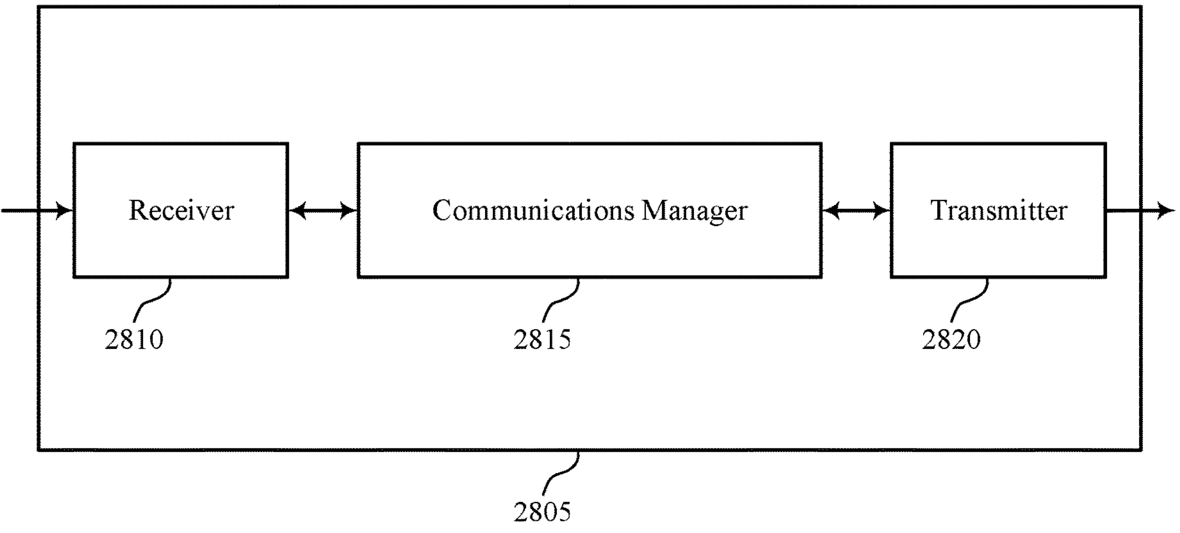
FIGS. 28 and 29 show block diagrams of devices that support design considerations for multi-link aggregation in accordance with aspects of the present disclosure.

FIG. 28 shows a block diagram 2800 of a device 2805 that supports design considerations for multi-link aggregation in accordance with aspects of the present disclosure. The device 2805 may be an example of aspects of a STA 115 or AP 105 as described herein. The device 2805 may include a receiver 2810, a communications manager 2815, and a transmitter 2820. The device 2805 may also include a processor. Each of these components may be in communication with one another (e.g., via one or more buses).

Receiver 2810 may receive information such as packets, user data, or control information associated with various information channels (e.g., control channels, data channels, and information related to design considerations for multi-link aggregation when the channels are in close proximity, etc.). Information may be passed on to other components of the device. The receiver 2810 may be an example of aspects of the transceiver 3120 described with reference to FIG. 31. The receiver 2810 may utilize a single antenna or a set of antennas.

The communications manager 2815 may identify a message for parallel transmission on at least a first wireless link and a second wireless link of a set of wireless links between the first wireless device and a second wireless device, the set of wireless links supporting parallel transmissions during a multi-link session, perform, during a first time period, a CCA procedure on the first wireless link and the second wireless link, determine, based on the performed CCA procedure, to transmit on the first wireless link and refrain from transmitting on the second wireless link, modify, for a second time period based on the determining, a transmission parameter for the first wireless link, or a CCA parameter for the second wireless link, or a combination thereof, and perform, during the second time period based on the modifying, the CCA procedure on the second wireless link and transmission of at least a first portion of the message on the first wireless link.

The communications manager 2815 may also establish a set of wireless links between the first wireless device and a second wireless device, the set of wireless links supporting parallel transmissions during a multi-link session and including at least a first wireless link and a second wireless link, configure a first data unit including a first portion of a message to be transmitted on the first wireless link and a second data unit including a second portion of the message to be transmitted on the second wireless link, the first data unit and the second data unit scheduled to terminate at a same time, transmit, to the second wireless device based on the configuring, the first data unit on the first wireless link and the second data unit on the second wireless link, and transmit, to the second wireless device, a signal to solicit an acknowledgement or negative acknowledgement for the first data unit, or the second data unit, or a combination thereof.

The communications manager 2815 may also establish a set of wireless links between the station and an AP, the set of wireless links supporting parallel transmissions during a multi-link session and including at least a first wireless link and a second wireless link, receive, from the AP, a configuration indicating that the station may transmit a channel reservation signal to the AP prior to transmitting on the set of wireless links, transmit, according to the received configuration, a channel reservation signal to the AP based on a result of a CCA procedure on the set of wireless links indicating a clear channel for the first wireless link, receive a response to the channel reservation signal from the AP, and transmit on the first wireless link and the second wireless link based on receiving the response to the channel reservation signal.

The communications manager 2815 may also establish a set of wireless links between the access point and a station, the set of wireless links supporting parallel transmissions during a multi-link session and including at least a first wireless link and a second wireless link, transmit, to the station, a configuration indicating that the station may transmit a channel reservation signal to the AP prior to transmitting on the set of wireless links, receive, according to the received configuration, a channel reservation signal from the station, transmit, to the station, a response to the channel reservation signal, and receive communications from the station on the first wireless link and the second wireless link based on the transmitted response to the channel reservation signal.

The communications manager 2815 may also establish a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device, identify one or more data units to be transmitted on the set of wireless links, perform, by the first MAC entity, a CCA procedure on the first wireless link, perform, by the second MAC entity, the CCA procedure on the second wireless link, generate at least one physical layer convergence protocol (PLCP) protocol data unit (PPDU) from the identified one or more data units based on a result of the performed CCA procedure on the first wireless link and the performed CCA procedure on the second wireless link, and transmit the generated at least one PPDU on the first wireless link, or the second wireless link, or a combination thereof. The communications manager 2815 may be an example of aspects of the communications manager 3110 described herein.

The actions performed by the communications manager 2715 as described herein may be implemented to realize one or more potential advantages. One implementation may enable a wireless device, such as an STA or an AP, to detect or prevent ACI related issues for aggregating adjacent links. Such detection or prevention may enable for interference mitigation techniques (e.g., reducing transmission power of a first link, implementing SIFS transmissions, or adjusting the CCA of the second link), which may result in higher data rates and more efficient communications (e.g., less communication errors), among other advantages.

Based on implementing the detection and prevention as described herein, a processor of a wireless device (e.g., a processor controlling the receiver 2810, the communications manager 2815, the transmitter 2820, or a combination thereof) may reduce the impact or likelihood of ACI in a communications system while ensuring relatively efficient communications. For example, the reporting techniques described herein may leverage transmission power, SIFS transmissions, or CCAs to transmit with reduced interference, which may realize reduced signaling overhead and power savings, among other benefits.

The communications manager 2815, or its sub-components, may be implemented in hardware, code (e.g., software or firmware) executed by a processor, or any combination thereof. If implemented in code executed by a processor, the functions of the communications manager 2815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 2815, or its sub-components, may be physically located at various positions, including being distributed such that portions of functions are implemented at different physical locations by one or more physical components. In some examples, the communications manager 2815, or its sub-components, may be a separate and distinct component in accordance with various aspects of the present disclosure. In some examples, the communications manager 2815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 2820 may transmit signals generated by other components of the device. In some examples, the transmitter 2820 may be collocated with a receiver 2810 in a transceiver module. For example, the transmitter 2820 may be an example of aspects of the transceiver 3120 described with reference to FIG. 31. The transmitter 2820 may utilize a single antenna or a set of antennas.

Figure 29:
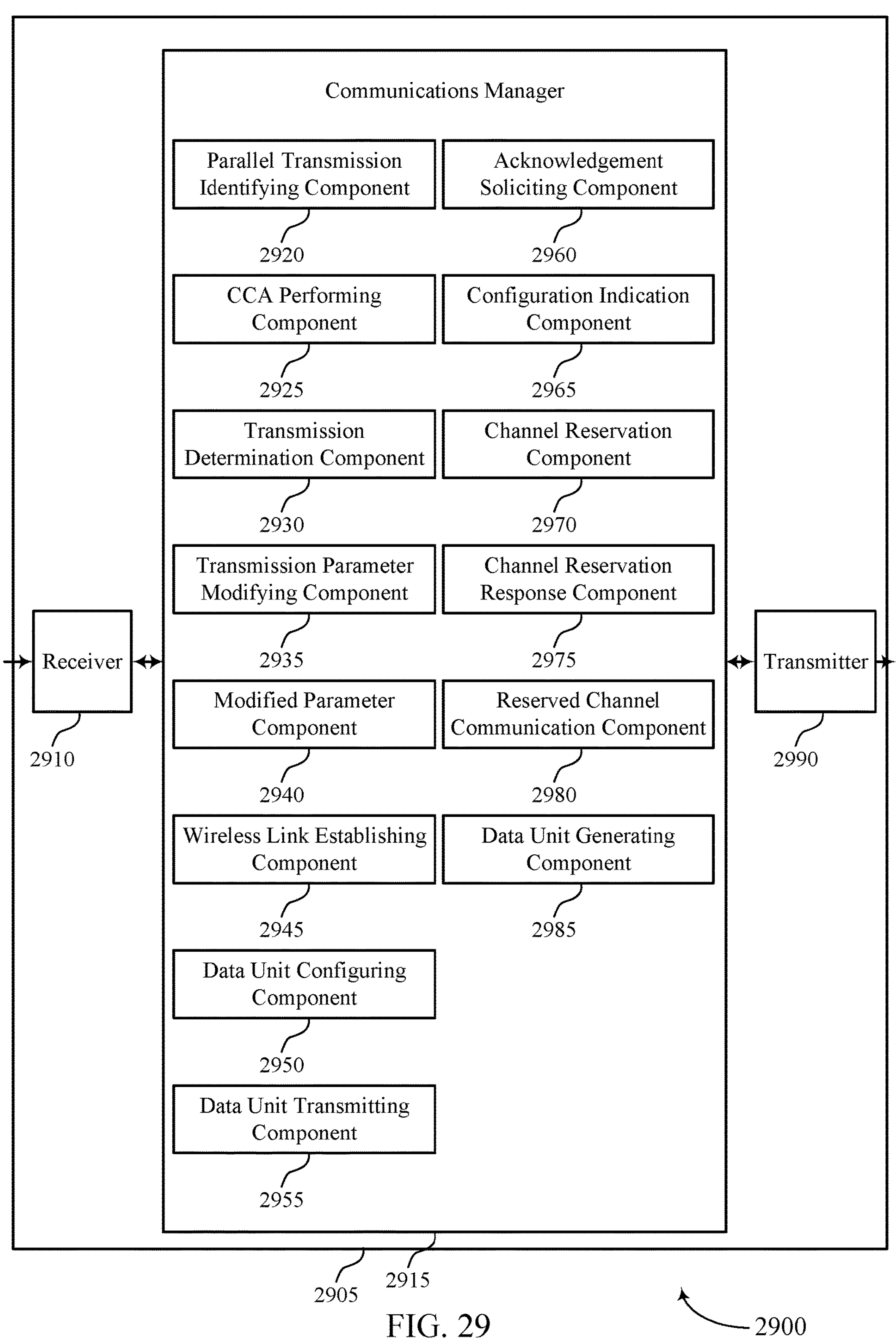

FIG. 29 shows a block diagram 2900 of a device 2905 that supports design considerations for multi-link aggregation in accordance with aspects of the present disclosure. The device 2905 may be an example of aspects of a device 2805 or a STA 115 or AP 105 as described herein. The device 2905 may include a receiver 2910, a communications manager 2915, and a transmitter 2990. The device 2905 may also include a processor. Each of these components may be in communication with one another (e.g., via one or more buses).

Receiver 2910 may receive information such as packets, user data, or control information associated with various information channels (e.g., control channels, data channels, and information related to design considerations for multi-link aggregation when the channels are in close proximity, etc.). Information may be passed on to other components of the device. The receiver 2910 may be an example of aspects of the transceiver 3120 described with reference to FIG. 31. The receiver 2910 may utilize a single antenna or a set of antennas.

The communications manager 2915 may be an example of aspects of the communications manager 2815 as described herein. The communications manager 2915 may include a parallel transmission identifying component 2920, a CCA performing component 2925, a transmission determination component 2930, a transmission parameter modifying component 2935, a modified parameter component 2940, a wireless link establishing component 2945, a data unit configuring component 2950, a data unit transmitting component 2955, an acknowledgement soliciting component 2960, a configuration indication component 2965, a channel reservation component 2970, a channel reservation response component 2975, a reserved channel communication component 2980, and a data unit generating component 2985. The communications manager 2915 may be an example of aspects of the communications manager 3110 described herein.

The parallel transmission identifying component 2920 may identify a message for parallel transmission on at least a first wireless link and a second wireless link of a set of wireless links between the first wireless device and a second wireless device, the set of wireless links supporting parallel transmissions during a multi-link session.

The CCA performing component 2925 may perform, during a first time period, a CCA procedure on the first wireless link and the second wireless link.

The transmission determination component 2930 may determine, based on the performed CCA procedure, to transmit on the first wireless link and refrain from transmitting on the second wireless link.

The transmission parameter modifying component 2935 may modify, for a second time period based on the determining, a transmission parameter for the first wireless link, or a CCA parameter for the second wireless link, or a combination thereof.

The modified parameter component 2940 may perform, during the second time period based on the modifying, the CCA procedure on the second wireless link and transmission of at least a first portion of the message on the first wireless link.

The wireless link establishing component 2945 may establish a set of wireless links between the first wireless device and a second wireless device, the set of wireless links supporting parallel transmissions during a multi-link session and including at least a first wireless link and a second wireless link.

The data unit configuring component 2950 may configure a first data unit including a first portion of a message to be transmitted on the first wireless link and a second data unit including a second portion of the message to be transmitted on the second wireless link, the first data unit and the second data unit scheduled to terminate at a same time.

The data unit transmitting component 2955 may transmit, to the second wireless device based on the configuring, the first data unit on the first wireless link and the second data unit on the second wireless link.

The acknowledgement soliciting component 2960 may transmit, to the second wireless device, a signal to solicit an acknowledgement or negative acknowledgement for the first data unit, or the second data unit, or a combination thereof.

The wireless link establishing component 2945 may establish a set of wireless links between the first station and a second station, the set of wireless links supporting parallel transmissions during a multi-link session and including at least a first wireless link and a second wireless link.

The configuration indication component 2965 may receive, from the second station, a configuration indicating that the first station is required to transmit a channel reservation signal to the second station prior to transmitting on the set of wireless links.

The channel reservation component 2970 may transmit, according to the received configuration, a channel reservation signal to the second station based on a result of a CCA procedure on the set of wireless links indicating a clear channel for the first wireless link.

The channel reservation response component 2975 may receive a response to the channel reservation signal from the second station.

The reserved channel communication component 2980 may transmit on the first wireless link and the second wireless link based on receiving the response to the channel reservation signal.

The wireless link establishing component 2945 may establish a set of wireless links between the second station and a first station, the set of wireless links supporting parallel transmissions during a multi-link session and including at least a first wireless link and a second wireless link.

The configuration indication component 2965 may transmit, to the first station, a configuration indicating that the first station is required to transmit a channel reservation signal to the second station prior to transmitting on the set of wireless links.

The channel reservation component 2970 may receive, according to the received configuration, a channel reservation signal from the first station.

The channel reservation response component 2975 may transmit, to the first station, a response to the channel reservation signal.

The reserved channel communication component 2980 may receive communications from the first station on the first wireless link and the second wireless link based on the transmitted response to the channel reservation signal.

The wireless link establishing component 2945 may establish a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device.

The data unit configuring component 2950 may identify one or more data units to be transmitted on the set of wireless links.

The CCA performing component 2925 may perform, by the first MAC entity, a CCA procedure on the first wireless link and perform, by the second MAC entity, the CCA procedure on the second wireless link.

The data unit generating component 2985 may generate at least one physical layer convergence protocol (PLCP) protocol data unit (PPDU) from the identified one or more data units based on a result of the performed CCA procedure on the first wireless link and the performed CCA procedure on the second wireless link.

The data unit transmitting component 2955 may transmit the generated at least one PPDU on the first wireless link, or the second wireless link, or a combination thereof.

Transmitter 2990 may transmit signals generated by other components of the device. In some examples, the transmitter 2990 may be collocated with a receiver 2910 in a transceiver module. For example, the transmitter 2990 may be an example of aspects of the transceiver 3120 described with reference to FIG. 31. The transmitter 2990 may utilize a single antenna or a set of antennas.

Figure 30:
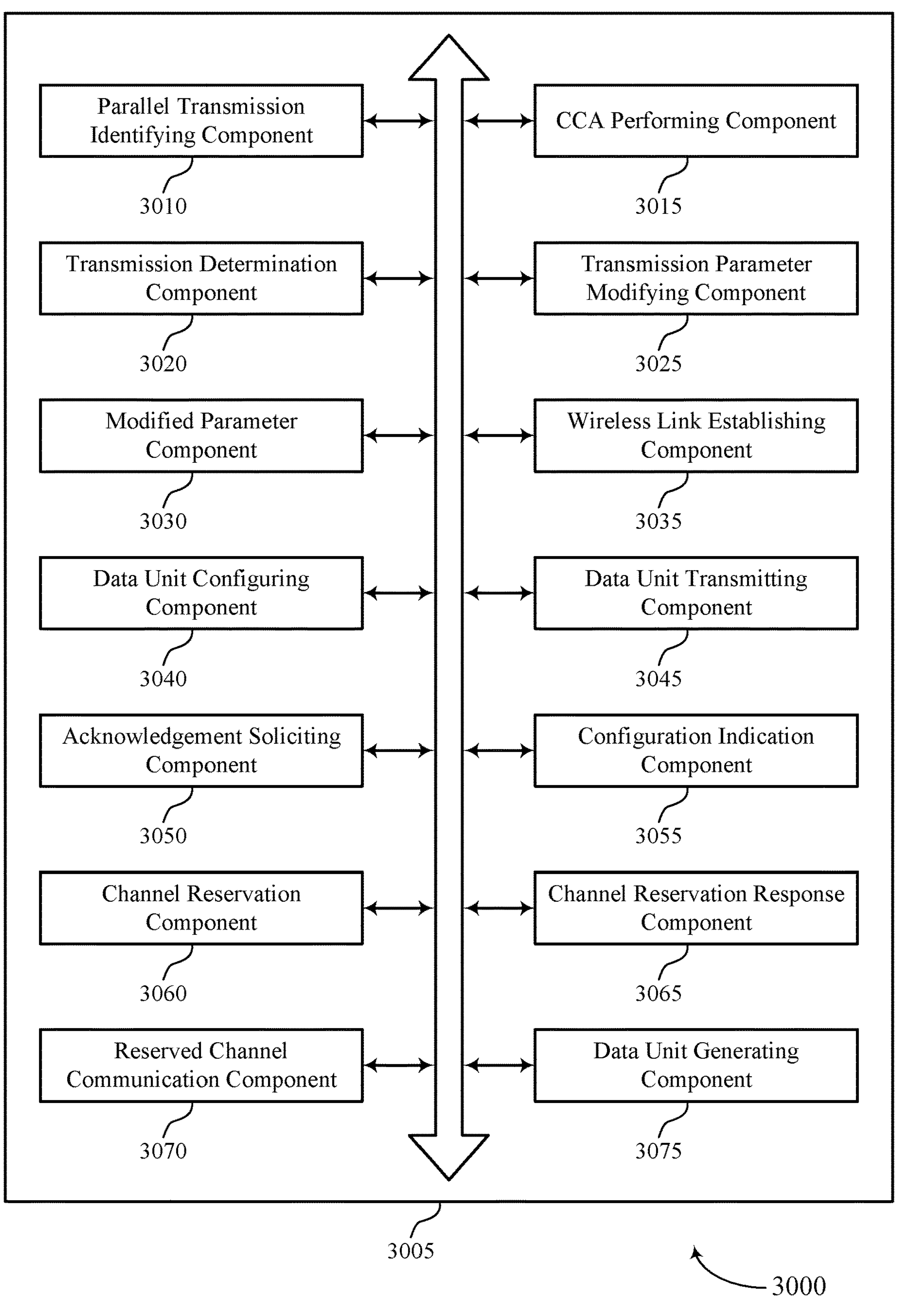
FIG. 30 shows a block diagram of a communications manager that supports design considerations for multi-link aggregation in accordance with aspects of the present disclosure.

FIG. 30 shows a block diagram 3000 of a communications manager 3005 that supports design considerations for multi-link aggregation in accordance with aspects of the present disclosure. The communications manager 3005 may be an example of aspects of a communications manager 2815, a communications manager 2915, or a communications manager 3110 described herein. The communications manager 3005 may include a parallel transmission identifying component 3010, a CCA performing component 3015, a transmission determination component 3020, a transmission parameter modifying component 3025, a modified parameter component 3030, a wireless link establishing component 3035, a data unit configuring component 3040, a data unit transmitting component 3045, an acknowledgement soliciting component 3050, a configuration indication component 3055, a channel reservation component 3060, a channel reservation response component 3065, a reserved channel communication component 3070, and a data unit generating component 3075. Each of these modules may communicate, directly or indirectly, with one another (e.g., via one or more buses).

The parallel transmission identifying component 3010 may identify a message for parallel transmission on at least a first wireless link and a second wireless link of a set of wireless links between the first wireless device and a second wireless device, the set of wireless links supporting parallel transmissions during a multi-link session. In some cases, the first wireless link includes the first wireless channel in a first RF spectrum band. In some cases, the second wireless link includes a second wireless channel in the first RF spectrum band or a second RF spectrum band.

The parallel transmission identifying component 3010 may transmit at least one traffic indication mapping (TIM) element in a TIM signal, the at least one TIM element including an indicator that the second wireless device will be served on the first wireless link, or the second wireless link, or a combination thereof.

In some cases, the at least one TIM element indicates a single association identifier for the second wireless device, an index of the at least one TIM element indicating the first wireless link, or the second wireless link, or the combination thereof.

In some cases, the at least one TIM element indicates pending uplink or downlink transmission for the second wireless device on the first wireless link, on the second wireless link, or a combination thereof, based at least in part on a plurality of association identifiers.

The parallel transmission identifying component 3010 may receive a trigger frame including a first user field associated with the first wireless link and a second user field associated with the second wireless link, where transmitting the generated at least one PPDU is based at least in part on receiving the trigger frame. In some examples, a location of a set of resource units allocated to the first wireless device may be based on a set of association identifiers, where the set of resource units are located on the first wireless link, the second wireless link, or a combination thereof. In some cases, a resource unit location (e.g., whether the resource unit lies in the 1$^{st}$ or 2$^{nd}$ link) is based on the AID value. In some cases, a location of the RU in the trigger frame may be based on a set of association identifiers, where the location of the RU is on the first wireless link, the second wireless link, or a combination thereof. In some examples, the location of the RU in the trigger frame may refer to whether the RU is in the first or second link. In some cases, a set of resource units may be allocated for the first wireless device to transmit to the second wireless device, and the at least one PPDU may include a punctured multi-user PPDU.

The CCA performing component 3015 may perform, during a first time period, a CCA procedure on the first wireless link and the second wireless link. In some examples, the CCA performing component 3015 may perform, by the first MAC entity, a CCA procedure on the first wireless link. In some examples, the CCA performing component 3015 may perform, by the second MAC entity, the CCA procedure on the second wireless link.

The transmission determination component 3020 may determine, based on the performed CCA procedure, to transmit on the first wireless link and refrain from transmitting on the second wireless link. In some examples, the transmission determination component 3020 may determine to transmit on the second wireless link during a third time period based on a clear result of the CCA procedure performed during the second time period. In some examples, the transmission determination component 3020 may transmit, during the third time period according, at least a second portion of the message on the first wireless link and a third portion of the message on the second wireless link.

The transmission parameter modifying component 3025 may modify, for a second time period based on the determining, a transmission parameter for the first wireless link, or a CCA parameter for the second wireless link, or a combination thereof. The modified parameter component 3030 may perform, during the second time period based on the modifying, the CCA procedure on the second wireless link and transmission of at least a first portion of the message on the first wireless link.

In some examples, the modified parameter component 3030 may transmit the at least the first portion of the message on the first wireless link according to the modified transmission parameter. In some examples, the modified parameter component 3030 may reduce a first transmission power for the first wireless link to a reduced transmission power during the second time period, the modified transmission power including the reduced transmission power.

In some examples, the modified parameter component 3030 may select, for the at least the first portion of the message during the second time period, a resource unit that is narrower than a bandwidth of the first wireless link, the modified transmission parameter including the selected resource unit. In some examples, the modified parameter component 3030 may transmit the at least the first portion of the message on the first wireless link according to a SIFS burst pattern. In some examples, the modified parameter component 3030 may perform the CCA procedure during at least one SIFS of the SFIS burst pattern.

In some examples, the modified parameter component 3030 may perform the CCA procedure according to the modified CCA parameter. In some examples, the modified parameter component 3030 may increase a first energy detection threshold for the second wireless link during the first time period to an increased energy detection threshold during the second time period, the modified CCA parameter including the increased energy detection threshold.

The wireless link establishing component 3035 may establish a set of wireless links between the first wireless device and a second wireless device, the set of wireless links supporting parallel transmissions during a multi-link session and including at least a first wireless link and a second wireless link. In some examples, the wireless link establishing component 3035 may establish a set of wireless links between the first station and a second station, the set of wireless links supporting parallel transmissions during a multi-link session and including at least a first wireless link and a second wireless link.

In some examples, the wireless link establishing component 3035 may establish a set of wireless links between the second station and a first station, the set of wireless links supporting parallel transmissions during a multi-link session and including at least a first wireless link and a second wireless link. In some examples, the wireless link establishing component 3035 may establish a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device. In some cases, the first wireless link includes the first wireless channel in a first RF spectrum band. In some cases, the second wireless link includes a second wireless channel in the first RF spectrum band or a second RF spectrum band.

The data unit configuring component 3040 may configure a first data unit including a first portion of a message to be transmitted on the first wireless link and a second data unit including a second portion of the message to be transmitted on the second wireless link, the first data unit and the second data unit scheduled to terminate at a same time. In some examples, the data unit configuring component 3040 may identify one or more data units to be transmitted on the set of wireless links.

The data unit transmitting component 3045 may transmit, to the second wireless device based on the configuring, the first data unit on the first wireless link and the second data unit on the second wireless link. In some examples, the data unit transmitting component 3045 may transmit the generated at least one PPDU on the first wireless link, or the second wireless link, or a combination thereof. In some examples, the data unit transmitting component 3045 may transmit at least a portion of the first data unit on the first wireless link during a first time period based on a result of a CCA procedure indicating that the first wireless link is clear. In some examples, the data unit transmitting component 3045 may refrain from transmitting on the second wireless link during the first time period based on a result of the CCA procedure indicating that the second wireless link is busy.

The acknowledgement soliciting component 3050 may transmit, to the second wireless device, a signal to solicit an acknowledgement or negative acknowledgement for the first data unit, or the second data unit, or a combination thereof. In some examples, the acknowledgement soliciting component 3050 may transmit a block acknowledgment request to solicit the acknowledgement for at least the first data unit and the second data unit. In some examples, the acknowledgement soliciting component 3050 may receive a block acknowledgment in response to the transmitted block acknowledgment request. In some examples, the acknowledgement soliciting component 3050 may receive, on the first wireless link in response to the transmitted signal, the acknowledgment or negative acknowledgement of the first data unit and the second data unit.

The configuration indication component 3055 may receive, from the second station, a configuration indicating that the first station is required to transmit a channel reservation signal to the second station prior to transmitting on the set of wireless links. In some examples, the configuration indication component 3055 may transmit, to the first station, a configuration indicating that the first station is required to transmit a channel reservation signal to the second station prior to transmitting on the set of wireless links.

In some examples, the configuration indication component 3055 may receive the configuration via a high efficiency operations element, an EHT operations element, an MLA operations element, or a combination thereof. In some examples, the configuration indication component 3055 may transmit the configuration via a high efficiency operations element, an EHT operations element, an MLA operations element, or a combination thereof.

The channel reservation component 3060 may transmit, according to the received configuration, a channel reservation signal to the second station based on a result of a CCA procedure on the set of wireless links indicating a clear channel for the first wireless link. In some examples, the channel reservation component 3060 may receive, according to the received configuration, a channel reservation signal from the station. In some cases, the transmitted channel reservation request indicates a duration of a transmission opportunity. In some cases, the received channel reservation request indicates a duration of a transmission opportunity. In some cases, the first station is an access point serving the second station. In some cases, the second station is an access point serving the first station.

The channel reservation response component 3065 may receive a response to the channel reservation signal from the second station. In some examples, the channel reservation response component 3065 may receive the response on a soliciting wireless link, the second wireless link, or both. In some cases, the response to the channel reservation signal may be an RTS, CTS, or some other response signal. In some examples, the channel reservation response component 3065 may transmit, to the first station, a response to the channel reservation signal. In some examples, the channel reservation response component 3065 may determine whether to transmit the response to the channel reservation signal based on identifying: downlink transmissions scheduled to be transmitted on the second wireless link; or uplink transmissions being received by the second station from a third station on the second wireless link; or the second station having transmitted a response to a channel reservation request from a third station on the first wireless link or the second wireless link; or uplink transmissions being received by the second station from a third station on the first wireless link, the third station hidden from the first station; or a combination thereof. In some cases, the received response to the channel reservation signal indicates a time duration for one or more additional stations to freeze a countdown. In some cases, the transmitted response to the channel reservation signal indicates a time duration for one or more additional stations to freeze a countdown.

The reserved channel communication component 3070 may transmit on the first wireless link and the second wireless link based on receiving the response to the channel reservation signal. In some examples, the reserved channel communication component 3070 may receive communications from the station on the first wireless link and the second wireless link based on the transmitted response to the channel reservation signal. The data unit generating component 3075 may generate at least one physical layer convergence protocol (PLCP) protocol data unit (PPDU) from the identified one or more data units based on a result of the performed CCA procedure on the first wireless link and the performed CCA procedure on the second wireless link. In some examples, the data unit generating component 3075 may generate a first PPDU from at least a first portion of the identified one or more data units from the first MAC entity, and generating a second PPDU from at least a second portion of the identified one or more data units from the second MAC entity. In some examples, transmitting the at least one PPDU includes transmitting the first PPDU on the first wireless link and the second PPDU on the second wireless link.

In some examples, the data unit generating component 3075 may generate a single PPDU from one data unit from the first MAC entity or one data unit from the second MAC entity. In some examples, transmitting the at least one PPDU includes transmitting a first portion of the single PPDU on a first resource unit of the first wireless link and a second portion of the single PPDU on a second resource unit of the second wireless link. In some examples, the data unit generating component 3075 may generate a single PPDU from one data unit from the first MAC entity and one data unit from the second MAC entity. In some examples, the data unit generating component 3075 may generate a single PPDU from a set of data units from the first MAC entity or a set of data units from the second MAC entity. In some cases, the first wireless link has a first primary channel and the second wireless link has a second primary channel.

Figure 31:
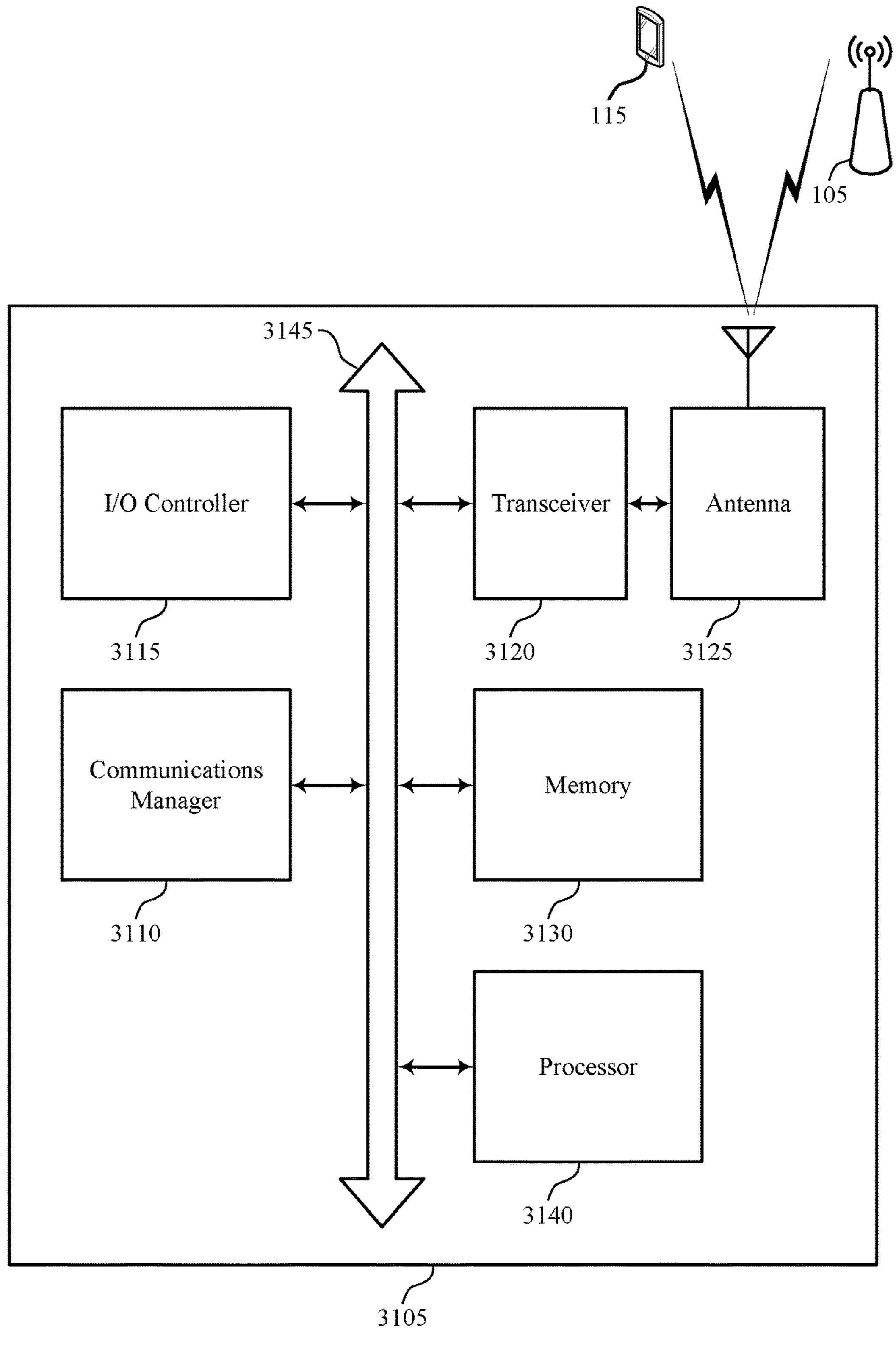
FIG. 31 shows a diagram of a system including a device that supports design considerations for multi-link aggregation in accordance with aspects of the present disclosure.

FIG. 31 shows a diagram of a system 3100 including a device 3105 that supports design considerations for multi-link aggregation in accordance with aspects of the present disclosure. The device 3105 may be an example of or include the components of device 2805, device 2905, a STA, or an AP as described herein. The device 3105 may include components for bi-directional voice and data communications including components for transmitting and receiving communications, including a communications manager 3110, an I/O controller 3115, a transceiver 3120, an antenna 3125, memory 3130, and a processor 3140. These components may be in electronic communication via one or more buses (e.g., bus 3145).

The communications manager 3110 may identify a message for parallel transmission on at least a first wireless link and a second wireless link of a set of wireless links between the first wireless device and a second wireless device, the set of wireless links supporting parallel transmissions during a multi-link session, perform, during a first time period, a CCA procedure on the first wireless link and the second wireless link, determine, based on the performed CCA procedure, to transmit on the first wireless link and refrain from transmitting on the second wireless link, modify, for a second time period based on the determining, a transmission parameter for the first wireless link, or a CCA parameter for the second wireless link, or a combination thereof, and perform, during the second time period based on the modifying, the CCA procedure on the second wireless link and transmission of at least a first portion of the message on the first wireless link.

The communications manager 3110 may also establish a set of wireless links between the first wireless device and a second wireless device, the set of wireless links supporting parallel transmissions during a multi-link session and including at least a first wireless link and a second wireless link, configure a first data unit including a first portion of a message to be transmitted on the first wireless link and a second data unit including a second portion of the message to be transmitted on the second wireless link, the first data unit and the second data unit scheduled to terminate at a same time, transmit, to the second wireless device based on the configuring, the first data unit on the first wireless link and the second data unit on the second wireless link, and transmit, to the second wireless device, a signal to solicit an acknowledgement or negative acknowledgement for the first data unit, or the second data unit, or a combination thereof.

The communications manager 3110 may also establish a set of wireless links between a first station and a second station, the set of wireless links supporting parallel transmissions during a multi-link session and including at least a first wireless link and a second wireless link, receive, from the second station, a configuration indicating that the first station is required to transmit a channel reservation signal to the second station prior to transmitting on the set of wireless links, transmit, according to the received configuration, a channel reservation signal to the second station based on a result of a CCA procedure on the set of wireless links indicating a clear channel for the first wireless link, receive a response to the channel reservation signal from the second station, and transmit on the first wireless link and the second wireless link based on receiving the response to the channel reservation signal.

The communications manager 3110 may also establish a set of wireless links between the second station and a first station, the set of wireless links supporting parallel transmissions during a multi-link session and including at least a first wireless link and a second wireless link, transmit, to the first station, a configuration indicating that the station is required to transmit a channel reservation signal to the second station prior to transmitting on the set of wireless links, receive, according to the received configuration, a channel reservation signal from the first station, transmit, to the first station, a response to the channel reservation signal, and receive communications from the first station on the first wireless link and the second wireless link based on the transmitted response to the channel reservation signal.

The communications manager 3110 may also establish a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device, identify one or more data units to be transmitted on the set of wireless links, perform, by the first MAC entity, a CCA procedure on the first wireless link, perform, by the second MAC entity, the CCA procedure on the second wireless link, generate at least one physical layer convergence protocol (PLCP) protocol data unit (PPDU) from the identified one or more data units based on a result of the performed CCA procedure on the first wireless link and the performed CCA procedure on the second wireless link, and transmit the generated at least one PPDU on the first wireless link, or the second wireless link, or a combination thereof.

I/O controller 3115 may manage input and output signals for device 3105. I/O controller 3115 may also manage peripherals not integrated into device 3105. In some cases, I/O controller 3115 may represent a physical connection or port to an external peripheral. In some cases, I/O controller 3115 may utilize an operating system such as iOS®, ANDROID®, MS-DOS®, MS-WINDOWS®, OS/2®, UNIX®, LINUX®, or another known operating system. In other cases, I/O controller 3115 may represent or interact with a modem, a keyboard, a mouse, a touchscreen, or a similar device. In some cases, I/O controller 3115 may be implemented as part of a processor. In some cases, a user may interact with device 3105 via I/O controller 3115 or via hardware components controlled by I/O controller 3115.

Transceiver 3120 may communicate bi-directionally, via one or more antennas, wired, or wireless links as described above. For example, the transceiver 3120 may represent a wireless transceiver and may communicate bi-directionally with another wireless transceiver. The transceiver 3120 may also include a modem to modulate the packets and provide the modulated packets to the antennas for transmission, and to demodulate packets received from the antennas.

In some cases, the wireless device may include a single antenna 3125. However, in some cases the device may have more than one antenna 3125, which may be capable of concurrently transmitting or receiving multiple wireless transmissions.

Memory 3130 may include RAM and ROM. The memory 3130 may store computer-readable, computer-executable software 3135 including instructions that, when executed, cause the processor to perform various functions described herein. In some cases, the memory 3130 may contain, among other things, a BIOS which may control basic hardware or software operation such as the interaction with peripheral components or devices.

Processor 3140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 3140 may be configured to operate a memory array using a memory controller. In other cases, a memory controller may be integrated into processor 3140. Processor 3140 may be configured to execute computer-readable instructions stored in a memory to perform various functions (e.g., functions or tasks supporting design considerations for multi-link aggregation when the channels are in close proximity).

Figure 32:
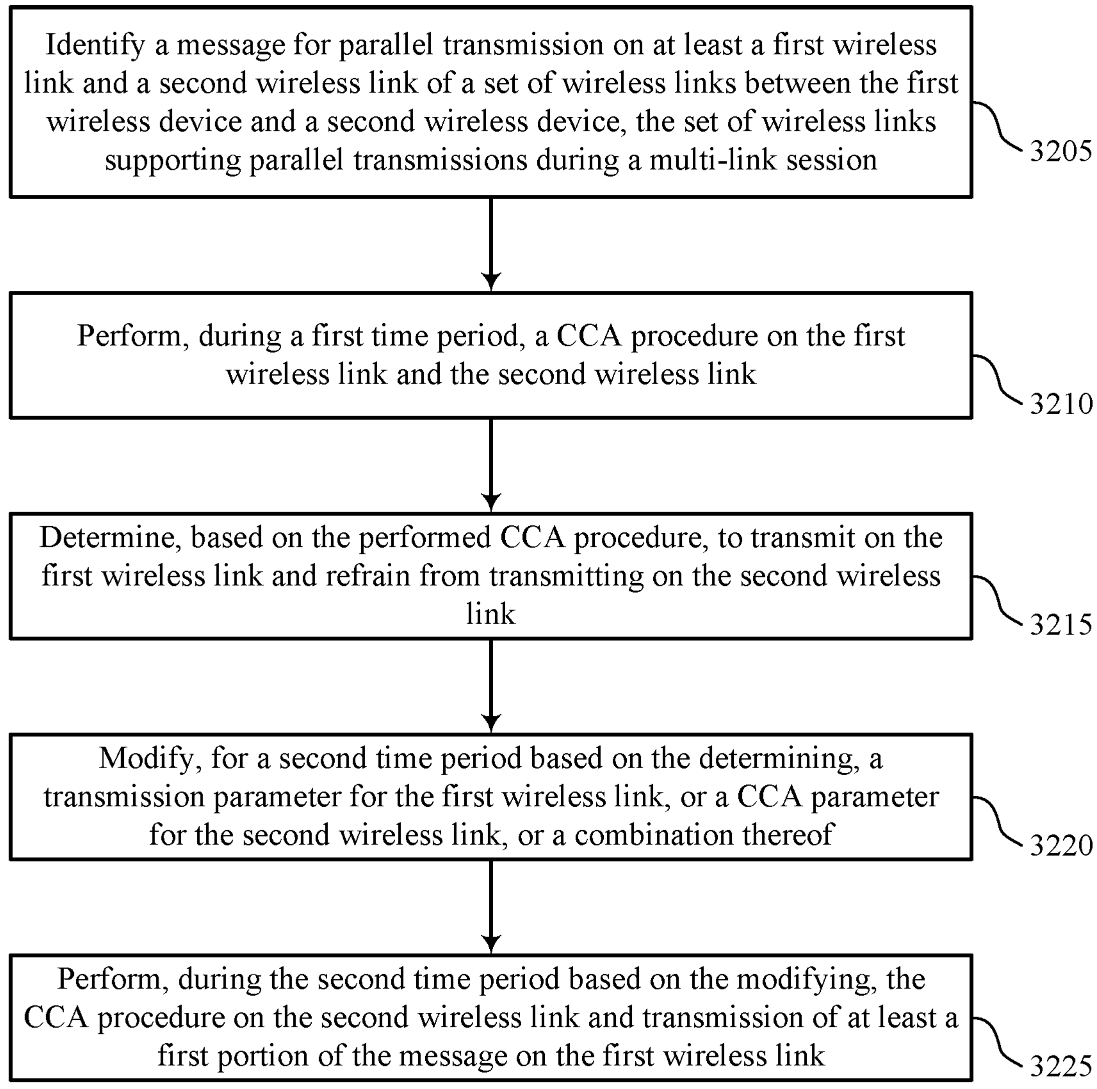
FIGS. 32 through 36 show flowcharts illustrating methods that support design considerations for multi-link aggregation in accordance with aspects of the present disclosure.

FIG. 32 shows a flowchart illustrating a method 3200 that supports design considerations for multi-link aggregation in accordance with aspects of the present disclosure. The operations of method 3200 may be implemented by a device, such as a STA or an AP, or its components as described herein. For example, the operations of method 3200 may be performed by a communications manager as described with reference to FIGS. 28 through 31. In some examples, a STA or AP may execute a set of instructions to control the functional elements of the STA or AP to perform the functions described below. Additionally or alternatively, a STA or AP may perform aspects of the functions described below using special-purpose hardware.

At 3205, the device may identify a message for parallel transmission on at least a first wireless link and a second wireless link of a set of wireless links between the first wireless device and a second wireless device, the set of wireless links supporting parallel transmissions during a multi-link session. The operations of 3205 may be performed according to the methods described herein. In some examples, aspects of the operations of 3205 may be performed by a parallel transmission identifying component as described with reference to FIGS. 28 through 31.

At 3210, the device may perform, during a first time period, a CCA procedure on the first wireless link and the second wireless link. The operations of 3210 may be performed according to the methods described herein. In some examples, aspects of the operations of 3210 may be performed by a CCA performing component as described with reference to FIGS. 28 through 31.

At 3215, the device may determine, based on the performed CCA procedure, to transmit on the first wireless link and refrain from transmitting on the second wireless link. The operations of 3215 may be performed according to the methods described herein. In some examples, aspects of the operations of 3215 may be performed by a transmission determination component as described with reference to FIGS. 28 through 31.

At 3220, the device may modify, for a second time period based on the determining, a transmission parameter for the first wireless link, or a CCA parameter for the second wireless link, or a combination thereof. The operations of 3220 may be performed according to the methods described herein. In some examples, aspects of the operations of 3220 may be performed by a transmission parameter modifying component as described with reference to FIGS. 28 through 31.

At 3225, the device may perform, during the second time period based on the modifying, the CCA procedure on the second wireless link and transmission of at least a first portion of the message on the first wireless link. The operations of 3225 may be performed according to the methods described herein. In some examples, aspects of the operations of 3225 may be performed by a modified parameter component as described with reference to FIGS. 28 through 31.

Figure 33:
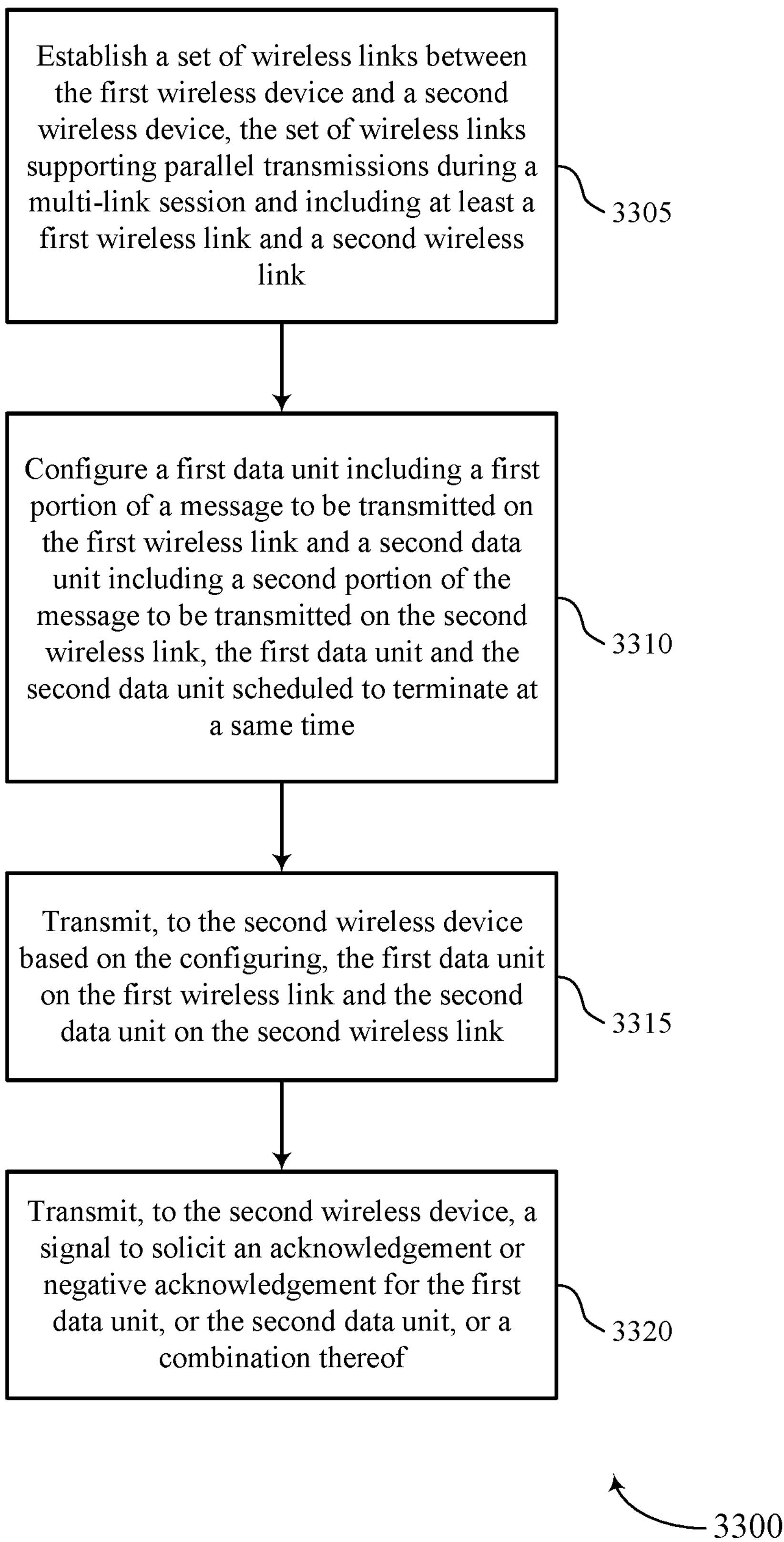

FIG. 33 shows a flowchart illustrating a method 3300 that supports design considerations for multi-link aggregation in accordance with aspects of the present disclosure. The operations of method 3300 may be implemented by a device, such as a STA or an AP, or its components as described herein. For example, the operations of method 3300 may be performed by a communications manager as described with reference to FIGS. 28 through 31. In some examples, a STA or AP may execute a set of instructions to control the functional elements of the STA or AP to perform the functions described below. Additionally or alternatively, a STA or AP may perform aspects of the functions described below using special-purpose hardware.

At 3305, device may establish a set of wireless links between the first wireless device and a second wireless device, the set of wireless links supporting parallel transmissions during a multi-link session and including at least a first wireless link and a second wireless link. The operations of 3305 may be performed according to the methods described herein. In some examples, aspects of the operations of 3305 may be performed by a wireless link establishing component as described with reference to FIGS. 28 through 31.

At 3310, device may configure a first data unit including a first portion of a message to be transmitted on the first wireless link and a second data unit including a second portion of the message to be transmitted on the second wireless link, the first data unit and the second data unit scheduled to terminate at a same time. The operations of 3310 may be performed according to the methods described herein. In some examples, aspects of the operations of 3310 may be performed by a data unit configuring component as described with reference to FIGS. 28 through 31.

At 3315, device may transmit, to the second wireless device based on the configuring, the first data unit on the first wireless link and the second data unit on the second wireless link. The operations of 3315 may be performed according to the methods described herein. In some examples, aspects of the operations of 3315 may be performed by a data unit transmitting component as described with reference to FIGS. 28 through 31.

At 3320, device may transmit, to the second wireless device, a signal to solicit an acknowledgement or negative acknowledgement for the first data unit, or the second data unit, or a combination thereof. The operations of 3320 may be performed according to the methods described herein. In some examples, aspects of the operations of 3320 may be performed by an acknowledgement soliciting component as described with reference to FIGS. 28 through 31.

Figure 34:
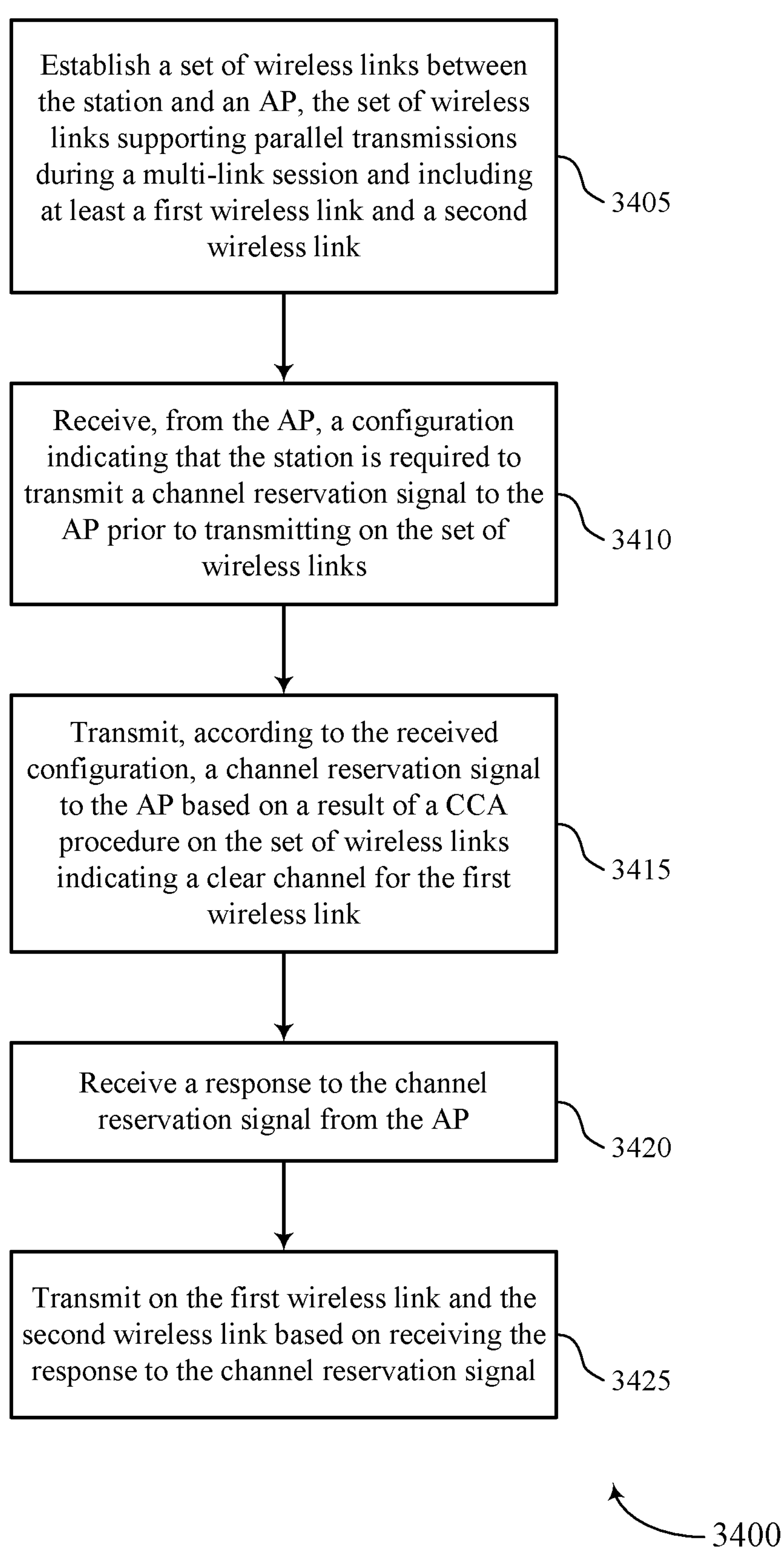

FIG. 34 shows a flowchart illustrating a method 3400 that supports design considerations for multi-link aggregation in accordance with aspects of the present disclosure. The operations of method 3400 may be implemented by a device, such as a STA or an AP, or its components as described herein. For example, the operations of method 3400 may be performed by a communications manager as described with reference to FIGS. 28 through 31. In some examples, a STA or AP may execute a set of instructions to control the functional elements of the STA or AP to perform the functions described below. Additionally or alternatively, a STA or AP may perform aspects of the functions described below using special-purpose hardware.

At 3405, the device may establish a set of wireless links between the station and an AP, the set of wireless links supporting parallel transmissions during a multi-link session and including at least a first wireless link and a second wireless link. The operations of 3405 may be performed according to the methods described herein. In some examples, aspects of the operations of 3405 may be performed by a wireless link establishing component as described with reference to FIGS. 28 through 31.

At 3410, the device may receive, from the AP, a configuration indicating that the station is required to transmit a channel reservation signal to the AP prior to transmitting on the set of wireless links. The operations of 3410 may be performed according to the methods described herein. In some examples, aspects of the operations of 3410 may be performed by a configuration indication component as described with reference to FIGS. 28 through 31.

At 3415, the device may transmit, according to the received configuration, a channel reservation signal to the AP based on a result of a CCA procedure on the set of wireless links indicating a clear channel for the first wireless link. The operations of 3415 may be performed according to the methods described herein. In some examples, aspects of the operations of 3415 may be performed by a channel reservation component as described with reference to FIGS. 28 through 31.

At 3420, the device may receive a response to the channel reservation signal from the AP. The operations of 3420 may be performed according to the methods described herein. In some examples, aspects of the operations of 3420 may be performed by a channel reservation response component as described with reference to FIGS. 28 through 31.

At 3425, the device may transmit on the first wireless link and the second wireless link based on receiving the response to the channel reservation signal. The operations of 3425 may be performed according to the methods described herein. In some examples, aspects of the operations of 3425 may be performed by a reserved channel communication component as described with reference to FIGS. 28 through 31.

Figure 35:
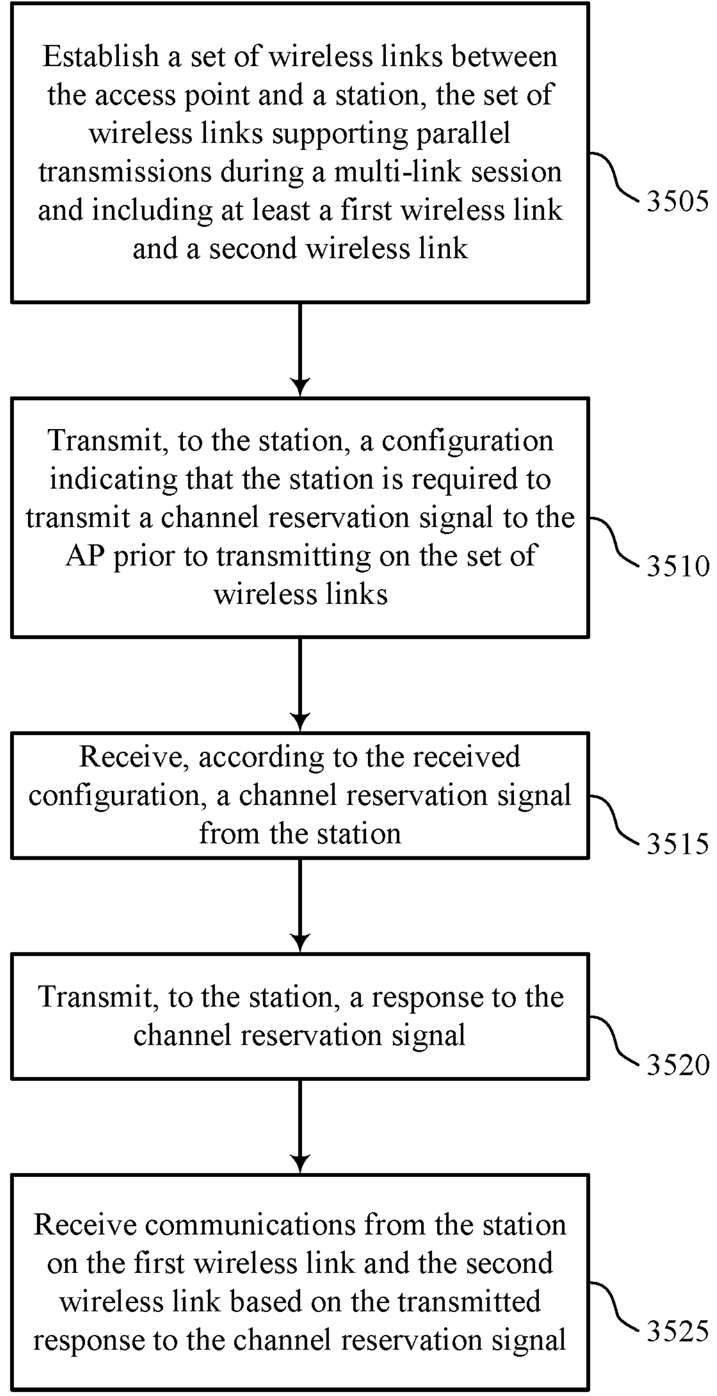

FIG. 35 shows a flowchart illustrating a method 3500 that supports design considerations for multi-link aggregation in accordance with aspects of the present disclosure. The operations of method 3500 may be implemented by a device, such as a STA or an AP, or its components as described herein. For example, the operations of method 3500 may be performed by a communications manager as described with reference to FIGS. 28 through 31. In some examples, a STA or AP may execute a set of instructions to control the functional elements of the STA to perform the functions described below. Additionally or alternatively, a STA or AP may perform aspects of the functions described below using special-purpose hardware.

At 3505, the device may establish a set of wireless links between the access point and a station, the set of wireless links supporting parallel transmissions during a multi-link session and including at least a first wireless link and a second wireless link. The operations of 3505 may be performed according to the methods described herein. In some examples, aspects of the operations of 3505 may be performed by a wireless link establishing component as described with reference to FIGS. 28 through 31.

At 3510, the device may transmit, to the station, a configuration indicating that the station is required to transmit a channel reservation signal to the AP prior to transmitting on the set of wireless links. The operations of 3510 may be performed according to the methods described herein. In some examples, aspects of the operations of 3510 may be performed by a configuration indication component as described with reference to FIGS. 28 through 31.

At 3515, the device may receive, according to the received configuration, a channel reservation signal from the station. The operations of 3515 may be performed according to the methods described herein. In some examples, aspects of the operations of 3515 may be performed by a channel reservation component as described with reference to FIGS. 28 through 31.

At 3520, the device may transmit, to the station, a response to the channel reservation signal. The operations of 3520 may be performed according to the methods described herein. In some examples, aspects of the operations of 3520 may be performed by a channel reservation response component as described with reference to FIGS. 28 through 31.

At 3525, the device may receive communications from the station on the first wireless link and the second wireless link based on the transmitted response to the channel reservation signal. The operations of 3525 may be performed according to the methods described herein. In some examples, aspects of the operations of 3525 may be performed by a reserved channel communication component as described with reference to FIGS. 28 through 31.

Figure 36:
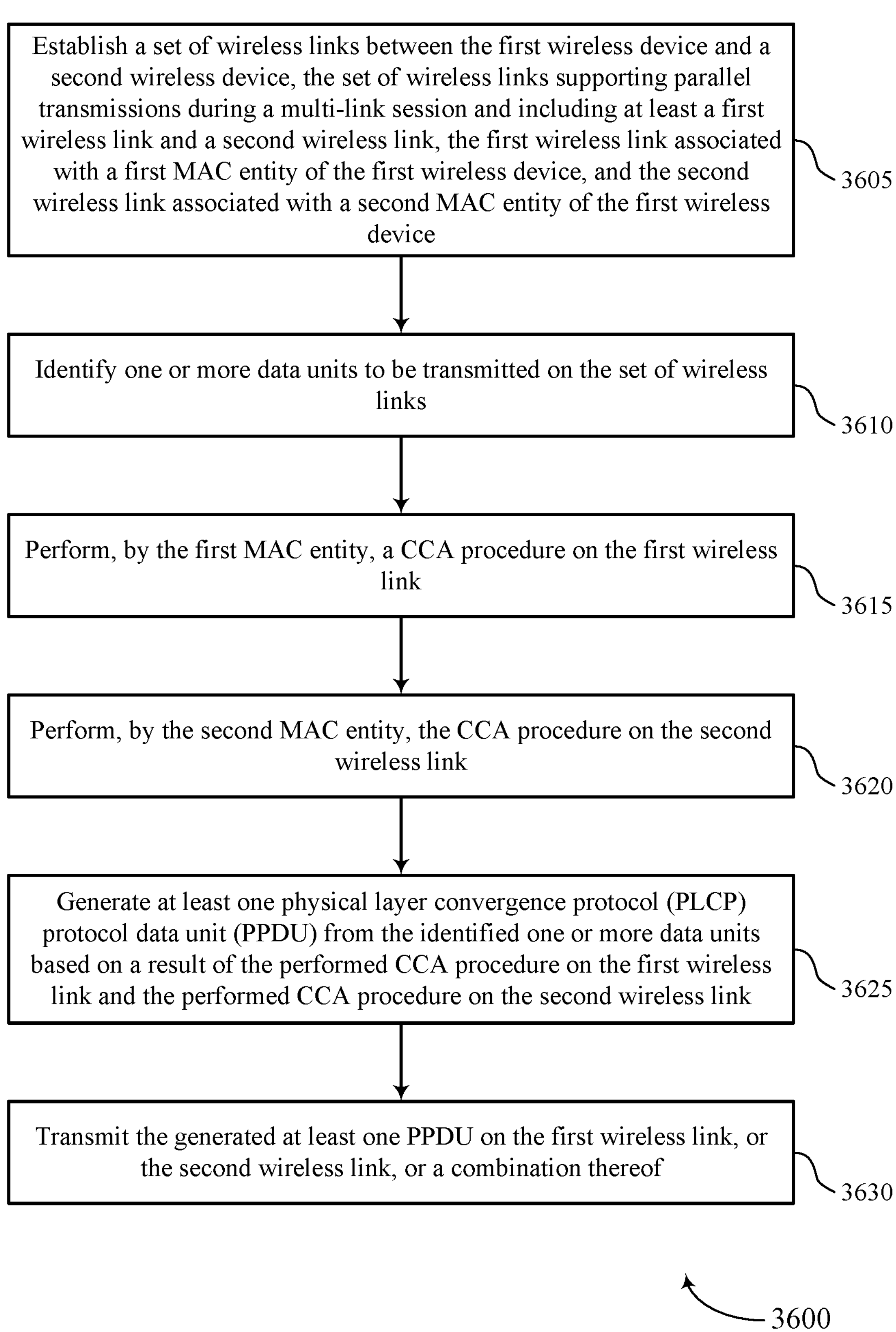

FIG. 36 shows a flowchart illustrating a method 3600 that supports design considerations for multi-link aggregation in accordance with aspects of the present disclosure. The operations of method 3600 may be implemented by a device, such as a STA or an AP, or its components as described herein. For example, the operations of method 3600 may be performed by a communications manager as described with reference to FIGS. 28 through 31. In some examples, a STA or AP may execute a set of instructions to control the functional elements of the STA to perform the functions described below. Additionally or alternatively, a STA or AP may perform aspects of the functions described below using special-purpose hardware.

At 3605, the device may establish a set of wireless links between the first wireless device and a second wireless device, the set of wireless links supporting parallel transmissions during a multi-link session and including at least a first wireless link and a second wireless link, the first wireless link associated with a first MAC entity of the first wireless device, and the second wireless link associated with a second MAC entity of the first wireless device. The operations of 3605 may be performed according to the methods described herein. In some examples, aspects of the operations of 3605 may be performed by a wireless link establishing component as described with reference to FIGS. 28 through 31.

At 3610, the device may identify one or more data units to be transmitted on the set of wireless links. The operations of 3610 may be performed according to the methods described herein. In some examples, aspects of the operations of 3610 may be performed by a data unit configuring component as described with reference to FIGS. 28 through 31.

At 3615, the device may perform, by the first MAC entity, a CCA procedure on the first wireless link. The operations of 3615 may be performed according to the methods described herein. In some examples, aspects of the operations of 3615 may be performed by a CCA performing component as described with reference to FIGS. 28 through 31.

At 3620, the device may perform, by the second MAC entity, the CCA procedure on the second wireless link. The operations of 3620 may be performed according to the methods described herein. In some examples, aspects of the operations of 3620 may be performed by a CCA performing component as described with reference to FIGS. 28 through 31.

At 3625, the device may generate at least one physical layer convergence protocol (PLCP) protocol data unit (PPDU) from the identified one or more data units based on a result of the performed CCA procedure on the first wireless link and the performed CCA procedure on the second wireless link. The operations of 3625 may be performed according to the methods described herein. In some examples, aspects of the operations of 3625 may be performed by a data unit generating component as described with reference to FIGS. 28 through 31.

At 3630, the device may transmit the generated at least one PPDU on the first wireless link, or the second wireless link, or a combination thereof. The operations of 3630 may be performed according to the methods described herein. In some examples, aspects of the operations of 3630 may be performed by a data unit transmitting component as described with reference to FIGS. 28 through 31.

Figure 37:
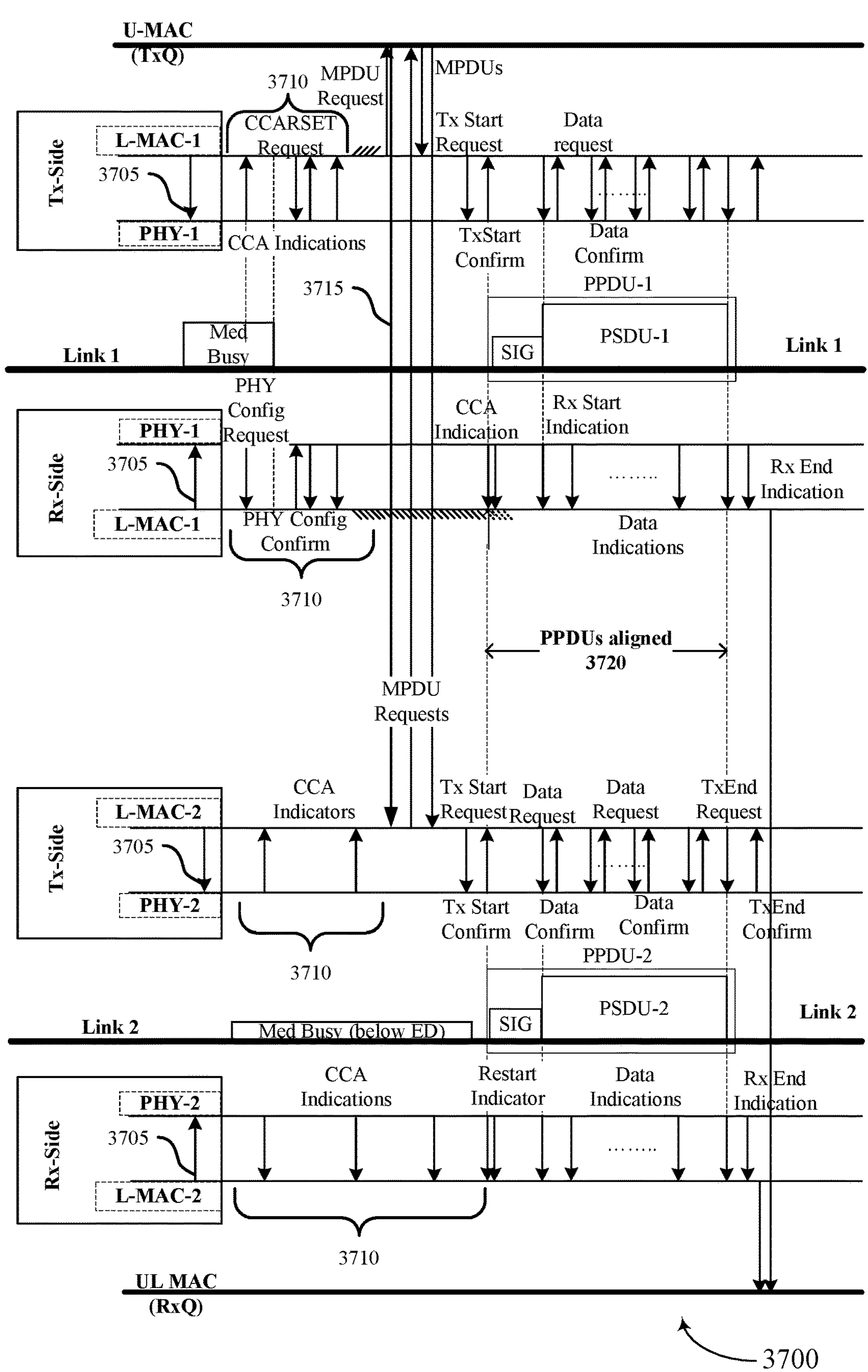
FIG. 37 illustrates an example of a flowchart that supports design considerations for multi-link aggregation in accordance with aspects of the present disclosure.

FIG. 37 illustrates an example of a flowchart 3700 that supports design considerations for multi-link aggregation in accordance with aspects of the present disclosure. In some examples, flowchart 3700 may implement aspects of wireless communication system 100. In some examples, a wireless device such as STA 115 or AP 105, which may operate as a transmitting wireless device, or a receiving wireless device, or both, may apply all or portions of flowchart 3700 to further support multi-link aggregation when operating in accordance with the techniques described herein, for example as described with reference to any of FIGS. 1-16. In particular, flowchart 3700 may further describe aspects of techniques for multi-link aggregation when the links are synchronized (e.g., generating synchronized separate PPDUs). In some cases, both links of the multi-link aggregation scheme are available, for example as discussed with reference to FIG. 11.

As described herein, in some implementations where links are separated in frequency, both links may be treated as primary links. There may, in some examples, still be an anchor link in situations where multiple links are treated as primary links. In this example, both Link 1 and Link 2 may be considered as primary links by the transmitting device. In some wireless systems, a PHY entity may only report to MAC entities that the medium for the primary link is available if the PHY layer successfully passes preamble detection, and PHY entities of these systems may not report to the MAC entities if energy detection passes. However, according to some multi-link aggregation layer configurations described herein, passing energy detection may be sufficient for a link to determine that the medium is available. Therefore, at 3705, a MAC entity (e.g., a lower MAC entity as described herein) may transmit signaling to a PHY entity and configure the PHY entity to report when energy detection tests pass.

At 3710, there may be signaling between the PHY layers and lower MAC entities, where a PHY layer performs a clear channel assessment and checks whether the transmission medium is clear based on preamble detection, energy detection, or both. The PHY layer may report the results of the CCA to the lower MAC layer, for example by indicating the results of the energy detection, preamble detection, or both. If the transmitter gains access to the transmission medium on Link 1 (e.g., based on reserving the medium once the CCA indicates that the medium is available), the lower MAC entity of link 1 may check (e.g., at 3715) with the lower MAC entity of link 2 to see if link 2 is available as well. If the lower MAC entity of link 2 indicates that link 2 is available, the transmitting device may begin preparing a synchronized multi-link aggregation transmission using separate PPDUs.

The transmitting device and receiving device may implement techniques to ensure that the separate PPDUs are aligned (e.g., shown at 3720). For example, the multi-link aggregation scheme may support a TWT mechanism, OMI, FD frames, or a TIM element transmitted in a management frame to synchronize the PPDUs. The receiving device may be transmitted (e.g., by an AP or by the transmitting STA) one or more indicators to receive the synchronized PPDUs on both the anchor link and the secondary link.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:

establishing a plurality of wireless links between the first wireless device and a second wireless device, the plurality of wireless links supporting parallel transmissions during a multi-link session and comprising at least a first wireless link and a second wireless link that is different from the first wireless link;

transmitting a first data unit comprising a first portion of a message via the first wireless link and a second data unit comprising a second portion of the message via the second wireless link, the first data unit and the second data unit having aligned end times; and receiving, via the first wireless link, a response corresponding to at least the second data unit transmitted via the second wireless link.

2. The method of claim 1, further comprising:

transmitting a signal to solicit an acknowledgement or a negative acknowledgement for the first data unit, or the second data unit, or a combination thereof.

3. The method of claim 2, wherein transmitting the signal to solicit the acknowledgement further comprises:

transmitting a block acknowledgement request to solicit the acknowledgement for at least the first data unit and the second data unit, wherein the response comprises the acknowledgement.

4. The method of claim 3, further comprising:

receiving a block acknowledgement based on the block acknowledgement request.

5. The method of claim 1, further comprising:

aligning the first data unit and the second data unit to a same start time.

6. The method of claim 1, wherein the first wireless link has a first primary channel and the second wireless link has a second primary channel.

7. The method of claim 1, wherein receiving the response further comprises:

receiving an acknowledgement or a negative acknowledgement of the first data unit and the second data unit.

8. The method of claim 1, wherein:

the first wireless link comprises a first wireless channel in a first radio frequency spectrum band; and the second wireless link comprises a second wireless channel in the first radio frequency spectrum band or a second radio frequency spectrum band.

9. The method of claim 1, further comprising:

receiving, via the first wireless link, a second response corresponding to the first data unit transmitted via the first wireless link.

10. A first wireless device for wireless communication, comprising:

one or more memories storing processor-executable code; and one or more processors coupled with the one or more memories and individually or collectively operable to execute the code to cause the first wireless device to:

establish a plurality of wireless links between the first wireless device and a second wireless device, the plurality of wireless links supporting parallel transmissions during a multi-link session and comprising at least a first wireless link and a second wireless link that is different from the first wireless link;

transmit a first data unit comprising a first portion of a message via the first wireless link and a second data unit comprising a second portion of the message via the second wireless link, the first data unit and the second data unit having aligned end times; and receive, via the first wireless link, a response corresponding to at least the second data unit transmitted via the second wireless link.

11. The first wireless device of claim 10, wherein the one or more processors are individually or collectively further operable to execute the code to cause the first wireless device to:

transmit a signal to solicit an acknowledgement or a negative acknowledgement for the first data unit, or the second data unit, or a combination thereof.

12. The first wireless device of claim 11, wherein, to transmit the signal to solicit the acknowledgement, the one or more processors are individually or collectively further operable to execute the code to cause the first wireless device to:

transmit a block acknowledgement request to solicit the acknowledgement for at least the first data unit and the second data unit, wherein the response comprises the acknowledgement.

13. The first wireless device of claim 12, wherein the one or more processors are individually or collectively further operable to execute the code to cause the first wireless device to:

receive a block acknowledgement based on the block acknowledgement request.

14. The first wireless device of claim 10, wherein the one or more processors are individually or collectively further operable to execute the code to cause the first wireless device to:

align the first data unit and the second data unit to a same start time.

15. The first wireless device of claim 10, wherein the first wireless link has a first primary channel and the second wireless link has a second primary channel.

16. The first wireless device of claim 10, wherein, to receive the response, the one or more processors are individually or collectively further operable to execute the code to cause the first wireless device to:

receive an acknowledgement or a negative acknowledgement of the first data unit and the second data unit.

17. The first wireless device of claim 10, wherein:

the first wireless link comprises a first wireless channel in a first radio frequency spectrum band; and the second wireless link comprises a second wireless channel in the first radio frequency spectrum band or a second radio frequency spectrum band.

18. The first wireless device of claim 10, wherein the one or more processors are individually or collectively further operable to execute the code to cause the first wireless device to:

receive, via the first wireless link, a second response corresponding to the first data unit transmitted via the first wireless link.

19. A non-transitory computer-readable medium storing code for wireless communication at a first wireless device, the code comprising instructions executable by one or more processors to:

establish a plurality of wireless links between the first wireless device and a second wireless device, the plurality of wireless links supporting parallel transmissions during a multi-link session and comprising at least a first wireless link and a second wireless link that is different from the first wireless link;

transmit a first data unit comprising a first portion of a message via the first wireless link and a second data unit comprising a second portion of the message via the second wireless link, the first data unit and the second data unit having aligned end times; and receive, via the first wireless link, a response corresponding to at least the second data unit transmitted via the second wireless link.

20. The non-transitory computer-readable medium of claim 19, wherein the instructions are further executable by the one or more processors to:

transmit a signal to solicit an acknowledgement or a negative acknowledgement for the first data unit, or the second data unit, or a combination thereof.

21. The non-transitory computer-readable medium of claim 20, wherein the instructions to transmit the signal to solicit the acknowledgement are further executable by the one or more processors to:

transmit a block acknowledgement request to solicit the acknowledgement for at least the first data unit and the second data unit, wherein the response comprises the acknowledgement.

22. The non-transitory computer-readable medium of claim 21, wherein the instructions are further executable by the one or more processors to:

receive a block acknowledgement based on the block acknowledgement request.

23. The non-transitory computer-readable medium of claim 19, wherein the instructions are further executable by the one or more processors to:

align the first data unit and the second data unit to a same start time.

24. The non-transitory computer-readable medium of claim 19, wherein the first wireless link has a first primary channel and the second wireless link has a second primary channel.

25. The non-transitory computer-readable medium of claim 19, wherein the instructions to receive the response are further executable by the one or more processors to:

receive an acknowledgement or a negative acknowledgement of the first data unit and the second data unit.

26. The non-transitory computer-readable medium of claim 19, wherein:

the first wireless link comprises a first wireless channel in a first radio frequency spectrum band; and the second wireless link comprises a second wireless channel in the first radio frequency spectrum band or a second radio frequency spectrum band.

27. The non-transitory computer-readable medium of claim 19, wherein the instructions are further executable by the one or more processors to:

receive, via the first wireless link, a second response corresponding to the first data unit transmitted via the first wireless link.

28. A first wireless device for wireless communication, comprising:

means for establishing a plurality of wireless links between the first wireless device and a second wireless device, the plurality of wireless links supporting parallel transmissions during a multi-link session and comprising at least a first wireless link and a second wireless link that is different from the first wireless link;

means for transmitting a first data unit comprising a first portion of a message via the first wireless link and a second data unit comprising a second portion of the message via the second wireless link, the first data unit and the second data unit having aligned end times; and means for receiving, via the first wireless link, a response corresponding to at least the second data unit transmitted via the second wireless link.

29. The first wireless device of claim 28, further comprising:

means for transmitting a signal to solicit an acknowledgement or a negative acknowledgement for the first data unit, or the second data unit, or a combination thereof.

30. The first wireless device of claim 28, further comprising:

means for receiving, via the first wireless link, a second response associated with the first data unit transmitted via the first wireless link.

* * * * *